(12) United States Patent
Yamaga et al.

(10) Patent No.: US 11,804,243 B2
(45) Date of Patent: *Oct. 31, 2023

(54) MAGNETIC RECORDING MEDIUM

(71) Applicant: Sony Group Corporation, Tokyo (JP)

(72) Inventors: Minoru Yamaga, Miyagi (JP); Noboru Sekiguchi, Miyagi (JP)

(73) Assignee: Sony Group Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/649,403

(22) PCT Filed: Oct. 18, 2019

(86) PCT No.: PCT/JP2019/041183
§ 371 (c)(1),
(2) Date: Mar. 20, 2020

(87) PCT Pub. No.: WO2021/033339
PCT Pub. Date: Feb. 25, 2021

(65) Prior Publication Data
US 2022/0284923 A1    Sep. 8, 2022

(30) Foreign Application Priority Data

Aug. 16, 2019   (JP) .................. 2019-149508
Oct. 8, 2019    (JP) .................. 2019-185508

(51) Int. Cl.
*G11B 5/78*     (2006.01)
*G11B 5/706*    (2006.01)
(Continued)

(52) U.S. Cl.
CPC ........ *G11B 5/70678* (2013.01); *G11B 5/5928* (2013.01); *G11B 5/712* (2013.01);
(Continued)

(58) Field of Classification Search
CPC ... G11B 5/70; G11B 5/70626; G11B 5/70642; G11B 5/70678; G11B 5/71;
(Continued)

(56) References Cited

U.S. PATENT DOCUMENTS 7,910,234 B2 * 3/2011 Brodd ................ G11B 5/733
427/127
10,796,724 B1 * 10/2020 Nakashio .......... G11B 23/0312
(Continued)

FOREIGN PATENT DOCUMENTS

JP      06-243451       9/1994
JP      2002-208130     7/2002
(Continued)

OTHER PUBLICATIONS

Decision to Grant dated Nov. 14, 2019 in corresponding Japanese Application No. 2019-185508.

*Primary Examiner* — Holly Rickman
(74) *Attorney, Agent, or Firm* — K&L Gates LLP

(57) ABSTRACT

It is an object of the present technology to provide a magnetic recording medium that has a small total thickness and achieves excellent travelling stability.

The present technology provides a tape-shaped magnetic recording medium including a magnetic layer, an underlayer, a base layer, and a back layer, in which a servo pattern is recorded in the magnetic layer, a statistical value $\sigma_{SW}$ indicating non-linearity of a servo band and being obtained from a reproduction waveform of a servo signal of the servo pattern is 24 nm or less, the base layer contains polyester as a main component, an average thickness $t_T$ of the magnetic recording medium is 5.6 μm or less, the magnetic recording medium contains a lubricant, pores are formed in the magnetic recording medium, and an average diameter of the pores of the magnetic recording medium that is measured in a state where the lubricant has been removed from the
(Continued)

magnetic recording medium and the magnetic recording medium has been dried, is 6 nm or more and 11 nm or less.

19 Claims, 13 Drawing Sheets

(51) Int. Cl.
    *G11B 5/735* (2006.01)
    *G11B 5/592* (2006.01)
    *G11B 5/712* (2006.01)
    *G11B 5/714* (2006.01)

(52) U.S. Cl.
    CPC ............ *G11B 5/714* (2013.01); *G11B 5/7356* (2019.05); *G11B 5/78* (2013.01)

(58) Field of Classification Search
    CPC ..... G11B 5/7356; G11B 5/5928; G11B 5/712; G11B 5/714; G11B 5/78
    See application file for complete search history.

(56) References Cited

U.S. PATENT DOCUMENTS

| | | | | |
|---|---|---|---|---|
| 2008/0266705 | A1* | 10/2008 | Saliba | G11B 5/584 |
| 2009/0046396 | A1* | 2/2009 | Nagata | G11B 5/70 |
| 2021/0012800 | A1* | 1/2021 | Yamaga | G11B 5/5928 |
| 2022/0172742 | A1* | 6/2022 | Sekiguchi | G11B 5/584 |

FOREIGN PATENT DOCUMENTS

| | | |
|---|---|---|
| JP | 2006-065953 | 3/2006 |
| JP | 2007-273036 | 10/2007 |
| JP | 2017-228328 | 12/2017 |
| WO | 2015/198514 | 12/2015 |

* cited by examiner

MAGNETIC RECORDING MEDIUM

TECHNICAL FIELD

The present technology relates to a magnetic recording medium.

BACKGROUND ART

For example, with the development of IoT, big data, and artificial intelligence, there has been a significant increase in an amount of data collected and stored. Magnetic recording media are often used as media for recording a large amount of data.

Regarding magnetic recording media, various technologies have been proposed in the past. For example, Patent Literature 1 indicated below discloses a technology regarding a magnetic recording medium that includes a magnetic layer on at least one main surface of a non-magnetic support, the magnetic layer containing at least a binder and a magnetic powder. In the magnetic recording medium, a thickness of coating of the magnetic layer is 0.12 μm or less, a Root mean square surface roughness (Rq) of the surface of a magnetic layer forming surface is 4.0 nm or less, and a skewness (Sk) in the surface profile of the magnetic layer forming surface is −1 or more and +1 or less.

CITATION LIST

Patent Literature

Patent Literature 1: Japanese Patent Application Laid-open No. 2006-65953

DISCLOSURE OF INVENTION

Technical Problem

For example, a magnetic recording medium is housed in a magnetic recording cartridge. In order to further increase the recording capacity per magnetic recording cartridge, it is conceivable to increase the tape length per magnetic recording cartridge by making the magnetic recording medium (such as a magnetic recording tape) housed in the magnetic recording cartridge thinner (by reducing the total thickness). However, a magnetic recording medium having a small total thickness has poor travelling stability in some cases. Thus, it is a primary object of the present technology to provide a magnetic recording medium that has a small total thickness and achieves excellent travelling stability.

Solution to Problem

The present technology provides a tape-shaped magnetic recording medium including
a magnetic layer,
an underlayer,
a base layer, and
a back layer, in which
a servo pattern is recorded in the magnetic layer,
a statistical value $\sigma_{SW}$ indicating non-linearity of a servo band and being obtained from a reproduction waveform of a servo signal of the servo pattern is 24 nm or less,
the base layer contains polyester as a main component,
an average thickness $t_T$ of the magnetic recording medium is 5.6 μm or less,
the magnetic recording medium contains a lubricant,
pores are formed in the magnetic recording medium, and
an average diameter of the pores that is measured in a state where the lubricant has been removed from the magnetic recording medium and the magnetic recording medium has been dried, is 6 nm or more and 11 nm or less.

A squareness ratio in a vertical direction of the magnetic recording medium may be 65% or more.

An arithmetic average roughness $R_a$ of a magnetic-layer-side surface of the magnetic recording medium may be 2.5 nm or less.

An average thickness $t_m$ of the magnetic layer may be 80 nm or less.

According to a favorable embodiment of the present technology,
a squareness ratio in a vertical direction of the magnetic recording medium may be 65% or more,
an arithmetic average roughness $R_a$ of a magnetic-layer-side surface of the magnetic recording medium may be 2.5 nm or less, and
an average thickness $t_m$ of the magnetic layer may be 80 nm or less.

The magnetic layer may contain a magnetic powder, and the magnetic powder may include hexagonal ferrite, ε-iron oxide, or Co-containing spinel ferrite.

The hexagonal ferrite may include at least one type of Ba or Sr, and
the ε-iron oxide may include at least one type of Al or Ga.

According to an embodiment of the present technology, a friction coefficient ratio ($\mu_B/\mu_A$) of a dynamic friction coefficient $\mu_B$ to a dynamic friction coefficient $\mu_A$ may be 1.0-2.0, the dynamic friction coefficient $\mu_B$ being a coefficient of dynamic friction between a magnetic-layer-side surface of the magnetic recording medium and a magnetic head in a state where a tension of 1.2 N is being applied in a longitudinal direction of the magnetic recording medium, the dynamic friction coefficient $\mu_A$ being a coefficient of dynamic friction between the magnetic-layer-side surface of the magnetic recording medium and the magnetic head in a state where a tension of 0.4 N is being applied in the longitudinal direction of the magnetic recording medium.

According to an embodiment of the present technology, a friction coefficient ratio ($\mu_{C(1000)}/\mu_{C(5)}$) of a dynamic friction coefficient $\mu_{C(1000)}$ to a dynamic friction coefficient $\mu_{C(5)}$ may be 1.0-2.0, the dynamic friction coefficient $\mu_{C(1000)}$ being a coefficient of dynamic friction upon the 1000th reciprocation when the magnetic recording medium to which a tension of 0.6 N is being longitudinally applied is caused to reciprocate on a magnetic head 1000 times, the dynamic friction coefficient $\mu_{C(5)}$ being a coefficient of dynamic friction upon the fifth reciprocation when the magnetic recording medium to which the tension of 0.6 N is being longitudinally applied is slid to reciprocate on the magnetic head five times.

The lubricant may contain a fatty acid or a fatty acid ester or both the fatty acid and the fatty acid ester.

The fatty acid may include a compound represented by General Formula (1) or (2) indicated below, and
the fatty acid ester may include a compound represented by General Formula (3) or (4) indicated below:

$$CH_3(CH_2)_k COOH \qquad (1)$$

(where k is an integer selected from a range of 14 or more and 22 or less)

$$CH_3(CH_2)_n CH=CH(CH_2)_m COOH \qquad (2)$$

(where a sum of n and m is an integer selected from a range of 12 or more and 20 or less)

$$CH_3(CH_2)_pCOO(CH_2)_qCH_3 \qquad (3)$$

(where p is an integer selected from a range of 14 or more and 22 or less, and q is an integer selected from a range of 2 or more and 5 or less)

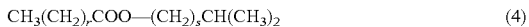
$$CH_3(CH_2)_rCOO-(CH_2)_sCH(CH_3)_2 \qquad (4)$$

(where r is an integer selected from a range of 14 or more and 22 or less, and s is an integer selected from a range of 1 or more and 3 or less).

A coercive force $H_c$ in a longitudinal direction of the magnetic recording medium may be 2000 Oe or less.

The statistical value $\sigma_{SW}$ may be 23 nm or less.

The statistical value $\sigma_{SW}$ may be 10 nm or more and 23 nm or less.

The average diameter of the pores may be 6 nm or more and 10 nm or less.

The average diameter of the pores may be 7 nm or more and 9 nm or less.

An average thickness of the base layer may be 4.2 μm or less.

The magnetic layer may contain a magnetic powder, and an average aspect ratio of the magnetic powder may be 1.0 or more and 3.5 or less.

The magnetic layer may contain a magnetic powder, and an average particle size of the magnetic powder may be 50 nm or less.

Further, the present technology also provides a magnetic recording cartridge in which the tape-shaped magnetic recording medium is housed in a state of being wound around a reel, in which (a servo track width of an inside of winding of the magnetic recording medium)–(a servo track width of an outside of the winding of the magnetic recording medium)>0 μm.

MODE(S) FOR CARRYING OUT THE INVENTION

Figure 1:
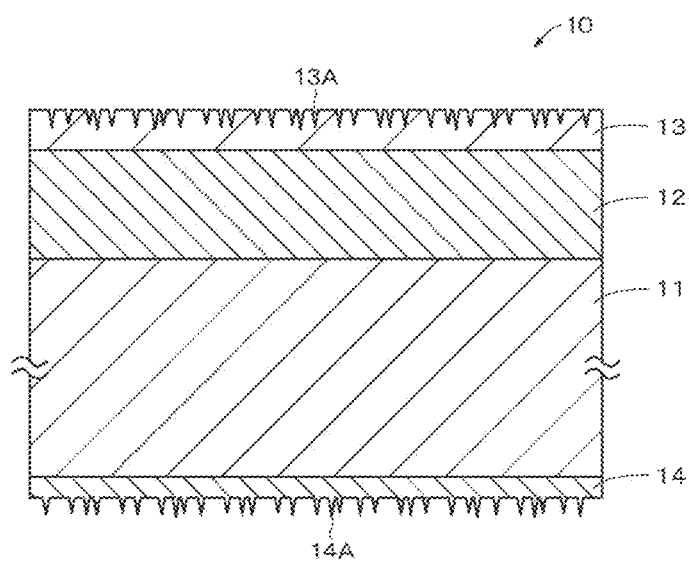
FIG. 1 is a schematic diagram of a cross section of an example of a magnetic recording medium according to the present technology.

Favorable modes for carrying out the present technology will be described below. Note that the embodiments described below are indicative of representative embodiments of the present technology, and the scope of the present technology is not limited to these embodiments.

The present technology will be described in the following order.

1. Description of Present Technology
2. Embodiments of Present Technology (Example of Coating-Type Magnetic Recording Medium)
   (1) Configuration of Magnetic Recording Medium
   (2) Descriptions of Respective Layers
   (3) Physical Properties and Structure
   (4) Method of Producing Magnetic Recording Medium
   (5) Recording/Reproduction Apparatus
   (6) Cartridge
   (7) Effects
   (8) Modified Examples
3. Examples 1. Description of Present Technology The inventors have discussed various magnetic recording media each having a small total thickness. Consequently, the inventors have found out that a magnetic recording medium having a specific configuration achieves excellent travelling stability despite having a small total thickness. That is, the magnetic recording medium according to the present technology includes a magnetic layer, an underlayer, a base layer, and a back layer. A servo pattern is recorded in the magnetic layer, and a statistical value $\sigma_{SW}$ indicating the non-linearity of a servo band and being obtained from the reproduction waveform of a servo signal of the servo pattern is 24 nm or less. The base layer contains polyester as a main component. An average thickness $t_T$ of the magnetic recording medium is 5.6 μm or less, the magnetic recording medium contains a lubricant, and pores are formed in the magnetic recording medium. An average diameter of the pores that is measured in the state where the lubricant has been removed from the magnetic recording medium and the magnetic recording medium has been dried, is 6 nm or more and 11 nm or less.

A pore having an average diameter within the numerical range and a standard deviation $\sigma_{SW}$ within the numerical range contribute toward improvement in the travelling stability. When the standard deviation $\sigma_{SW}$ is too high, the linearity of a servo band is low, and thus there may be difficulty in reading a servo signal. Further, even when the standard deviation $\sigma_{SW}$ is not greater than the above-mentioned upper value, there may be a decrease in the travelling stability if the average diameter is out of the numerical range.

Moreover, the pore having an average diameter within the numerical range is suitable to improve travelling stability using the lubricant. The pore having an average diameter within the numerical range permits a lubricant in an amount suitable for improving travelling stability to come out on a magnetic-layer-side surface.

The standard deviation $\sigma_{SW}$ of the magnetic recording medium according to the present technology is 24 nm or less, and more favorably 23 nm or less. The travelling stability of the magnetic recording medium may be improved due to the standard deviation $\sigma_{SW}$ being within this numerical range.

Further, the standard deviation $\sigma_{SW}$ of the magnetic recording medium according to the present technology may be, for example, 10 nm or more, and favorably 13 nm or more, and more favorably 15 nm or more.

The magnetic recording medium according to the present technology includes pores, and an average diameter of the pores measured in the state where a lubricant has been removed from the magnetic recording medium and the magnetic recording medium has been dried, is 6 nm or more and 11 nm or less. The average diameter is favorably 10 nm or less, and more favorably 9 nm or less. The average diameter is favorably 6.5 nm or more, more favorably 7 nm or more, still more favorably 7.5 nm or more, and particularly favorably 8 nm or more. The average diameter is more favorably 6 nm or more and 10 nm or less, more favorably 6.5 nm or more and 10 nm or less, and still more favorably 7 nm or more and 9 nm or less. The travelling stability of the magnetic recording medium is improved due to the average pore diameter being within the above-mentioned numerical range. When the average pore diameter is out of the above-mentioned numerical range, the friction between the magnetic recording medium and a drive will gradually increase as the magnetic recording medium travels, and thus there may be a decrease in the travelling stability. For example, the pore may be formed on the surface of the magnetic recording medium, and, more particularly, on the surface on a side on which the magnetic layer side is situated. For example, the pore may exist in the magnetic layer. The pore existing in the magnetic layer may be formed only in the magnetic layer, or the pore formed in the magnetic layer may extend into another layer such as an underlayer.

The average thickness $t_T$ of the magnetic recording medium may be 5.6 μm or less, more favorably 5.3 μm or less, and still more favorably 5.2 μm or less, 5.0 μm or less, or 4.6 μm or less. Since the total thickness of the magnetic recording medium according to the present technology is small as described above, for example, the tape to be wound up into a single magnetic recording cartridge can be made longer, and this makes it possible to increase the recording capacity per magnetic recording cartridge.

The width of the magnetic recording medium according to the present technology may be, for example, 5 mm-30 mm, particularly 7 mm-25 mm, more particularly 10 mm-20 mm, and still more particularly 11 mm-19 mm. The width of the tape-shaped magnetic recording medium according to the present technology may be, for example, 500 m-1500 m. For example, the tape width and the tape length in accordance with the LTO8 standard are 12.65 mm and 960 m, respectively.

The magnetic recording medium according to the present technology has a tape shape, and may be, for example, an elongated magnetic recording tape. The tape-shaped magnetic recording medium according to the present technology may be housed in, for example, a magnetic recording cartridge. More specifically, the tape-shaped magnetic recording medium according to the present technology may be housed in the magnetic recording cartridge in a state of being wound around a reel provided in the cartridge.

The magnetic recording medium according to the present technology includes the magnetic layer, the underlayer, the base layer, and the back layer. These four layers may be stacked in this order. In addition to these layers, the magnetic recording medium according to the present technology may include another layer. The other layer may be appropriately selected depending on the type of the magnetic recording medium. The magnetic recording medium according to the present technology may be, for example, a coating-type magnetic recording medium. The coating-type magnetic recording medium will be described in more detail in "2." below.

According to a favorable embodiment of the present technology, in the magnetic recording medium, a squareness ratio in the vertical direction may be 65% or more, a surface roughness $R_a$ of a magnetic-layer-side surface of the magnetic recording medium may be 2.5 nm or less, and an average thickness $t_m$ of the magnetic layer may be 80 nm or less. This results in improving the recording/reproduction characteristics in a magnetic recording medium having a small thickness.

In an embodiment of the present technology, the magnetic recording medium may be housed in a magnetic recording cartridge in a state of being wound around a reel. That is, the present technology also provides a magnetic recording cartridge that includes the magnetic recording medium and in which the magnetic recording medium is housed in a state of being wound around a reel. In this embodiment, it is favorable that (the servo track width of the inside of winding of the magnetic recording medium)−(the servo track width of the outside of the winding of the magnetic recording medium)>0 μm be satisfied. As used herein, "(the servo track width of the inside of winding of the magnetic recording medium)−(the servo track width of the outside of the winding of the magnetic recording medium)" may also be hereinafter referred to as a "difference in servo track width between the inside of winding and the outside of the winding". The difference in servo track width between the inside of winding and the outside of the winding may be favorably 0.01 μm or more, more favorably 0.02 μm or more, and still more favorably 0.05 μm or more. The difference in servo track width between the inside of winding and the outside of the winding may be, for example, 0.10 μm or more, 0.15 μm or more, or 0.20 μm or more. A method of measuring the difference and a method of measuring a shift amount of the servo track width that is used to calculate the difference will be described in "(3) of 2." below.

In particular, for a magnetic recording medium used in a recording/reproduction apparatus that makes it possible to keep the width of an elongated magnetic recording medium constant or substantially constant by adjusting the tension in the longitudinal direction of the elongated magnetic recording medium, it is favorable that the difference in servo track width between the inside of winding and the outside of the winding be within the above-mentioned numerical range. For example, the recording/reproduction apparatus detects a dimension of the magnetic recording medium in the width direction or a change in the dimension, and adjusts the tension in the longitudinal direction according to a result of the detection. This tension adjustment may induce a phenomenon specific to the tension adjustment, the phenomenon being a phenomenon of a magnetic recording medium being wrinkled upon being wound around a reel due to the tension adjustment. In particular, the phenomenon may be induced when the tension is eased.

Due to the difference in servo track width between the inside of winding and the outside of the winding being within the above-mentioned numerical range, it is possible to avoid wrinkling a magnetic recording medium (in particular, a portion of the magnetic recording medium that is situated closer to a reel) wound around a reel provided in a cartridge. There is a possibility that the wrinkle will cause, for example, a winding shift or a track shift upon travelling, and the present technology also makes it possible to prevent these phenomena from occurring due to the wrinkle.

The suppression of the occurrence of the wrinkle mentioned above will be described in more detail below.

The recording/reproduction apparatus that makes it possible to keep the width of an elongated magnetic recording medium constant or substantially constant by adjusting the tension in the longitudinal direction of the magnetic recording medium, adjusts the tension in the longitudinal direction depending on, for example, the servo track width. For example, in the case where the servo track width is larger than a predetermined width, the apparatus makes the tension in the longitudinal direction higher to keep the servo track width constant, and in the case in where the servo track width is smaller than the predetermined width, the apparatus makes the tension in the longitudinal direction lower to keep the servo track width constant. In this way, the width of the magnetic recording medium is kept constant.

The fact that the difference in servo track width between the inside of winding and the outside of the winding exhibits a negative value means that the servo track width of the inside of winding is smaller than the servo track width of the outside of the winding. In the case where the difference exhibits a negative value, the servo track width in a region situated close to an end connected to a reel of a magnetic recording cartridge (hereinafter also referred to as a "reel-connected end") is smaller than the servo track width in a region situated close to the opposite end (hereinafter also referred to as an "outside end"), such as the fact that a portion having a smallest servo track width exists in half a region of the magnetic recording medium that is situated on, for example, the side of the reel-connected end. Thus, in order to keep the servo track width constant when the magnetic recording medium is wound around a reel provided in a magnetic recording cartridge, the tension in the longitudinal direction applied upon winding up the region situated close to the reel-connected end is lower, and the tension in the longitudinal direction applied upon winding up the region situated close to the outside end is higher. Consequently, in the magnetic recording medium, the region situated close to the reel-connected end is wound around the reel with a tension lower than the tension applied for the region situated close to the outside end. The phenomenon of the region situated close to the reel-connected end being wrinkled may be induced if the magnetic recording medium is wound up in this way. The wrinkle may cause, for example, a winding shift and a track shift upon travelling. The phenomenon of the magnetic recording medium being wrinkled is less likely to occur in the case where the magnetic recording medium remains in a state of being wound up for a short time, but is more likely to occur in the case where the magnetic recording medium remains in the state for a long time. For example, when the magnetic recording medium is wound around a reel provided in a magnetic recording/reproduction apparatus, the state of being wound around the reel provided in the apparatus normally remains only for a short time, and thus the phenomenon does not occur. On the other hand, the state of being wound around the reel provided in the magnetic recording/reproduction apparatus remains for a long time in the case where the cartridge is stored in the long term. Thus, the phenomenon may occur with respect to the magnetic recording medium in the magnetic recording cartridge.

When the difference in servo track width between the inside of winding and the outside of the winding exhibits a positive value (that is, the servo track width of the inside of winding is larger than the servo track width of the outside of the winding), the servo track width in the region situated close to the reel-connected end is larger than the servo track width in the region situated close to the outside end. Thus, in order to keep the servo track width constant when the magnetic recording medium is wound around a reel provided in a magnetic recording cartridge, the tension in the longitudinal direction applied upon winding up the region situated close to the reel-connected end is higher, and the tension in the longitudinal direction applied upon winding up the region situated close to the outside end is lower. Consequently, in the magnetic recording medium, the region situated close to the reel-connected end is wound around the reel with a tension higher than the tension applied for the region situated close to the outside end. Accordingly, it is possible to avoid wrinkling a region of the magnetic recording medium that is situated close to the reel-connected end, by the magnetic recording medium being wound up as described above.

The difference in servo track width between the inside of winding and the outside of the winding may be, for example, 0.5 µm or less, favorably 0.4 µm or less, and more favorably 0.3 µm or less. When the difference in servo track width between the inside of winding and the outside of the winding exhibits a value not greater than the above-mentioned upper limit value, this makes it possible to more easily keep the width of the magnetic recording medium constant by performing tension adjustment.

2. Embodiments of Present Technology (Example of Coating-Type Magnetic Recording Medium)

(1) Configuration of Magnetic Recording Medium

First, a configuration of a magnetic recording medium 10 according to a first embodiment will be described with reference to FIG. 1. The magnetic recording medium 10 is, for example, a magnetic recording medium on which vertical orientation processing has been performed, and includes, as shown in FIG. 1, an elongated base layer (also referred to as a substrate) 11, an underlayer (non-magnetic layer) 12 provided on one main surface of the base layer 11, a magnetic layer (also referred to as a recording layer) 13 provided on the underlayer 12, and a back layer 14 provided on the other main surface of the base layer 11. As used herein, of the two main surfaces of the magnetic recording medium 10, the surface on which the magnetic layer 13 is provided is also referred to as a magnetic surface or a magnetic-layer-side surface, and a surface opposite to the magnetic surface is also referred to as a back surface (a surface on the side on which the back layer 14 is provided).

The magnetic recording medium 10 has a tape shape, and is caused to travel in the longitudinal direction at the time of recording/reproduction. Further, the magnetic recording medium 10 may be configured to be capable of recording a signal with a shortest recording wavelength of, favorably, 100 nm or less, more favorably 75 nm or less, still more favorably 60 nm or less, and particularly favorably 50 nm or less, and may be used in a recording/reproduction apparatus of a shortest recording wavelength within the above-mentioned range. This recording/reproduction apparatus may include a ring-type head as a recording head. The recording track width may be, for example, 2 μm or less.

(2) Descriptions of Respective Layers (Base Layer)

The base layer 11 may serve as a support of the magnetic recording medium 10, and is, for example, an elongated, flexible non-magnetic substrate. In particular, the base layer 11 may be a non-magnetic film. The thickness of the base layer 11 is, for example, 8 μm or less, favorably 7 μm or less, more favorably 6 μm or less, still more favorably 5 μm or less, and particularly favorably 4.2 μm or less. The thickness of the base layer 11 may be, for example, 2 μm or more, favorably 2.2 μm or more, more favorably 2.5 μm or more, and still more favorably 2.6 μm or more.

The average thickness of the base layer 11 is obtained as follows. First, the magnetic recording medium 10 having a width of ½ inch is prepared and cut into a 250 mm length to prepare a sample. Subsequently, layers (i.e., the underlayer 12, the magnetic layer 13, and the back layer 14) of the sample other than the base layer 11 are removed with a solvent such as MEK (methyl ethyl ketone) or dilute hydrochloric acid. Next, the thickness of the sample (base layer 11) is measured at five or more points by using a laser hologauge (LGH-110C) manufactured by Mitsutoyo Corporation as a measurement apparatus, and the measured values are simply averaged (arithmetic average) to calculate the average thickness of the base layer 11. Note that the measurement positions are randomly selected from the sample.

The base layer 11 contains, for example, polyester as a main component. The polyester may be, for example, one of PET (polyethylene terephthalate), PEN (polyethylene naphthalate), PBT (polybutylene terephthalate), PBN (polybutylene naphthalate), PCT (polycyclohexylenedimethylene terephthalate), PEB (polyethylene-p-oxybenzoate), and polyethylene bisphenoxy carboxylate, or a mixture of two or more types thereof. As used herein, the "main component" refers to a component contained at a highest rate from among components contained in the base layer. For example, the fact that the main component of the base layer 11 is polyester may mean that the rate of polyester contained in the base layer 11 is, for example, 50 mass % or more, 60 mass % or more, 70 mass % or more, 80 mass % or more, 90 mass % or more, 95 mass % or more, or 98 mass % or more with respect to the mass of the base layer 11, or may mean that the base layer 11 only contains polyester.

In this embodiment, the base layer 11 may contain a resin other than polyester indicated below, in addition to polyester.

According to the favorable embodiment of the present technology, the base layer 11 may be formed of PET or PEN.

In another embodiment of the present technology, the base layer 11 may be formed of a resin other than polyester. The resin forming the base layer 11 may include, for example, at least one of polyolefin resin, cellulose derivative, vinyl resin, or other polymer resins. In the case where base layer 11 contains two or more types of these resins, the two or more types of materials may be mixed, copolymerized, or stacked.

The polyolefin resins include, for example, at least one of PE (polyethylene) or PP (polypropylene). The cellulose derivatives include, for example, at least one of cellulose diacetate, cellulose triacetate, CAB (cellulose acetate butyrate), or CAP (cellulose acetate propionate). The vinyl resins include, for example, at least one of PVC (polyvinyl chloride) or PVDC (polyvinylidene chloride).

The other polymer resins include, for example, at least one of PEEK (polyether ether ketone), PA (polyamide, nylon), aromatic PA (aromatic polyamide, aramid), PI (polyimide), aromatic PI (aromatic polyimide), PAI (polyamide imide), aromatic PAI (aromatic polyamide imide), PBO (polybenzoxazole, e.g., Zylon (registered trademark)), polyether, PEK (polyether ketone), polyether ester, PES (polyether sulfone), PEI (polyether imide), PSF (polysulfone), PPS (polyphenylene sulfide), PC (polycarbonate), PAR (polyarylate), or PU (polyurethane).

(Magnetic Layer)

The magnetic layer 13 may be, for example, a perpendicular recording layer. The magnetic layer 13 may contain a magnetic powder and a lubricant. The magnetic layer 13 may contain, for example, a binder in addition to a magnetic powder and a lubricant, and, in particular, the magnetic layer 13 may further contain a binder and conductive particles. The magnetic layer 13 may further contain an additive such as an abrasive and a rust inhibitor as necessary.

The magnetic layer 13 includes pores. That is, the magnetic layer 13 has a surface on which a large number of pores is provided. Favorably, the pores may be provided in a region in the magnetic layer 13 that comes into contact with a magnetic head at the time of recording and/or reproduction in the magnetic recording medium 10, and more favorably, the pores may be provided all over the region.

The pores may be opened perpendicularly to the surface of the magnetic layer 13. For example, the pores may be formed by a large number of protrusions being pressed against the magnetic layer 13, the large number of protrusions being provided on the back-layer-side surface of the magnetic recording medium 10. In this case, the pore may correspond to the protrusion.

Note that, although the pore is denoted by a reference symbol 13A in FIG. 1, FIG. 1 is a schematic diagram for better understanding of the present technology, and the shape of the pore 13A shown in FIG. 1 is not necessarily indicative of the actual shape.

The average thickness $t_m$ of the magnetic layer 13 may be favorably 35 nm $\leq t_m \leq$ 120 nm, more favorably 35 nm $\leq t_m \leq$ 100 nm, and particularly favorably 35 nm $\leq t_m \leq$ 90 nm. The fact that the magnetic layer 13 has an average thickness $t_m$ within the above-mentioned numerical range contributes toward improvement in the electromagnetic conversion characteristics.

It is particularly favorable that the average thickness $t_m$ of the magnetic layer be 80 nm or less. The fact that the magnetic layer has an average thickness within the above-mentioned numerical range contributes toward improvement in the recording/reproduction characteristics of the magnetic recording medium 10.

For example, the average thickness $t_m$ of the magnetic layer 13 is obtained as follows.

The magnetic recording medium 10 is processed by an FIB (Focused Ion Beam) method or the like to make a slice. In the case of using an FIB method, as pretreatment for observing a TEM image of a cross section described below, a carbon film and a tungsten thin film are formed as protective films. The carbon film is formed on the magnetic-layer-side surface and the back-layer-side surface of the magnetic recording medium 10 by a deposition method, and the tungsten thin film is further formed on the magnetic-layer-side surface by a deposition method or sputtering method. The slicing is performed along the length direction (longitudinal direction) of the magnetic recording medium 10. That is, the slicing forms a cross section parallel to both the longitudinal direction and the thickness direction of the magnetic recording medium 10.

The above-mentioned cross section of the obtained sliced sample is observed with a transmission electron microscope (TEM) under the following conditions to obtain a TEM image. Note that the magnification and acceleration voltage may be appropriately adjusted depending on the type of the apparatus. Apparatus: TEM (H9000NAR manufactured by Hitachi, Ltd.)

Acceleration Voltage: 300 kV

Magnification: 100,000

Next, the obtained TEM image is used for measuring the thickness of the magnetic layer 13 at at least 10 or more positions in the longitudinal direction of the magnetic recording medium 10. The average value obtained by simply averaging (arithmetic average) the obtained measured values is taken as the average thickness $t_m$ [nm] of the magnetic layer 13. Note that the positions at which the measurement is performed are randomly selected from the test piece.

It is favorable that the magnetic layer 13 be a vertically oriented magnetic layer. As used herein, the vertical orientation refers to a state in which a squareness ratio S1 in the longitudinal direction (travelling direction) of the magnetic recording medium 10 is 35% or less. The method of measuring the squareness ratio S1 will be separately described below.

Note that the magnetic layer 13 may be a magnetic layer that is oriented in a plane (longitudinally oriented). That is, the magnetic recording medium 10 may be a horizontal recording type magnetic recording medium. However, the vertical orientation is more favorable in terms of achievement of a high recording density.

(Servo Pattern)

A servo pattern is recorded in the magnetic layer 13. For example, as shown in A of FIG. 2, the magnetic layer may include a plurality of servo bands SB and a plurality of data bands DB. The plurality of servo bands SB is provided in the width direction of the magnetic recording medium 10 at equal intervals. Between adjacent servo bands SB, a data band DB is provided. In each of the servo bands SB, a servo signal for tracking controlling of the magnetic head may be written in advance. In each of the data bands DB, user data may be recorded.

The magnetic layer 13 may include, for example, at least one data band and at least two servo bands. The number of data bands may be, for example, 2-10, particularly 3-6, and more particularly 4 or 5. The number of servo bands may be, for example, 3-11, particularly 4-7, and more particularly 5 or 6. These servo band and data band may be disposed to extend in the longitudinal direction of, for example, a tape-shaped magnetic recording medium (in particular, an elongated magnetic recording tape), and particularly to be substantially parallel to the longitudinal direction. Examples of the magnetic recording medium including a data band and a servo band as described above include a magnetic recording tape conforming to the LTO (Linear Tape-Open) standard. That is, the magnetic recording medium according to the present technology may be a magnetic recording tape conforming to the LTO8 standard or a standard subsequent to the LTO8 standard.

A ratio $R_S$ (=($S_{SB}$/S)×100) of a total area $S_{SB}$ of the servo bands SB to an area S of the entire surface of the magnetic layer 13 is favorably 4.0% or less, more favorably 3.0% or less, and still more favorably 2.0% or less from the viewpoint of securing a high recording capacity.

Note that the servo band width $W_{SB}$ of the servo band SB is favorably 95 μm or less, more favorably 60 μm or less, and still more favorably 30 μm or less from the viewpoint of securing a high recording capacity. The servo band width $W_{SB}$ is favorably 10 μm or more from the viewpoint of producing the recording head.

The magnetic layer 13 may include, for example, five or more servo bands. The ratio $R_S$ of the total area $S_{SB}$ of the servo bands SB to the area S of the surface of the magnetic layer 13 is favorably not less than 0.8% in order to secure five or more servo tracks.

The ratio $R_S$ of the total area $S_{SB}$ of the servo bands SB to the area S of the entire surface of the magnetic layer 13 is obtained as follows. For example, the magnetic recording medium 10 is developed using a ferricolloid developer (manufactured by SIGMA HI-CHEMICAL INC., Sig-Marker Q). After that, the developed magnetic recording medium 10 is observed with an optical microscope, and the servo band width $W_{SB}$ and the number of servo bands SB are measured. Next, the ratio $R_S$ is obtained on the basis of the following formula.

Ratio $R_S$[%]=(((servo band width $W_{SB}$)×(number of servo bands SB))/(width of the magnetic recording medium 10))×100

Figure 2:
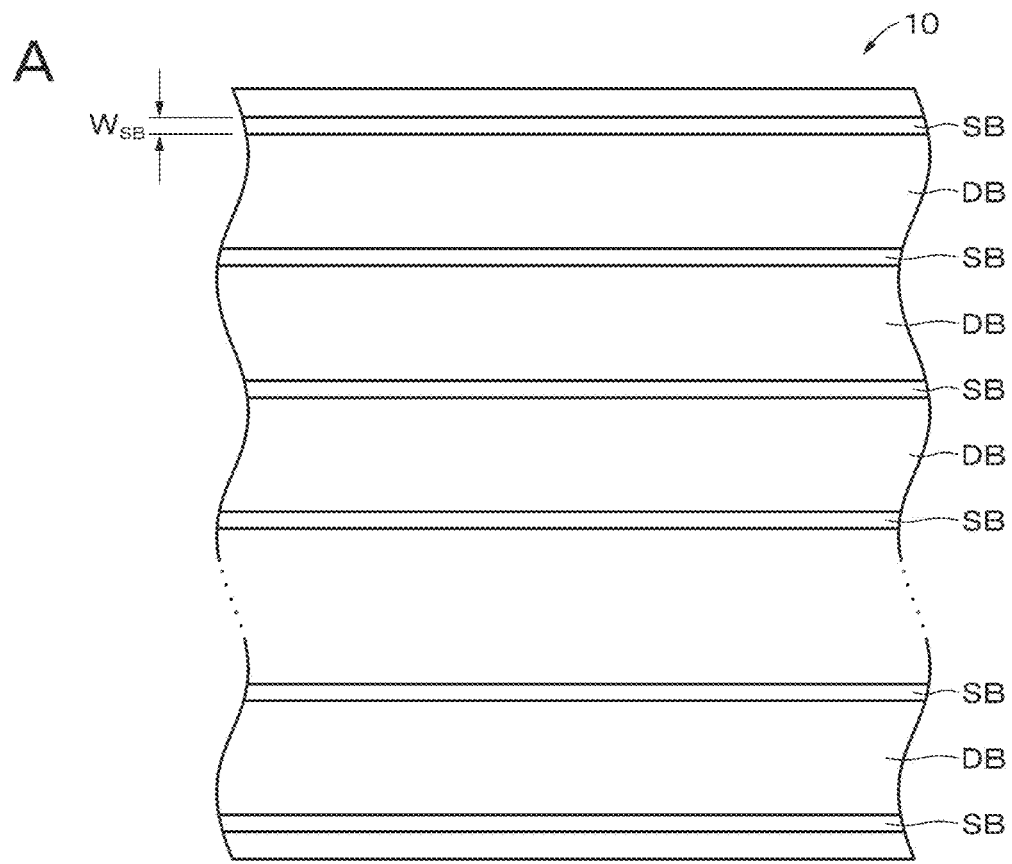
FIG. 2 is a diagram showing examples of data bands and servo bands that are provided to the magnetic recording medium.
Figure 2:
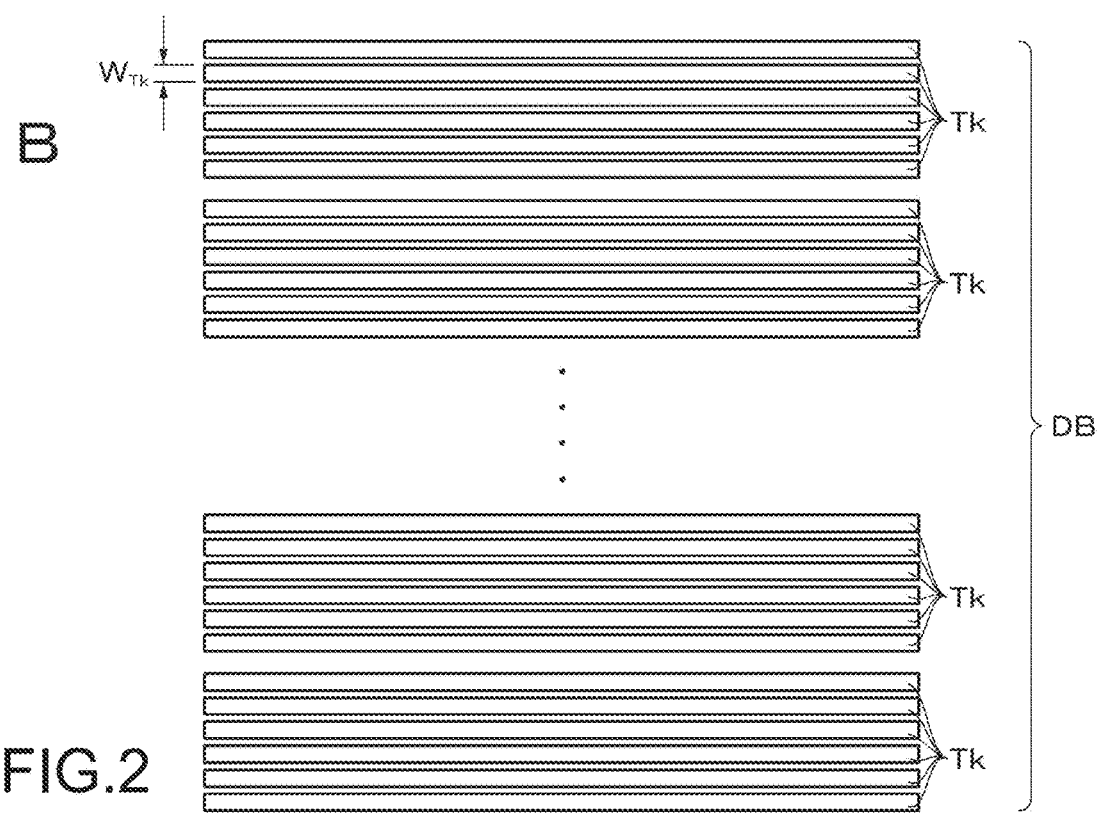

As shown in B of FIG. 2, the magnetic layer 13 is configured to be capable of forming a plurality of data tracks Tk in the data band DB. In this case, the data track width $W_{Tk}$ is favorably 2.0 μm or less, more favorably 1.5 μm or less, and still more favorably 1.0 μm or less from the viewpoint of securing a high recording capacity. The data track width $W_{Tk}$ is favorably 0.02 μm or more from the viewpoint of the size of a magnetic particle. The data track width $W_{Tk}$ is obtained as follows. For example, a data recording pattern of the data band part of the magnetic layer 13 with data recorded on the entire surface thereof, is observed using a magnetic force microscope (MFM) to obtain an MFM image. As the MFM, Dimension 3100 manufactured by Digital Instruments and the analysis software thereof are used. The measurement region of the MFM image has a size of 10 μm×10 μm, and the measurement region having the size of 10 μm×10 μm is divided into 512×512 (=262,144) measurement points. Three measurement regions of 10 μm×10 μm at different locations are measured with the MFM, i.e., three MFM images are obtained. From the three obtained MFM images, track widths are measured at 10 locations using the analysis software attached to Dimension 3100, and the average value (simple average) thereof is obtained. The average value is the data track width $W_{Tk}$. Note that the measurement conditions of the MFM are sweep speed: 1 Hz, used chip: MFMR-20, lift height: 20 nm, and correction: Flatten order 3.

The magnetic layer 13 is configured to be capable of recording data so that the minimum value of a magnetization reversal pitch L is favorably 48 nm or less, more favorably 44 nm or less, and still more favorably 40 nm or less from the viewpoint of securing a high recording capacity. With respect to the minimum value of the magnetization reversal pitch L, the size of a magnetic particle is considered. The minimum value of the magnetization reversal pitch L is obtained as follows. For example, a data recording pattern of the data band part of the magnetic layer 13 with data recorded on the entire surface thereof, is observed using a magnetic force microscope (MFM) to obtain an MFM image. As the MFM, Dimension 3100 manufactured by Digital Instruments and the analysis software thereof are used. The measurement region of the MFM image has a size of 2 μm×2 μm, and the measurement region having the size of 2 μm×2 μm is divided into 512×512 (=262,144) measurement points. Three measurement regions of 2 μm×2 μm at different locations are measured with the MFM, i.e., three MFM images are obtained. Fifty distances between bits are measured from the two-dimensional unevenness chart of the recording pattern of the obtained MFM image. The distance between bits is measured using the analysis soft attached to Dimension 3100. The value that is substantially the greatest common divisor of the 50 measured distances between bits is taken as the minimum value of the magnetization reversal pitch L. Note that the measurement conditions are sweep speed: 1 Hz, used chip: MFMR-20, lift height: 20 nm, and correction: Flatten order 3.

Figure 3:
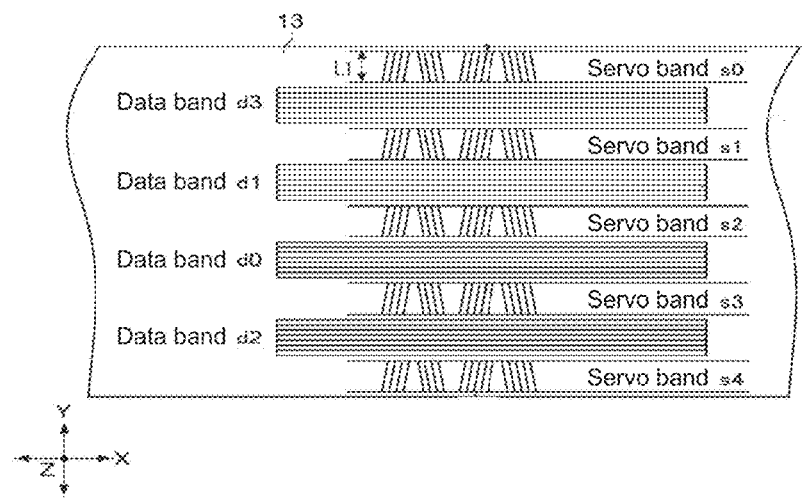
FIG. 3 is a diagram showing an example of a servo pattern in a servo band.
Figure 4:
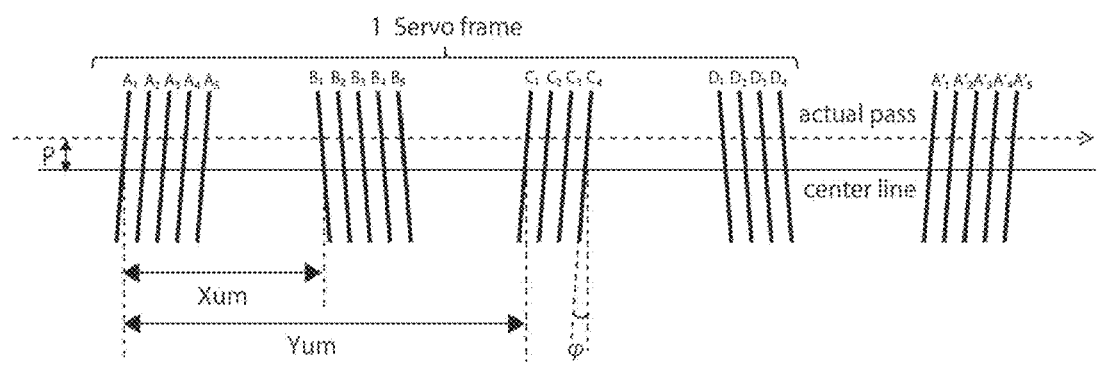
FIG. 4 is a diagram showing an example of a servo pattern in a servo band.

A more specific example of a servo pattern recorded in the magnetic layer 13 of the magnetic recording medium according to the present technology will be described below with reference to FIGS. 3 and 4. FIG. 3 is a schematic diagram of data bands and servo bands that are formed in the magnetic layer 13 of the magnetic recording medium 10. FIG. 4 is a diagram showing a servo pattern of each servo band.

As shown in FIG. 3, the magnetic layer 13 includes four data bands d0-d3. The magnetic layer 13 includes five servo bands S0-S4 such that each data band is situated between the respective two servo bands.

As shown in FIG. 4, each servo band repeatedly includes a frame unit (one servo frame) including five linear servo patterns (e.g., servo patterns A1-A5) that are inclined at a predetermined angle φ, five linear servo patterns (e.g., servo patterns B1-B5) that are inclined at the same angle in a direction opposite to the direction of signals of the servo patterns A1-A5, four linear servo patterns (e.g., servo patterns C1-C4) that are inclined at the predetermined angle φ, and four linear servo patterns (e.g., servo patterns D1-D4) that are inclined at the same angle in a direction opposite to the direction of signals of the servo patterns C1-C4. The predetermined angle φ may be, for example, 5°-25°, and particularly 11°-25°.

The servo band width L1 of each of the servo bands S0-S4 (refer to FIG. 3) may be, for example, 100 μm or less, particularly 60 μm or less, more particularly 50 μm or less, and even 40 μm or less. The servo band width L1 may be, for example, 15 μm or more, and particularly 25 μm or more.

(Magnetic Powder)

Examples of magnetic particles included in a magnetic powder contained in the magnetic layer 13 include hexagonal ferrite, epsilon-type iron oxide (ε-iron oxide), Co-containing spinel ferrite, gamma hematite, magnetite, chromium dioxide, cobalt-coated iron oxide, and metal, but the magnetic particles are not limited to them. The magnetic powder may be one type thereof, or a combination of two or more types thereof. Favorably, the magnetic powder may contain hexagonal ferrite, ε-iron oxide, or Co-containing spinel ferrite. Particularly favorably, the magnetic powder is hexagonal ferrite. Particularly favorably, the hexagonal ferrite may include at least one type of Ba or Sr. Particularly favorably, the ε-iron oxide may include at least one type of Al or Ga. These magnetic particles may be appropriately selected by those skilled in the art depending on the factor such as a method of producing the magnetic layer 13, the standard of a tape, and the functionality of the tape.

The shape of a magnetic particle depends on the crystal structure of the magnetic particle. For example, barium ferrite (BaFe) and strontium ferrite may have a hexagon plate shape. ε-iron oxide may have a spherical shape. Cobalt ferrite may have a cubic shape. Metal may have a spindle shape. These magnetic particles are oriented in the process of producing the magnetic recording medium 10.

The average particle size of the magnetic powder may be favorably 50 nm or less, more favorably 40 nm or less, and still more favorably 30 nm or less, 25 nm or less, 22 nm or less, 21 nm or less, or 20 nm or less. The average particle size may be, for example, 10 nm or more, and favorably 12 nm or more.

The average aspect ratio of the magnetic powder may be favorably 1.0 or more and 3.5 or less, more favorably 1.0 or more and 3.1 or less, still more favorably 1.0 or more and 2.8 or less, and particularly favorably 1.1 or more and 2.5 or less.

Embodiment in which Magnetic Powder Contains Hexagonal Ferrite

According to a favorable embodiment of the present technology, the magnetic powder may contain hexagonal ferrite, and more particularly, the magnetic powder may include a powder of nanoparticles containing hexagonal ferrite (hereinafter referred to as "hexagonal ferrite particles"). The hexagonal ferrite particle has, for example, a hexagon plate shape, or a substantially hexagon plate shape. The hexagonal ferrite may contain, favorably, at least one type of Ba, Sr, Pb, or Ca, more favorably, at least one type of Ba or Sr. Specifically, the hexagonal ferrite may be, for example, barium ferrite or strontium ferrite. The barium ferrite may further contain at least one type of Sr, Pb, or Ca in addition to Ba. The strontium ferrite may further contain at least one type of Ba, Pb, or Ca in addition to Sr.

More specifically, the hexagonal ferrite may have an average composition represented by the general formula $MFe_{12}O_{19}$. Here, M is, for example, at least one type of metal of Ba, Sr, Pb, or Ca, favorably at least one type of metal of Ba or Sr. M may be a combination of Ba and one or more types of metal selected from the group consisting of Sr, Pb, and Ca. Further, M may be a combination of Sr and one or more types of metal selected from the group consisting of Ba, Pb, and Ca. Some Fe in the above-mentioned general formula may be substituted with another metal element.

In the case where the magnetic powder includes a powder of hexagonal ferrite particles, the average particle size of the magnetic powder may be favorably 50 nm or less, more favorably 40 nm or less, and still more favorably 30 nm or less, 25 nm or less, 22 nm or less, 21 nm or less, or 20 nm or less. The average particle size may be, for example, 10 nm or more, favorably 12 nm or more, and still more favorably 15 nm or more. For example, the average particle size of the magnetic powder may be 10 nm or more and 50 nm or less, 10 nm or more and 40 nm or less, 12 nm or more and 30 nm or less, 12 nm or more and 25 nm or less, or 15 nm or more and 22 nm or less. In the case where the average particle size of the magnetic powder is not greater than the above-mentioned upper limit value (such as the case of 50 nm or less, and particularly 30 nm or less), favorable electromagnetic conversion characteristics (e.g., C/N) can be achieved in the magnetic recording medium 10 having a high recording density. In the case where the average particle size of the magnetic powder is not less than the above-mentioned lower limit value (such as the case of 10 nm or more, and favorably 12 nm or more), the dispersibility of the magnetic powder is further enhanced, and further excellent electromagnetic conversion characteristics (e.g., C/N) can be achieved.

In the case where the magnetic powder includes a powder of hexagonal ferrite particles, the average aspect ratio of the magnetic powder may be favorably 1 or more and 2.5 or less, more favorably 1 or more and 2.1 or less, and still more favorably 1 or more and 1.8 or less. Due to the average aspect ratio of the magnetic powder being within the above-mentioned numerical range, aggregation of the magnetic powder can be suppressed, and further, the resistance applied to the magnetic powder when the magnetic powder is vertically oriented in the process of forming the magnetic layer 13 can be reduced. This may result in the improvement in the vertical orientation of the magnetic powder.

In the case where the magnetic powder includes a powder of hexagonal ferrite particles, the average particle size and the average aspect ratio of the magnetic powder are obtained as follows.

First, the magnetic recording medium 10 to be measured is processed by an FIB (Focused Ion Beam) method or the like to make a slice. In the case of using an FIB method, as pretreatment for observing a TEM image of a cross section described below, a carbon film and a tungsten thin film are formed as protective films. The carbon film is formed on the magnetic-layer-side surface and the back-layer-side surface of the magnetic recording medium 10 by a deposition method, and the tungsten thin film is further formed on the magnetic-layer-side surface by a deposition method or sputtering method. The slicing is performed along the length direction (longitudinal direction) of the magnetic recording medium 10. That is, the slicing forms a cross section parallel to both the longitudinal direction and the thickness direction of the magnetic recording medium 10.

The cross section of the obtained slice sample is observed at an acceleration voltage: 200 kV and the total magnification of 500,000 using a transmission electron microscope (H-9500 manufactured by Hitachi High-Technologies Corporation) so that the entire magnetic layer 13 is included in the thickness direction of the magnetic layer 13, and a TEM photograph is taken.

Figure 10:
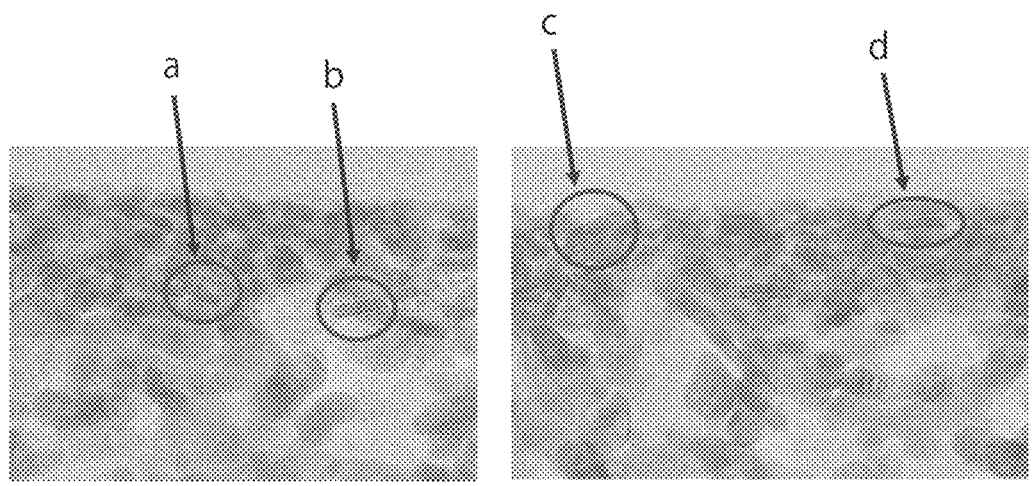
FIG. 10 shows examples of a TEM photograph of a magnetic layer.

Next, 50 particles with the side facing in the direction of the observation surface, whose particle thickness can be clearly observed, are selected from the taken TEM photograph. For example, FIG. 10 shows an example of the TEM photograph. In FIG. 10, for example, particles indicated by a and d are selected because the thickness of each of the particles can be clearly observed. The maximum thickness DA of each of the 50 selected particles is measured. The maximum thicknesses DA thus obtained are simply averaged (arithmetic average) to obtain an average maximum thickness $DA_{ave}$.

Subsequently, the plate diameter DB of each magnetic powder is measured. In order to measure the plate diameter DB of the particle, 50 particles in which the plate diameter of the particle can be clearly observed are selected from the taken TEM photograph. For example, in FIG. 10, for example, particles indicated by b and c are selected because the plate diameter of the particle can be clearly observed. The plate diameter DB of each of the 50 selected particles is measured. The plate diameters DB thus obtained are simply averaged (arithmetic average) to obtain an average plate diameter $DB_{ave}$. The average plate diameter $DB_{ave}$ is an average particle size.

Then, from the average maximum thickness $DA_{ave}$ and the average plate diameter $DB_{ave}$, the average aspect ratio ($DB_{ave}/DA_{ave}$) of the particles is obtained.

In the case where the magnetic powder includes a powder of hexagonal ferrite particles, the average particle volume of the magnetic powder is favorably 5900 nm³ or less, more favorably 500 nm³ or more and 3400 nm³ or less, and still more favorably 1000 nm³ or more and 2500 nm³ or less.

In the case where the average particle volume of the magnetic powder is not greater than the above-mentioned upper limit value (such as the case of 5900 nm³ or less), favorable electromagnetic conversion characteristics (e.g., C/N) can be achieved in the magnetic recording medium 10 having a high recording density. In the case where the average particle volume of the magnetic powder is not less than the above-mentioned lower limit value (such as the case of 500 nm³ or more), the dispersibility of the magnetic powder is enhanced, and further excellent electromagnetic conversion characteristics (e.g., C/N) can be achieved.

The average particle volume of the magnetic powder is obtained as follows. First, as described regarding the above-mentioned method of calculating the average particle size of the magnetic powder, the average maximum thickness $DA_{ave}$ and the average plate diameter $DB_{ave}$ are obtained. Next, an average volume V of the magnetic powder is obtained using the following formula.

$$V = \frac{3\sqrt{3}}{8} \times DA_{ave} \times DB_{ave} \times DB_{ave}$$

According to a particularly favorable embodiment of the present technology, the magnetic powder may be a barium-ferrite magnetic powder or a strontium-ferrite magnetic powder, and more favorably a barium-ferrite magnetic powder. The barium-ferrite magnetic powder includes magnetic particles of ferrioxide having barium ferrite as a main phase (hereinafter referred to as "barium ferrite particles"). The barium-ferrite magnetic powder is highly reliable in data recording such as the fact that the coercivity is maintained even in the hot and humid environment. The barium-ferrite magnetic powder is favorable for being used as the magnetic powder from this viewpoint.

The average particle size of the barium-ferrite magnetic powder may be 50 nm or less, more favorably 10 nm or more and 40 nm or less, and still more favorable 12 nm or more and 25 nm or less.

In the case where the magnetic layer 13 contains a barium-ferrite magnetic powder as a magnetic powder, the average thickness $t_m$ [nm] of the magnetic layer 13 is satisfied favorably 35 nm$\leq t_m \leq$100 nm, and is particularly favorably 80 nm or less.

Further, the coercive force Hc measured in the thickness direction (vertical direction) of the magnetic recording medium 10 is favorably 160 kA/m or more and 280 kA/m or less, more favorably 165 kA/m or more and 275 kA/m or less, and still more favorably 170 kA/m or more and 270 kA/m or less.

Embodiment in which Magnetic Powder Contains ε-Iron Oxide

According to another favorable embodiment of the present technology, favorably, the magnetic powder may include a powder of nanoparticles containing ε-iron oxide (hereinafter referred to as "ε-iron oxide particles"). The ε-iron oxide particles can achieve a high coercive force even in a state of fine particles. It is favorable that the ε-iron oxide contained in the ε-iron oxide particles have crystal orientation preferentially in the thickness direction (vertical direction) of the magnetic recording medium 10.

The ε-iron oxide particles each have a spherical shape or a substantially spherical shape, or a cubic shape or a substantially cubic shape. Since the ε-iron oxide particles each have the above-mentioned shape, in the case where ε-iron oxide particles are used as the magnetic particles, the contact area between particles in the thickness direction of the medium is reduced and aggregation of particles can be suppressed as compared with the case where barium ferrite particles each having a hexagon plate shape are used as the magnetic particles. Therefore, it is possible to enhance the dispersibility of the magnetic powder and to obtain a more favorable SNR (signal-to-noise ratio).

Figure 5:
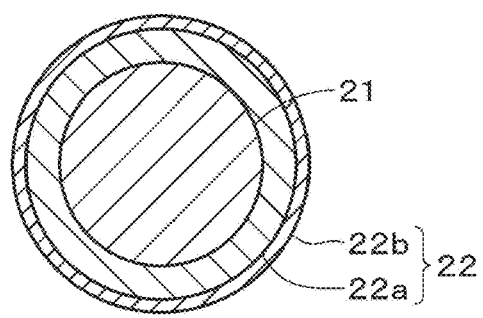
FIG. 5 is a cross-sectional view of a configuration of a magnetic particle.

The ε-iron oxide particles each have a core-shell structure. Specifically, as shown in FIG. 5, the ε-iron oxide particle includes a core portion 21 and a shell portion 22 that is provided around the core portion 21 and has a 2-layer structure. The shell portion 22 having the 2-layer structure includes a first shell portion 22a provided on the core portion 21, and a second shell portion 22b provided on the first shell portion 22a.

The core portion 21 contains ε-iron oxide. The ε-iron oxide contained in the core portion 21 favorably has an ε-$Fe_2O_3$ crystal as a main phase, and is more favorably formed of a single phase of ε-$Fe_2O_3$.

The first shell portion 22a covers at least a part of the periphery of the core portion 21. Specifically, the first shell portion 22a may partially cover the periphery of the core portion 21 or may cover the entire periphery of the core portion 21. It is favorable that the entire surface of the core portion 21 be covered from the viewpoint of making the exchange coupling between the core portion 21 and the first shell portion 22a sufficient and improving the magnetic properties.

The first shell portion 22a is a so-called soft magnetic layer, and may contain, for example, a soft magnetic material such as α-Fe, an Ni—Fe alloy, and an Fe—Si—Al alloy. α-Fe may be one obtained by reducing ε-iron oxide contained in the core portion 21.

The second shell portion 22b is an oxide coating film as an oxidation prevention layer. The second shell portion 22b may contain α-iron oxide, aluminum oxide, or silicon oxide. The α-iron oxide may contain, for example, at least one iron oxide of $Fe_3O_4$, $Fe_2O_3$, or FeO. In the case where the first shell portion 22a contains α-Fe (soft magnetic material), the α-iron oxide may be one obtained by oxidizing α-Fe contained in the first shell portion 22a.

It is possible to secure thermal stability by the ε-iron oxide particle including the first shell portion 22a as described above, and this makes it possible to maintain a coercive force Hc of the core portion 21 alone to a large value and/or to adjust the coercive force Hc of the entire ε-iron oxide particles (core-shell particles) to a coercive force Hc suitable for recording. Further, since the ε-iron oxide particle includes the second shell portion 22b as described above, it is possible to prevent the characteristics of the ε-iron oxide particle from being reduced due to occurrence of rust or the like on the particle surface by exposure of the ε-iron oxide particle to the air during and before the process of producing the magnetic recording medium 10. Therefore, it is possible to suppress characteristic deterioration of the magnetic recording medium 10.

Figure 6:
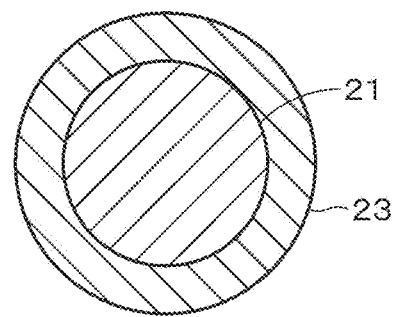
FIG. 6 is a cross-sectional view of a configuration of the magnetic particle according to a modified example.

As shown in FIG. 6, the ε-iron oxide particle may include a shell portion 23 having a single-layer structure. In this case, the shell portion 23 has a structure similar to that of the first shell portion 22a. However, from the viewpoint of suppressing the characteristic deterioration of the ε-iron oxide particle, it is more favorable that the ε-iron oxide particle include the shell portion 22 having a 2-layer structure.

The ε-iron oxide particle may contain an additive instead of the core-shell structure, or may contain an additive in addition to the core-shell structure. In these cases, some Fe of the ε-iron oxide is substituted with the additive. Also by causing the ε-iron oxide particle to contain an additive, the coercive force Hc of the entire ε-iron oxide particle can be adjusted to the coercive force Hc suitable for recording, and thus, the ease of recording can be improved. The additive is a metal element other than iron, favorably a trivalent metal element, and more favorably one or more types of metal selected from the group consisting of aluminum (Al), gallium (Ga), and indium (In).

Specifically, the ε-iron oxide containing an additive is an ε-$Fe_{2-x}M_xO_3$ crystal (here, M is a metal element other than iron, favorably a trivalent metal element, and more favorably one or more types of metal selected from the group consisting of Al, Ga, and In. x satisfies, for example, 0<x<1).

The average particle size (average maximum particle size) of the magnetic powder is, favorably, 22 nm or less, more favorably 8 nm or more and 22 nm or less, and still more favorably 12 nm or more and 22 nm or less. In the magnetic recording medium 10, a region having a size of half the recording wavelength is an actual magnetized region. For this reason, by setting the average particle size of the magnetic powder to half or less of the shortest recording wavelength, it is possible to obtain a favorable SNR. Therefore, in the case where the average particle size of the magnetic powder is 22 nm or less, favorable electromagnetic conversion characteristics (e.g., SNR) can be achieved in the magnetic recording medium 10 having a high recording density (e.g., the magnetic recording medium 10 configured to be capable of recording a signal with the shortest recording wavelength of 44 nm or less). Meanwhile, in the case where the average particle size of the magnetic powder is 8 nm or more, the dispersibility of the magnetic powder is further improved, and more favorable electromagnetic conversion characteristics (e.g., SNR) can be achieved.

The average aspect ratio of the magnetic powder is favorably 1.0 or more and 3.5 or less, more favorably 1.0 or more and 3.1 or less, and still more favorably 1.0 or more and 2.5 or less. In the case where the average aspect ratio of the magnetic powder is within the range of 1.0 or more and 3.5 or less, aggregation of the magnetic powder can be suppressed, and the resistance applied to the magnetic powder when the magnetic powder is vertically oriented in the process of forming the magnetic layer 13 can be reduced. Therefore, it is possible to improve the vertical orientation of the magnetic powder.

In the case where the magnetic powder contains ε-iron oxide particles, the average particle size and the average aspect ratio of the magnetic powder are obtained as follows.

First, the magnetic recording medium 10 to be measured is processed by an FIB (Focused Ion Beam) method or the like to make a slice. In the case of using an FIB method, as pretreatment for observing a TEM image of a cross section described below, a carbon film and a tungsten thin film are formed as protective films. The carbon film is formed on the magnetic-layer-side surface and the back-layer-side surface of the magnetic recording medium 10 by a deposition method, and the tungsten thin film is further formed on the magnetic-layer-side surface by a deposition method or sputtering method. The slicing is performed along the length direction (longitudinal direction) of the magnetic recording medium 10. That is, the slicing forms a cross section parallel to both the longitudinal direction and the thickness direction of the magnetic recording medium 10.

The cross section of the obtained slice sample is observed at an acceleration voltage: 200 kV and the total magnification of 500,000 using a transmission electron microscope (H-9500 manufactured by Hitachi High-Technologies Corporation) so that the entire magnetic layer 13 is included in the thickness direction of the magnetic layer 13, and a TEM photograph is taken. Next, 50 particles in which the shape of the particle can be clearly observed are selected from the taken TEM photograph, and a major axis length DL and a minor axis length DS of each of the particles are measured. Here, the major axis length DL means the largest one (so-called maximum Feret diameter) of distances between two parallel lines drawn from all angles so as to contact the outline of each particle. Meanwhile, the minor axis length DS means the largest one of lengths of the particle in the direction perpendicular to the major axis (DL) of the particle.

Subsequently, the major axis lengths DL of the 50 measured particles are simply averaged (arithmetic average) to obtain an average major axis length $DL_{ave}$. The average major axis length $DL_{ave}$ thus obtained is taken as the average particle size of the magnetic powder. Further, the minor axis lengths DS of the 50 measured particles are simply averaged (arithmetic average) to obtain an average minor axis length $DS_{ave}$. Then, on the basis of the average major axis length $DL_{ave}$ and the average minor axis length $DS_{ave}$, the average aspect ratio ($DL_{ave}/DS_{ave}$) of the particles is obtained.

The average particle volume of the magnetic powder is favorably 5500 nm³ or less, more favorably 270 nm³ or more and 5500 nm³ or less, and still more favorably 900 nm³ or more and 5500 nm³ or less. In the case where the average particle volume of the magnetic powder is 5500 nm³ or less, effects similar to those in the case where the average particle size of the magnetic powder is 22 nm or less. Meanwhile, in the case where the average particle volume of the magnetic powder is 270 nm³ or more, effects similar to those in the case where the average particle size of the magnetic powder is 8 nm or more are obtained.

In the case where the ε-iron oxide particle has a spherical shape or a substantially spherical shape, the average particle volume of the magnetic powder is obtained as follows. First, similarly to the above-mentioned method of calculating the average particle size of the magnetic powder, the average major axis length $DL_{ave}$ is obtained. Next, the average volume V of the magnetic powder is obtained using the following formula.

$$V=(\pi/6) \times D_{Lave}^3$$

In the case where the ε-iron oxide particle has a cubic shape, the average volume of the magnetic powder is obtained as follows.

The magnetic recording medium 10 is processed by an FIB (Focused Ion Beam) method or the like to make a slice. In the case of using an FIB method, as pretreatment for observing a TEM image of a cross section described below, a carbon film and a tungsten thin film are formed as protective films. The carbon film is formed on the magnetic-layer-side surface and the back-layer-side surface of the magnetic recording medium 10 by a deposition method, and the tungsten thin film is further formed on the magnetic-layer-side surface by a deposition method or sputtering method. The slicing is performed along the length direction (longitudinal direction) of the magnetic recording medium 10. That is, the slicing forms a cross section parallel to both the longitudinal direction and the thickness direction of the magnetic recording medium 10.

The obtained slice sample is observed at an acceleration voltage: 200 kV and the total magnification of 500,000 using a transmission electron microscope (H-9500 manufactured by Hitachi High-Technologies Corporation) so that the entire magnetic layer 13 is included in the thickness direction of the magnetic layer 13, and a TEM photograph is taken. Note that the magnification and acceleration voltage may be appropriately adjusted depending on the type of the apparatus.

Next, 50 particles in which the shape of the particle is clear are selected from the taken TEM photograph, and a side length DC of each particle is measured. Subsequently, the side lengths DC of the 50 measured particles are simply averaged (arithmetic average) to obtain an average side length $DC_{ave}$. Next, the average volume $V_{ave}$ (particle volume) of the magnetic powder is obtained on the basis of the following formula using the average side length $DC_{ave}$.

$$V_{ave}=DC_{ave}^3$$

Embodiment in which Magnetic Powder Contains Co-Containing Spinel Ferrite

According to yet another favorable embodiment of the present technology, the magnetic powder may include a powder of nanoparticles containing Co-containing spinel ferrite (hereinafter also referred to as "cobalt ferrite particles"). That is, the magnetic powder may be a cobalt-ferrite magnetic powder. The cobalt ferrite particles favorably have uniaxial crystal anisotropy. The cobalt ferrite particles each have, for example, a cubic shape or a substantially cubic shape. The Co-containing spinel ferrite may further contain one or more types selected from the group consisting of Ni, Mn, Al, Cu, and Zn in addition to Co.

The cobalt ferrite has, for example, an average composition represented by Formula (1) indicated below.

$$Co_xM_yFe_2O_z \quad (1)$$

(Here, in Formula (1), M is, for example, one or more types of metal selected from the group consisting of Ni, Mn, Al, Cu, and Zn. x is a value within the range of 0.4≤x≤1.0. y is a value within the range of 0≤y≤0.3. However, x and y satisfy the relationship of (x+y)≤1.0. z is a value within the range of 3≤z≤4. Some Fe may be substituted with another metal element.)

The average particle size of the cobalt-ferrite magnetic powder is favorably 25 nm or less, and more favorably 23 nm or less. The coercive force Hc of the cobalt-ferrite magnetic powder is favorably 2500 Oe or more, and more favorably 2600 Oe or more and 3500 Oe or less.

In the case where the magnetic powder includes a powder of the cobalt ferrite particles, the average particle size of the magnetic powder is favorably 25 nm or less, and more favorably 10 nm or more and 23 nm or less. In the case where the average particle size of the magnetic powder is 25 nm or less, favorable electromagnetic conversion characteristics (e.g., SNR) can be achieved in the magnetic recording medium 10 having a high recording density. Meanwhile, in the case where the average particle size of the magnetic powder is 10 nm or more, the dispersibility of the magnetic powder is further enhanced and further excellent electromagnetic conversion characteristics (e.g., SNR) can be achieved. In the case where the magnetic powder includes a powder of the cobalt ferrite particles, the average aspect ratio and the average particle size of the magnetic powder are obtained by a method similar to the method used in the case where the magnetic powder contains ε-iron oxide particles.

The average particle volume of the magnetic powder is favorably 15000 nm³ or less, and more favorably 1000 nm³ or more and 12000 nm³ or less. In the case where the average particle volume of the magnetic powder is 15000 nm³ or less, effects similar to those in the case where the average particle size of the magnetic powder is 25 nm or less can be achieved. Meanwhile, in the case where the average particle volume of the magnetic powder is 1000 nm³ or more, effects similar to those in the case where the average particle size of the magnetic powder is 10 nm or more can be achieved. Note that the average particle volume of the magnetic powder is similar to the method of calculating the average particle volume in the case where the ε-iron oxide particle has a cubic shape.

(Lubricant)

The magnetic layer contains a lubricant. The lubricant may be one type or two or more types selected from fatty acids and/or fatty acid esters, and may favorably contain both a fatty acid, and a fatty acid ester. The magnetic layer contains a lubricant, and particularly, the magnetic layer contains both a fatty acid, and a fatty acid ester, which contributes toward improvement in the travelling stability of the magnetic recording medium. In more particular, the magnetic layer contains a lubricant and includes pores, thereby achieving favorable travelling stability. The improvement in the travelling stability is because the dynamic friction coefficient on the magnetic-layer-side surface of the magnetic recording medium is adjusted with the lubricant to a value suitable for travelling of the magnetic recording medium.

The fatty acid may favorably be a compound represented by General Formula (1) or (2) indicated below. For example, as a fatty acid, one of a compound represented by General Formula (1) indicated below and a compound represented by General Formula (2) indicated below or both of them may be contained.

Further, the fatty acid ester may favorably be a compound represented by General Formula (3) or (4) indicated below. For example, as a fatty acid ester, one of a compound represented by General Formula (3) indicated below and a compound represented by General Formula (4) indicated below or both of them may be contained.

In the case where the lubricant contains one of the compound represented by General Formula (1) indicated below and the compound represented by General Formula (2) indicated below or both of them, and one of the compound represented by General Formula (3) indicated below and the compound represented by the General Formula (4) indicated below or both of them, which makes it possible to suppress the increase in the dynamic friction coefficient due to repeated recording or reproduction of the magnetic recording medium.

$$CH_3(CH_2)_kCOOH \quad (1)$$

(Here, in General Formula (1) indicated above, k is an integer selected from the range of 14 or more and 22 or less, and more favorably the range of 14 or more and 18 or less.)

$$CH_3(CH_2)_nCH=CH(CH_2)_mCOOH \quad (2)$$

(Here, in General Formula (2) indicated above, the sum of n and m is an integer selected from the range of 12 or more and 20 or less, and more favorably the range of 14 or more and 18 or less.)

$$CH_3(CH_2)_pCOO(CH_2)_qCH_3 \quad (3)$$

(Here, in General Formula (3) indicated above, p is an integer selected from the range of 14 or more and 22 or less, and more favorably 14 or more and 18 or less, and q is an integer selected from the range of 2 or more and 5 or less, and more favorably the range of 2 or more and 4 or less.)

$$CH_3(CH_2)_rCOO—(CH_2)_sCH(CH_3)_2 \quad (4)$$

(Here, in General Formula (4) indicated above, r is an integer selected from the range of 14 or more and 22 or less, and s is an integer selected from the range of 1 or more and 3 or less.)

(Binder)

It is favorable that a resin having a structure obtained by performing a crosslinking reaction on a polyurethane resin or a vinyl chloride resin be used as a binder. However, the binder is not limited to them, and another resin may be appropriately blended depending on the physical properties or the like necessary for the magnetic recording medium 10. Typically, the resin to be blended is not particularly limited as long as it is a resin generally used in the coating-type magnetic recording medium 10.

For example, one type or a combination of two or more types selected from the group consisting of polyvinyl chloride, polyvinyl acetate, a vinyl chloride-vinyl acetate copolymer, a vinyl chloride-vinylidene chloride copolymer, a vinyl chloride-acrylonitrile copolymer, an acrylate ester-acrylonitrile copolymer, an acrylate ester-vinyl chloride-vinylidene chloride copolymer, an acrylate ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyester resin, an amino resin, and synthetic rubber, may be used as the binder.

Further, a thermosetting resin or a reactive resin may be used as the binder. Examples of the thermosetting resin or the reactive resin include a phenol resin, an epoxy resin, a urea resin, a melamine resin, an alkyd resin, a silicone resin, a polyamine resin, and a urea formaldehyde resin.

Furthermore, in order to improve the dispersibility of the magnetic powder, polar functional groups such as $—SO_3M$, $—OSO_3M$, $—COOM$, and $P=O(OM)_2$ may be introduced into the respective binders mentioned above. Here, M in the formula is a hydrogen atom or an alkali metal such as lithium, potassium, and sodium.

Moreover, examples of the polar functional group include a side-chain type having a terminal group of $—NR1R2$ or $—NR1R2R3^+X^-$, and a main-chain type of $>NR1R2^+X^-$. Here, R1, R2, and R3 are a hydrogen atom or a hydrocarbon group independently of one another, and $X^-$ is, for example, a halogen element ion such as fluorine, chlorine, bromine, and iodine, or an inorganic or organic ion). Further, examples of the polar functional group also include —OH, —SH, —CN, and an epoxy group.

(Additive)

The magnetic layer 13 may further contain, as a non-magnetic reinforcing particle, aluminum oxide (α, β, or γ alumina), chromium oxide, silicon oxide, diamond, garnet, emery, boron nitride, titanium carbide, silicon carbide, titanium carbide, titanium oxide (rutile or anatase titanium oxide), or the like.

(Underlayer)

The underlayer 12 is a non-magnetic layer that contains a non-magnetic powder and a binder as a main component. The underlayer 12 further contains a lubricant. Regarding the above-mentioned descriptions of the binder and the lubricant contained in the magnetic layer 13, the same applies to the binder and the lubricant contained in the underlayer 12. The underlayer 12 may further contain, as necessary, at least one additive of, for example, a conductive particle, a curing agent, or a rust inhibitor.

The average thickness of the underlayer 12 is favorably not less than 0.6 µm and not more than 2.0 µm, and more favorably not less than 0.8 µm and not more than 1.4 µm. Note that the average thickness of the underlayer 12 is obtained similarly to the average thickness $t_m$ of the magnetic layer 13. Note that the magnification of the TEM image is appropriately adjusted in accordance with the thickness of the underlayer 12.

The underlayer 12 may include a pore. That is, the underlayer 12 may be provided with a large number of pores. The pores of the underlayer 12 may be formed, for example, by pores being formed in the magnetic layer 13, and in particular, by a large number of protrusions being pressed against the magnetic-layer-side surface of the magnetic recording medium 10, the large number of protrusions being provided on the back-layer-side surface. That is, pores may be formed in the magnetic layer 13 and the underlayer 12 by a concave that corresponds to the shape of the protrusion being formed on the magnetic-layer-side surface.

Further, the pores may be formed in the process of drying a coating material for forming a magnetic layer, due to volatilization of a solvent. Furthermore, when the surface of the underlayer 12 is coated with a coating material for forming a magnetic layer in order to form the magnetic layer 13, a solvent contained in the coating material for forming a magnetic layer may pass through pores of the underlayer 12 that are formed at the time of coating and drying a lower layer, and then the solvent may penetrate into the underlayer 12. After that, when the solvent that has penetrated into the underlayer 12 volatilizes in the process of drying the magnetic layer 13, pores may be formed by the solvent that has penetrated into the underlayer 12 moving from the underlayer 12 to the surface of the magnetic layer 13. For example, the pores formed as described above may cause the magnetic layer 13 and the underlayer 12 to communicate with each other. The average diameter of the pores can be adjusted by changing the solid content in the coating material for forming a magnetic layer or the type of the solvent in the coating material for forming a magnetic layer, and/or the dry conditions of the coating material for forming a magnetic layer.

Due to pores being formed in both the magnetic layer 13 and the underlayer 12, a lubricant in an amount suitable to improve the travelling stability appears on the magnetic-layer-side surface.

(Non-Magnetic Powder)

The non-magnetic powder contained in the underlayer 12 may include, for example, at least one type selected from the group consisting of an inorganic particle and an organic particle. One type of the non-magnetic powder may be used alone, or two or more types of the non-magnetic powder may be used in combination. The inorganic particle contains, for example, one type or a combination of two or more types selected from the group consisting of a metal, a metal oxide, a metal carbonate, a metal sulfate, a metal nitride, a metal carbide, and a metal sulfide. More specifically, the inorganic particle may be, for example, one type or two or more types selected from the group consisting of iron oxyhydroxide, hematite, titanium oxide, and carbon black. Examples of the shape of the non-magnetic powder include, but not particularly limited to, various shapes such as a needle shape, a spherical shape, a cubic shape, and a plate shape.

(Back Layer)

The back layer 14 may contain a binder and a non-magnetic powder. The back layer 14 may further contain, as necessary, various additives such as a lubricant, a curing agent, and an antistatic agent. Regarding the above-mentioned descriptions of the binder and the non-magnetic powder contained in the underlayer 12, the same applies to the binder and the non-magnetic powder contained in the back layer 14.

It is favorable that the average thickness $t_b$ of the back layer 14 satisfy $t_b \leq 0.6$ µm. In the case where the average thickness $t_b$ of the back layer 14 is within the above-mentioned range, the thicknesses of the underlayer 12 and the base layer 11 can be kept thick even in the case where the average thickness $t_T$ of the magnetic recording medium 10 satisfies $t_T \leq 5.5$ µm. This makes it possible to maintain the travelling stability of the magnetic recording medium 10 in the recording/reproduction apparatus.

An average thickness $t_b$ of the back layer 14 is obtained as follows. First, an average thickness $t_T$ of the magnetic recording medium 10 is measured. The method of measuring the average thickness $t_T$ is as described in "(3) Physical Properties and Structure" below. Subsequently, the back layer 14 of the sample is removed with a solvent such as MEK (methyl ethyl ketone) or dilute hydrochloric acid. Next, the laser hologauge (LGH-110C) manufactured by Mitsutoyo Corporation is used for measuring the thickness of the sample at five or more points, and the measured values are simply averaged (arithmetic average) to calculate an average value $t_B$ [µm]. After that, the average thickness $t_b$ [µm] of the back layer 14 is obtained using the following formula. Note that the measurement positions are randomly selected from the sample.

$$t_b \text{ [µm]} = t_T \text{ [µm]} - t_B \text{ [µm]}$$

Of two surfaces of the back layer 14, a surface forming the back-layer-side surface of the magnetic recording medium 10 is favorably provided with a large number of protrusions. A large number of pores may be formed in the magnetic layer 13 by the magnetic recording medium 10 being wound up in a roll shape.

The protrusion may be formed, for example, by a coating material for forming a back layer containing particles. The particle may be an inorganic particle such as carbon black. The particle size of the particle may be appropriately selected depending on the size of a pore to be formed in the magnetic layer 13.

The average particle size of the particles (in particular, inorganic particles) contained in the back layer 14 is favorably not less than 10 nm and not more than 150 nm, and more favorably not less than 15 nm and not more than 110 nm. The average particle size of the inorganic particle is obtained similarly to the average particle size of the above-mentioned ε-iron oxide magnetic powder.

(3) Physical Properties and Structure (Average Thickness $t_T$ of Magnetic Recording Medium)

The average thickness $t_T$ of the magnetic recording medium 10 may satisfy $t_T \leq 5.6$ µm, and may be more favorably 5.3 µm or less, and still more favorably 5.2 µm or less, 5.0 µm or less, or 4.6 µm or less. Due to the average thickness $t_T$ of the magnetic recording medium 10 being within the above-mentioned numerical range (such as due to $t_T \leq 5.6$ μm being satisfied), the recording capacity of one data cartridge can be increased as compared with that in the past. The lower limit value of the average thickness $t_T$ of the magnetic recording medium 10 is not particularly limited, but is, for example, 3.5 μm$\leq t_T$.

The average thickness $t_T$ of the magnetic recording medium 10 is obtained as follows. First, the magnetic recording medium 10 having a width of ½ inch is prepared and cut into a 250 mm length to prepare a sample. Next, the thickness of the sample is measured at five or more points by using the laser hologauge (LGH-110C) manufactured by Mitsutoyo Corporation as a measurement apparatus, and the measured values are simply averaged (arithmetic average) to calculate the average value $t_T$[μm]. Note that the measurement positions are randomly selected from the sample.

(Average Diameter of Pores of Magnetic Recording Medium)

The average diameter of pores (the pore diameter of the maximum pore volume at the time of attachment/detachment) of the magnetic recording medium 10 measured in a state where a lubricant has been removed from the magnetic recording medium 10 and the magnetic recording medium 10 has been dried, is 6 nm or more and 11 nm or less, favorably 6 nm or more and 10 nm or less, more favorably 6.5 nm or more and 10 nm or less, and still more favorably 7 nm or more and 9 nm or less.

The average diameter of pores (the pore diameter of the maximum pore volume at the time of attachment/detachment) that are formed in the magnetic recording medium 10, is measured in a state where a lubricant has been removed from the magnetic recording medium and the magnetic recording medium has been dried. Specifically, the measurement is performed as follows.

First, the magnetic recording medium 10 having a size approximately 10% larger than the area 0.1265 m² is soaked in hexane (with the amount that the tape can be sufficiently immersed, for example, 150 mL) for 24 hours, and then is naturally dried and cut out to a size of the area 0.1265 m² (for example, both ends of the dried tape are cut off by 50 cm to prepare a tape width×10 m) to prepare a measurement sample. The lubricant is removed from the magnetic recording medium 10 due to the immersion in hexane for 24 hours, and the magnetic recording medium 10 is dried due to the natural drying.

Next, the average pore diameter is measured by a BJH method using the specific surface area/pore distribution measurement apparatus. The measurement apparatus and measurement conditions are shown in the following. In this way, the average diameter of the pores is measured.

Measurement environment: room temperature
Measurement apparatus: 3FLEX manufactured by Micromeritics Instrument Corp.
Measurement adsorbate: $N_2$ gas
Measured pressure range)(P/P°): 0-0.995

Regarding the measured pressure range, the pressure is changed as shown in the following table. The pressure values in the following table are each a relative pressure P/P°. For example, in Step 1 in the following table, the pressure is changed from the starting pressure 0.000 to the ultimate pressure 0.010 by 0.001 per 10 seconds. When the pressure reaches the ultimate pressure, the pressure change in the next step is performed. The same applies to Steps 2-10. However, in the case where the pressure does not reach equilibrium in each step, the apparatus moves on to the next step after the pressure reaches equilibrium.

| Step | Starting pressure | Pressure change | Ultimate pressure |
|---|---|---|---|
| 1 | 0.000 | 0.001/10 sec | 0.010 |
| 2 | 0.010 | 0.02/10 sec | 0.100 |
| 3 | 0.100 | 0.05/10 sec | 0.600 |
| 4 | 0.600 | 0.05/10 sec | 0.950 |
| 5 | 0.950 | 0.05/10 sec | 0.990 |
| 6 | 0.990 | 0.05/10 sec | 0.995 |
| 7 | 0.995 | 0.01/10 sec | 0.990 |
| 8 | 0.990 | 0.01/10 sec | 0.950 |
| 9 | 0.950 | 0.05/10 sec | 0.600 |
| 10 | 0.600 | 0.05/10 sec | 0.300 |

(Statistical Value $\sigma_{SW}$ Indicating Non-Linearity of Servo Band)

The statistical value $\sigma_{SW}$ obtained from a servo signal of a servo pattern recorded in the magnetic layer 13 is 24 nm or less, and favorably 23 nm or less. The travelling stability of the magnetic recording medium can be improved due to the statistical value $\sigma_{SW}$ being within this numerical range.

The statistical value $\sigma_{SW}$ indicating the non-linearity of a servo band is measured using a tape travelling apparatus (Tape Transportation (Mountain Engineering II, Inc.)) including a magnetic head for reading the servo patterns recorded on the surface of the magnetic layer 13 of the magnetic recording medium 10. The magnetic head may be one that is employed in a commercially available LTO8 full height drive. The magnetic head is used in a state of being fixed to the tape travelling apparatus.

Using the tape travelling apparatus, the magnetic recording medium 10 is caused to travel at 2 m/s so that the magnetic-layer-side surface slides on the surface of the magnetic head. Using the reading element on the surface of the magnetic head, the reproduction waveform of the servo signal is read from the servo patterns of the magnetic recording medium 10 using a digital oscilloscope. That is, a magnetic servo pattern is converted into an electrical servo signal. In order to acquire the reproduction waveform of the servo signal with sufficient accuracy, the sampling rate of the digital oscilloscope is 20,000,000 or more per second.

In order to read the servo patterns recorded in one servo band, two reading elements arranged side by side in the longitudinal direction of the magnetic recording medium 10 are used. The two reading elements are included in the magnetic head unit adopted in an LTO8 full height drive. The two reading elements will be described below with reference to FIG. 11.

Figure 11:
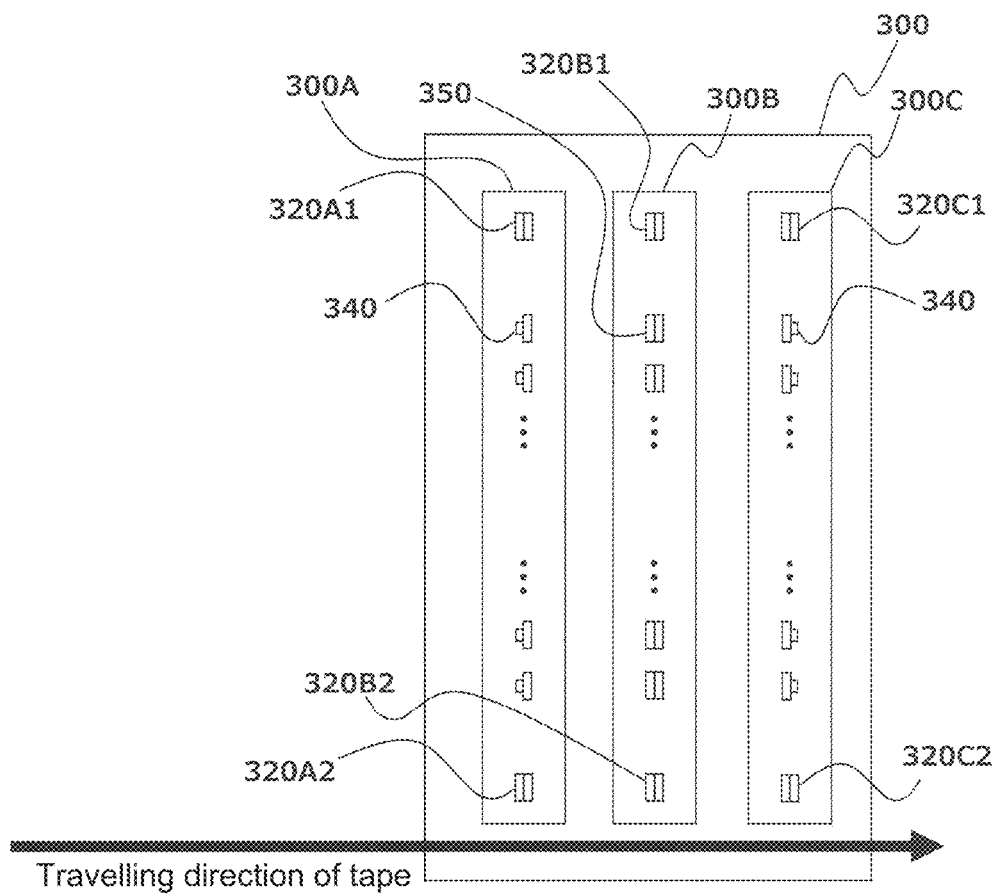
FIG. 11 is a schematic diagram of a head unit used in measuring a statistical value $\sigma_{SW}$.

FIG. 11 is a schematic diagram of the magnetic head unit. A head unit 300 shown in FIG. 11 includes three head units 300A, 300B, and 300C arranged side by side along the longitudinal direction of the magnetic recording medium 10.

The head unit 300A includes two servo heads 320A1 and 320A2 and a plurality of recording heads 340. Ellipsis-like points in the head unit 300A means that the recording heads 340 are arranged.

The head unit 300B includes two servo heads 320B1 and 320B2 and a plurality of reproduction heads 350. Ellipsis-like points in the head unit 300B means that the reproduction heads 350 are arranged.

The head unit 300C includes two servo heads 320C1 and 320C2 and a plurality of recording heads 340. Ellipsis-like points in the head unit 300C means that the recording heads 340 are arranged.

The two reading elements used for acquiring the statistical value $\sigma_{SW}$ are only the servo head 320A1 included in the head unit 300A and the servo head 320B1 included in the head unit 300B. Other servo heads are not used therefor.

Hereinafter, of the two reading elements, a reading element (servo head 320A1) on the unwinding side will also be referred to as the reading element a and a reading element (servo head 320B1) on the winding side will also be referred to as a reading element b.

The reproduction waveform of the servo signal acquired by each reading element is acquired by a digital oscilloscope or the like. On the basis of the respective acquired servo signals, "a relative difference p between the center line of the servo pattern and the actual passing position of the reading element on the servo pattern" is calculated. Specifically, the relative difference p is calculated using the shape of the acquired reproduction waveform of the servo signal and the shape of the servo pattern itself.

The relative difference p is calculated by the following calculation formula.

$$\text{Relative difference } p[um] = \frac{x[um] - \begin{bmatrix} (B_{a1} - A_{a1}) + (B_{a2} - A_{a2}) + (B_{a3} - A_{a3}) + (B_{a4} - A_{a4}) + \\ (D_{a1} - C_{a1}) + (D_{a2} - C_{a2}) + (D_{a3} - C_{a3}) + (D_{a4} - C_{a4}) \\ (C_{a1} - A_{a1}) + (C_{a2} - A_{a2}) + (C_{a3} - A_{a3}) + (C_{a4} - A_{a4}) + \\ (A'_{a1} - C_{a1}) + (A'_{a2} - C_{a2}) + (A'_{a3} - C_{a3}) + (A'_{a4} - C_{a4}) \end{bmatrix} \times Y[um]}{2 \times \tan\varphi}$$

The above-mentioned calculation formula of the relative difference p will be described below with reference to FIG. 4. The above-mentioned difference ($B_{a1}-A_{a1}$) in the above-mentioned calculation formula is a difference [sec] between the time when the stripe $B_1$ is read by the reading element a and the time when the stripe $A_1$ is read by the reading element a, and is obtained on the basis of the intervals between the signal peak due to the stripe $A_1$ and the signal peak due to the stripe $B_1$, and the tape travelling speed (m/s). The intervals between the two signal peaks are obtained on the basis of the shape of the obtained reproduction waveform of the servo signal. The difference ($B_{a1}-A_{a1}$) corresponds to a difference between timings at which both of the stripes are read at the actual travelling position (actual path in FIG. 4) of the reading element on the servo pattern. Similarly, other difference terms can be obtained on the basis of intervals between signal peaks due to two corresponding stripes, and the tape travelling speed. Further, the relative difference p is calculated similarly on the basis of the signal peak acquired by the reading element b.

An azimuth angle φ in the above-mentioned calculation formula is obtained on the basis of the shape of the servo pattern itself. The azimuth angle φ is obtained by developing the magnetic recording medium 10 with a ferricolloid developer (manufactured by SIGMA HI-CHEMICAL INC., Sig-Marker Q) and using a universal tool microscope (TOPCON TUM-220ES) and a data processing apparatus (TOPCON CA-1B).

Further, the distance between the stripe $A_1$ and the strip $B_1$ (X in FIG. 4 and the above-mentioned calculation formula) in the center of the servo band (center line in FIG. 4) and the distance between the stripe $A_1$ and the strip $C_1$ (Y in FIG. 4 and the above-mentioned calculation formula) are obtained on the basis of the shape of the servo pattern itself. Fifty servo frames are selected at arbitrary locations in the tape length direction, X and Y are obtained in each servo frame, and those obtained by simply averaging 50 pieces of data are taken as X and Y used in the above-mentioned calculation formula.

The relative difference p is calculated for each of 1024 consecutive servo subframes along the longitudinal direction of the magnetic recording medium 10. That is, 1024 relative differences p are acquired. For example, in the case where the intervals between servo subframes are 76 μm, the relative difference p may be acquired every 76 μm.

The 1024 relative differences p calculated on the basis of the servo signal read by the reading element a will be referred to as $pa_0$, $pa_1$, . . . , and $pa_{1023}$. The 1024 relative differences p calculated on the basis of the servo signal read by the reading element b will be referred to as $pb_0$, $pb_1$, . . . , and $pb_{1023}$.

In order to eliminate the influence of the movement of the magnetic recording medium 10 in the width direction on the magnetic head, a difference between pa and pb at each position n is calculated as Δp. That is, $\Delta p_n = pa_n - pb_n$. Here, n=0, 1, . . . , and 1023.

Discrete FFT (Fourier transform) is performed on the obtained $\Delta p_n$ to obtain $\Delta p_n$ (n=0 . . . 1023), i.e., ΔP(f) (where f=wave number [cycle/m]).

Here, in order to remove the DC component (i.e., n=0) of $\Delta p_n$, in other words, ΔP(∞), $\Delta P_0$ is replaced with a numerical value substantially close to 0 such as $10^{-100}$.

Further, the FFT is performed so that the unit of ΔP(f) is [nm²/Hz].

The process of obtaining ΔP(f) is repeated in the longitudinal direction of the magnetic recording medium 10 over 500 m or more to obtain $\Delta P(f)_1$ . . . $\Delta P(f)_m$.

In order to remove measurement noise, $\Delta P(f)_1$ . . . $\Delta P(f)_m$ are averaged on the frequency axis to obtain $\Delta P(f)_{ave}$.

After that, in order to estimate behavior WIP(f) of the above-mentioned displacement difference during actual drive, a general second-order closed-loop response filter CLF(f) is applied to $\Delta P(f)_{ave}$. That is, WIP(f)=|CLF(f)|²*ΔP$(f)_{ave}$. CLF(f) will be described below.

Calculation of Formula (1) indicated below is performed using the above-mentioned WIP(f) to obtain $\sigma_{SW}$. Also df in the following calculation will be described below.

$$\sigma_{SW} = \sqrt{\sum WIP(f) * df} \qquad (1)$$

The general second-order closed-loop response CLF(s) can be represented by Formula (2) indicated below.

$$CLF(s) = \frac{s^2}{s^2 + 2s\zeta\omega_0 + \omega_0^2} \qquad (2)$$

By using bilinear Z transformation, CLF(z) can be represented by Formula (3) indicated below.

$$CLF(z) = \frac{K_1(z-1)^2}{z^2 + K_2 z + K_3} \quad (3)$$

From the relationship of $z=e^{j\omega Ts}$ and $\omega=2\pi f$, CLF(f) can be represented by Formula (4) indicated below.

$$CLF(f) = \frac{K_1\left(e^{j(2\pi f)Ts} - 1\right)^2}{e^{2j(2\pi f)Ts} + K_2 e^{j(2\pi f)Ts} + K_3} \quad (4)$$

The meaning of each term in the formulae described above is as follows.

Ts: Data interval [m/cycle]=76×10$^{-6}$ [m/cycle]
j: Imaginary unit $$K_1 = \frac{K_s^2}{K_s^2 + 2\zeta\omega_0 K_s + \omega_0^2} \qquad K_s = 2F_s$$

$$K_2 = \frac{2(\omega_0^2 - K_s^2)}{K_s^2 + 2\zeta\omega_0 K_s + \omega_0^2} \qquad \omega_0 = 2\pi F_0$$

$$K_3 = \frac{K_s^2 - 2\zeta\omega_0 K_s + \omega_0^2}{K_s^2 + 2\zeta\omega_0 K_s + \omega_0^2} \qquad F_0 = F_r\sqrt{1-2\zeta^2}$$

$$\zeta = \frac{\sqrt{1 - \sqrt{1 - \frac{1}{MP^2}}}}{2}$$

$Fs$[cycle/m] $= 1/Ts = 13157.9$[cycle/m]

$df$: Wave number interval [cycle/m] $= \frac{Fs/2}{1024/2} = 12.850$[cycle/m]

$Fr$: Peak wave number of filter [cycle/m] $= 410$ $MP$: Filter gain [a.u.] $= 10^{(10[dB]/20)0}$ (Friction Coefficient Ratio ($\mu_B/\mu_A$))

In the magnetic recording medium 10, a friction coefficient ratio ($\mu_B/\mu_A$) of a dynamic friction coefficient $\mu_B$ to a dynamic friction coefficient $\mu_A$ is favorably 1.0-2.0, more favorably 1.0-1.8, and still more favorably 1.0-1.6, the dynamic friction coefficient μB being a coefficient of dynamic friction between the magnetic-layer-side surface of the magnetic recording medium 10 and the magnetic head in a state where a tension of 1.2 N is being applied in the longitudinal direction of the magnetic recording medium, the dynamic friction coefficient $\mu_A$ being a coefficient of dynamic friction between the magnetic-layer-side surface of the magnetic recording medium and the magnetic head in a state where a tension of 0.4 N is being applied in the longitudinal direction of the magnetic recording medium. Due to the friction coefficient ratio ($\mu_B/\mu_A$) being within the above-mentioned numerical range, the change in the dynamic friction coefficient due to a tension fluctuation during travelling can be reduced, and this makes it possible to make the travelling of the magnetic recording medium 10 stable.

The dynamic friction coefficient $\mu_A$ and the dynamic friction coefficient $\mu_B$ for calculating the friction coefficient ratio ($\mu_B/\mu_A$) are obtained as follows.

Figure 7:
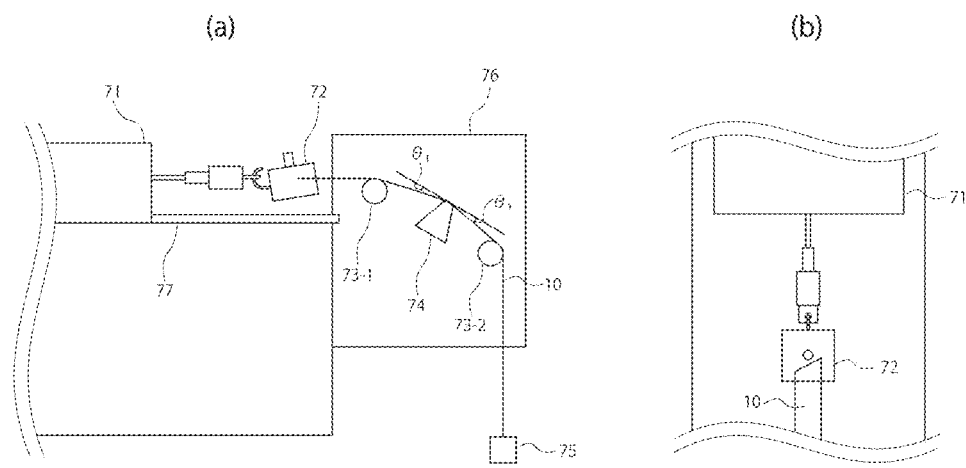
FIG. 7 is a diagram describing a method of measuring a coefficient of friction between a magnetic surface and a magnetic head.

First, as shown in (a) of FIG. 7, the magnetic recording medium 10 having a width of ½ inch is placed on two guide rolls 73-1 and 73-2 each having a cylindrical shape having a diameter of one inch disposed in parallel to be apart from each other so that the magnetic surface is in contact with the guide rolls 73-1 and 73-2. The two the guide rolls 73-1 and 73-2 are fixed to a hard plate member 76, and thus, the positional relationship between them is fixed.

Subsequently, the magnetic recording medium 10 is caused to be in contact with a head block (for recording/reproduction) 74 mounted on the LTO5 drive so that the magnetic surface is in contact with the head block 74 and a wrap angle $\theta_1$ (°)=5.6°. The head block 74 is disposed substantially at the center of the guide rolls 73-1 and 73-2. The head block 74 is movably attached to the plate member 76 so that the wrap angel $\theta_1$ can be changed. However, in the case where the wrap angle $\theta_1$ (°) becomes 5.6°, the position is fixed to the plate member 76, thereby also fixing the positional relationship between the guide rolls 73-1 and 73-2 and the head block 74.

One end of the magnetic recording medium 10 is connected to a movable strain gauge 71 via a jig 72. As shown in (b) of FIG. 7, the magnetic recording medium 10 is fixed to the jig 72.

A weight 75 is connected to the other end of the magnetic recording medium 10. The weight 75 applies a tension of 0.4 N ($T_0$ [N]) in the longitudinal direction of the magnetic recording medium 10.

The movable strain gauge 71 is fixed on a base 77. Also the positional relationship between the base 77 and the plate member 76 is fixed, and thus, the positional relationship between the guide rolls 73-1 and 73-2, the head block 74, and the movable strain gauge 71 is fixed.

The movable strain gauge 71 slides the magnetic recording medium 10 on the head block 74 by 60 mm so that the magnetic recording medium 10 moves to the movable strain gauge 71 at 10 mm/s. The output value (voltage) of the movable strain gauge 71 during the sliding is converted into T [N] on the basis of the linear relationship (described below) between the output value and the load acquired in advance. T [N] is acquired 13 times during the period from the start to stop of the 60 mm sliding, and the eleven T [N]'s excluding the first one and the last one are simply averaged, thereby obtaining $T_{ave}$ [N].

After that, the dynamic friction coefficient $\mu_A$ is obtained using the following formula.

$$\mu_A = \frac{1}{(\theta_1[°]) \times (\prod/180)} \times \ln\left(\frac{T_{ave}[N]}{T_0[N]}\right)$$

The linear relationship is obtained as follows. That is, the output values (voltage) of the movable strain gauge 71 both in the case where a load of 0.4 N is applied to the movable strain gauge 71 and in the case where a load of 1.5 N is applied to the movable strain gauge 71 are obtained. The linear relationship between the output value and the load is obtained on the basis of the two obtained output values and the two loads. Using the linear relationship, the output value (voltage) of the movable strain gauge 71 during sliding is converted into T [N] as described above.

The dynamic friction coefficient $\mu_B$ is measured by the same method as the method of measuring the dynamic friction coefficient $\mu_A$ except that the tension $T_0$ [N] to be applied to the other end is set to 1.2 N.

On the basis of the dynamic friction coefficient $\mu_A$ and the dynamic friction coefficient $\mu_B$ measured in this way, the friction coefficient ratio ($\mu_B/\mu_A$) is calculated.

(Friction Coefficient Ratio ($\mu_{C(1000)}/\mu_{C(5)}$))

Regarding the magnetic recording medium 10, the friction coefficient ratio ($\mu_{C(1000)}/\mu_{C(5)}$) of a dynamic friction coefficient $\mu_{C(1000)}$ to a dynamic friction coefficient $\mu_{C(5)}$ is favorably 1.0-2.0, more favorably 1.0-1.8, and still more favorably 1.0-1.6, the dynamic friction coefficient $\mu_{C(1000)}$ being a coefficient of dynamic friction upon the 1000th reciprocation when the magnetic recording medium to which a tension of 0.6 N is being longitudinally applied is caused to reciprocate on the magnetic head 1000 times, the dynamic friction coefficient $\mu_{C(5)}$ being a coefficient of dynamic friction upon the fifth reciprocation when the magnetic recording medium to which the tension of 0.6 N is being longitudinally applied is slid to reciprocate on the magnetic head five times. The change in the dynamic friction coefficient caused by multiple travellings can be reduced due to the friction coefficient ratio ($\mu_{C(1000)}/\mu_{C(5)}$) being within the above-mentioned numerical range, and this makes it possible to make the travelling of the magnetic recording medium 10 stable.

The dynamic friction coefficient $\mu_{C(5)}$ and the dynamic friction coefficient $\mu_{C(1000)}$ for calculating the friction coefficient ratio ($\mu_{C(1000)}/\mu_{C(5)}$) are obtained as follows.

The magnetic recording medium 10 is connected to the movable strain gauge 71 in the same way as the method of measuring the dynamic friction coefficient $\mu_A$ except that the tension $T_0$ [N] to be applied to the other end of the magnetic recording medium 10 is set to 0.6 N. Then, the magnetic recording medium 10 is slid by 60 mm toward the movable strain gauge at 10 mm/s with respect to the head block 74 (outward path), and slid by 60 mm to be away from the movable strain gauge (return path). This reciprocating operation is repeated 1000 times. The output value (voltage) of the strain gauge is acquired 13 times during the period from the start of the fifth 60 mm sliding through the outward path to the stop of sliding in the 1000 reciprocating operations, and is converted into T [N] on the basis of the linear relationship between the output value and the load obtained as described with respect to the dynamic friction coefficient $\mu_A$. Eleven T [N]'s excluding the first one and the last one are simply averaged, thereby obtaining $Ta_{ave}$ [N]. The dynamic friction coefficient $\mu_{C(5)}$ is obtained using the following formula.

$$\mu_{C(5)} = \frac{1}{(\theta_1[°]) \times (\pi/180)} \times \ln\left(\frac{T_{ave}[N]}{T_0[N]}\right)$$

Further, the dynamic friction coefficient $\mu_{C(1000)}$ is obtained in a similar way to the dynamic friction coefficient $\mu_{C(5)}$ except that measurement on the 1000th outward path is performed.

On the basis of the dynamic friction coefficient $\mu_{C(5)}$, and the dynamic friction coefficient $\mu_{C(1000)}$ measured as described above, the friction coefficient ratio $\mu_{C(1000)}/\mu_{C(5)}$ is calculated.

(Squareness Ratio S2 Measured in Vertical Direction)

A squareness ratio S2 measured in the vertical direction (thickness direction) of the magnetic recording medium 10 is favorably 65% or more, more favorably 70% or more, still more favorably 73% or more, and still more favorably 80% or more. In the case where the squareness ratio S2 is 65% or more, since the vertical orientation of the magnetic powder is sufficiently high, a better SNR can be obtained. Thus, further excellent electromagnetic conversion characteristics can be achieved. Further, the shape of a servo signal is improved, and this results in more easily performing control on the drive side.

As used herein, the fact that the magnetic recording medium is vertically oriented may mean that the squareness ratio S2 of the magnetic recording medium is within the above-mentioned numerical range (e.g., 65% or more).

The squareness ratio S2 in the vertical direction is obtained as follows. First, three magnetic recording media 10 are overlapped with each other with double-sided tapes, and then punched out with a φ6.39 mm punch to prepare a measurement sample. At this time, marking is performed with an arbitrary ink that does not have magnetism so that the longitudinal direction (travelling direction) of the magnetic recording medium 10 can be recognized. Then, an M-H loop of the measurement sample (entire magnetic recording medium 10) corresponding to the vertical direction (thickness direction) of the magnetic recording medium 10 is measured using the VSM. Next, the coating films (the underlayer 12, the magnetic layer 13, the back layer 14, and the like) are wiped by using acetone, ethanol, or the like, leaving only the base layer 11. Then, the obtained base layers 11 are overlapped with each other with double-sided tapes, and then punched out with a φ6.39 mm punch to prepare a sample for background correction (hereinafter, simply referred to as "correction sample"). After that, the M-H loop of the correction sample (base layer 11) corresponding to the vertical direction of the base layer 11 (vertical direction of the magnetic recording medium 10) is measured using the VSM.

In measuring the M-H loop of the measurement sample (entire magnetic recording medium 10) and the M-H loop of the correction sample (base layer 11), the high sensitivity vibrating sample magnetometer "VSM-P7-15" manufactured by TOEI INDUSTRY CO., LTD. is used. The measurement conditions are a measurement mode: full loop, the maximum magnetic field: 15 kOe, a magnetic field step: 40 bits, Time constant of Locking amp: 0.3 sec, Waiting time: 1 sec, and the average number of MH: 20.

After obtaining the M-H loop of the measurement sample (entire magnetic recording medium 10) and the M-H loop of the correction sample (base layer 11), background correction is performed by subtracting the M-H loop of the correction sample (base layer 11) from the M-H loop of the measurement sample (entire magnetic recording medium 10) to obtain the M-H loop after the background correction. For the calculation of the background correction, a measurement/analysis program attached to the "VSM-P7-15" is used.

A saturation magnetization Ms (emu), and a residual magnetization Mr (emu) of the obtained M-H loop after the background correction is substituted into the following formula to calculate the squareness ratio S2(%). Note that all of the above-mentioned M-H loops are measured at 25° C. Further, "demagnetizing field correction" when measuring the M-H loop in the vertical direction of the magnetic recording medium 10 is not performed. Note that for this calculation, a measurement/analysis program attached to the "VSM-P7-15" is used.

Squareness ratio $S2(\%)=(Mr/Ms)\times 100$ (Squareness Ratio S1 Measured in Longitudinal Direction)

A squareness ratio S1 measured in the longitudinal direction (travelling direction) of the magnetic recording medium 10 is favorably 35% or less, more favorably 30% or less, 27% or less, or 25% or less, and still more favorably 20% or less. In the case where the squareness ratio S1 is 35% or less, since the vertical orientation of the magnetic powder is sufficiently high, a better SNR can be obtained. Thus, further excellent electromagnetic conversion characteristics can be achieved. Further, the shape of a servo signal is improved, and this results in more easily performing control on the drive side.

As used herein, the fact that the magnetic recording medium is vertically oriented may mean that the squareness ratio S1 of the magnetic recording medium is within the above-mentioned numerical range (e.g., 35% or more). Favorably, the magnetic recording medium according to the present technology is vertically oriented.

The squareness ratio S1 in the longitudinal direction is obtained in a similar way to the squareness ratio S2 except that the M-H loop is measured in the longitudinal direction (travelling direction) of the magnetic recording medium 10 and the base layer 11.

The squareness ratios S1 and S2 are each set to a desired value by adjusting, for example, the strength of the magnetic field to be applied to the coating material for forming a magnetic layer, the time to apply the magnetic field to the coating material for forming a magnetic layer, the dispersion state of the magnetic powder in the coating material for forming a magnetic layer, or the concentration of solid content in the coating material for forming a magnetic layer. Specifically, for example, if the strength of the magnetic field is increased, the squareness ratio S1 is made smaller whereas the squareness ratio S2 is made larger. Further, if the time to apply the magnetic field is made longer, the squareness ratio S1 is made smaller whereas the squareness ratio S2 is made larger. Furthermore, if the dispersion state of the magnetic powder is improved, the squareness ratio S1 is made smaller whereas the squareness ratio S2 is made larger. Moreover, if the concentration of solid content is decreased, the squareness ratio S1 is made smaller whereas the squareness ratio S2 is made larger. Note that the above-mentioned adjustment methods may be used alone or two or more of the methods may be used in combination.

(Arithmetic Average Roughness $R_a$)

An arithmetic average roughness $R_a$ of the magnetic-layer-side surface (hereinafter also referred to as a "magnetic surface") of the magnetic recording medium 10 is favorably 2.5 nm or less, and more favorably 2.0 nm or less. In the case where the arithmetic average roughness $R_a$ is 2.5 nm or less, a better SNR can be obtained.

The arithmetic average roughness $R_a$ is obtained as follows. First, the surface of the magnetic layer 13 is observed with an AFM to obtain an AFM image of 40 μm×40 μm. Dimension 3100 manufactured by Digital Instruments and the analysis software thereof are used as an AFM, a cantilever formed of silicon single crystal is used (Note 1), and measurement is performed with 200 to 400 Hz tuning as tapping frequency. Next, the AFM image is divided into 512×512 (=262,144) measurement points, heights Z(i) (i: measurement point number, i=1 to 262,144) are measured at the measurement points, and the measured heights Z(i) at the measurement points are simply averaged (arithmetic average) to obtain an average height (average surface) $Z_{ave}$ (=(Z(1)+Z(2)+ . . . +Z(262,144))/262,144). Subsequently, deviations Z"(i)(=|Z(i)–$Z_{ave}$|) from the average center line at the measurement points are obtained, and the arithmetic average roughness $R_a$[nm](=Z"(1)+Z"(2)+ . . . +Z"(262,144))/262,144) is calculated. At this time, one on which filtering processing has been performed by Flatten order 2 and planefit order 3 XY as image processing is used as data.

(Note 1) SPM probe NCH normal type PointProbe L (cantilever length)=125 μm manufactured by Nano World (Coercive Force Hc)

The coercive force Hc2 in the longitudinal direction of the magnetic recording medium 10 is favorably 2000 Oe or less, more favorably 1900 Oe or less, and still more favorably 1800 Oe or less. In the case where the coercive force Hc in the longitudinal direction is 2000 Oe or less, it is possible to form a favorable recording pattern because magnetization reacts more sensitively due to the magnetic field in the vertical direction from the recording head.

The coercive force Hc measured in the longitudinal direction of the magnetic recording medium 10 is favorably 1000 Oe or more. In the case where the lower limit value of the coercive force Hc in the longitudinal direction is 1000 Oe or more, it is possible to suppress demagnetization due to leakage flux from the recording head.

The above-mentioned coercive force Hc is obtained as follows. First, three magnetic recording media 10 are overlapped with each other with double-sided tapes, and then punched out with a φ6.39 mm punch to prepare a measurement sample. At this time, marking is performed with an arbitrary ink that does not have magnetism so that the longitudinal direction (travelling direction) of the magnetic recording medium 10 can be recognized. Then, an M-H loop of the measurement sample (entire magnetic recording medium 10) corresponding to the longitudinal direction (travelling direction) of the magnetic recording medium 10 is measured using a vibrating sample magnetometer (VSM). Next, the coating films (the underlayer 12, the magnetic layer 13, the back layer 14, and the like) are wiped by using acetone, ethanol, or the like, leaving only the base layer 11. Then, the obtained three base layers 11 are overlapped with each other with double-sided tapes, and then punched out with a φ6.39 mm punch to prepare a sample for background correction (hereinafter, simply referred to as "correction sample"). After that, the M-H loop of the correction sample (base layer 11) corresponding to the vertical direction of the base layer 11 (vertical direction of the magnetic recording medium 10) is measured using the VSM.

In measuring the M-H loop of the measurement sample (entire magnetic recording medium 10) and the M-H loop of the correction sample (base layer 11), a high sensitivity vibrating sample magnetometer "VSM-P7-15" manufactured by TOEI INDUSTRY CO., LTD. is used. The measurement conditions are a measurement mode: full loop, the maximum magnetic field: 15 kOe, a magnetic field step: 40 bits, Time constant of Locking amp: 0.3 sec, Waiting time: 1 sec, and the average number of MH: 20.

After obtaining the M-H loop of the measurement sample (entire magnetic recording medium 10) and the M-H loop of the correction sample (base layer 11), background correction is performed by subtracting the M-H loop of the correction sample (base layer 11) from the M-H loop of the measurement sample (entire magnetic recording medium 10) to obtain the M-H loop after the background correction. For the calculation of the background correction, a measurement/analysis program attached to the "VSM-P7-15" is used.

The coercive force Hc is obtained on the basis of the obtained M-H loop after the background correction. Note that for this calculation, a measurement/analysis program attached to the "VSM-P7-15" is used. Note that all of the above-mentioned M-H loops are measured at 25° C. Further, "demagnetizing field correction" when measuring the M-H loop in the longitudinal direction of the magnetic recording medium 10 is not performed.

((Servo Track Width of Inside of Winding)–(Servo Track Width of Outside of Winding))

For example, the magnetic recording medium 10 may be housed in a magnetic recording cartridge in a state of being wound around a reel, and favorably, (the servo track width of the inside of winding of the magnetic recording medium)−(the servo track width of the outside of the winding of the magnetic recording medium)>0 may be satisfied.

The difference in servo track width between the inside of winding and the outside of the winding is more than 0 μm, favorably 0.01 μm or more, more favorably 0.02 μm or more, and still more favorably 0.05 μm or more. The difference in servo track width between the inside of winding and the outside of the winding may be, for example, 0.10 μm or more, 0.15 μm or more, or 0.20 μm or more. This makes it possible to avoid wrinkling the magnetic recording medium wound around the reel provided in the cartridge.

The difference in servo track width between the inside of winding and the outside of the winding may be, for example, 0.5 μm or less, favorably 0.4 μm or less, and more favorably 0.3 μm or less.

In order to obtain the difference in servo track width between the inside of winding and the outside of the winding, a shift amount $T_{in}W$ of a servo track width of the inside of winding and a shift amount $T_{out}W$ of the servo track width of the outside of the winding are respectively measured. This measurement is performed at a temperature of 23+/−3° C. and at relative humidity of 50%+/−5%. Both of the shift amounts represent how large or small the servo track width is with respect to a standard servo track width. A method of measuring the shift amounts is separately described below.

As used herein, the inside of winding refers to a region covering from a certain position that is set to be a point of origin to another position, the certain position being situated 50 m from an end (hereinafter also referred to as an "internal end") of the two ends of the magnetic recording medium that is attached to the reel (a reel around which the magnetic recording medium is wounded) provided in the cartridge, the other position being situated 10 m from the certain position in a direction of an end (hereinafter also referred to as an "external end") that is opposite to the internal end.

As used herein, the outside of the winding refers to a region covering from a certain position that is set to be a point of origin to another position, the certain position being situated 50 m from the external end of the two ends of the magnetic recording medium, the other position being situated 10 m from the certain position in a direction of the internal end.

Figure 16:
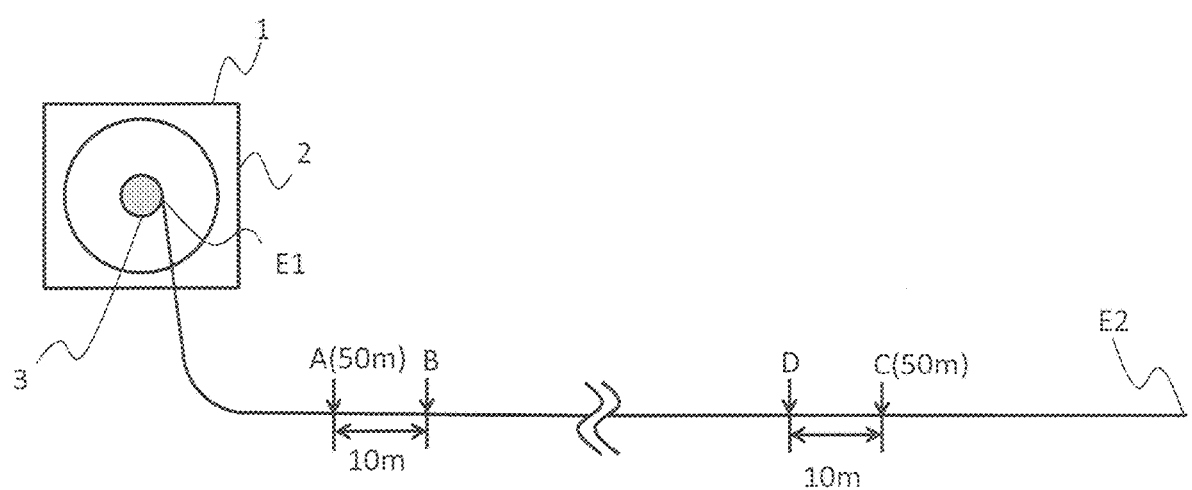
FIG. 16 is a schematic diagram showing a position to measure a shift amount of a servo track width.

The inside of winding and the outside of the winding are more specifically described with reference to FIG. 16. In FIG. 16, an internal end E1 is attached to a reel 2 of a magnetic recording medium 1. The inside of winding refers to a region between a position A and a position B, the position A being situated 50 m from the internal end E1, the position B being situated 10 m from the position A in a direction of an external end E2. The outside of the winding refers to a region between a position C and a position D, the position C being situated 50 m from the external end E2 in a direction of the internal end E1, the position D being situated 10 m from the position C in the direction of the internal end E1.

The shift amount $T_{in}W$ of a servo track width of the inside of winding is measured while causing a magnetic recording medium housed in a magnetic recording cartridge to travel such that the magnetic recording medium is wound up in a magnetic recording/reproduction apparatus (to travel in a so-called forward direction). In this measurement, the tension applied to the magnetic recording medium is 0.55 N, and the travelling speed is 3-6 m/s. An average value of shift amounts of a servo track width that are measured throughout a 10 m region in the inside of the winding is used as a shift amount $T_{in}W$ of a servo track width of the inside of winding for obtaining the difference. The average value is calculated by the shift amounts being simply averaged.

As in the case of the inside of the winding, the shift amount $T_{out}W$ of the servo track width of the outside of the winding is measured while causing the magnetic recording medium to travel in the forward direction. An average value of shift amounts of the servo track width that are measured throughout a 10 m region in the outside of the winding is used as a shift amount $T_{out}W$ of the servo track width of the outside of the winding for obtaining the difference. The average value is also calculated by the shift amounts being simply averaged.

A difference ($T_{in}W−T_{out}W$) is obtained by subtracting the shift amount $T_{out}W$ of the servo track width of the outside of the winding from the shift amount $T_{in}W$ of the servo track width of the inside of the winding, the shift amount $T_{out}W$ and the shift amount $T_{in}W$ being obtained as described above, and the difference is (the servo track width of the inside of winding)−(the servo track width of the outside of the winding).

(Shift Amount of Servo Track Width)

Figure 17:
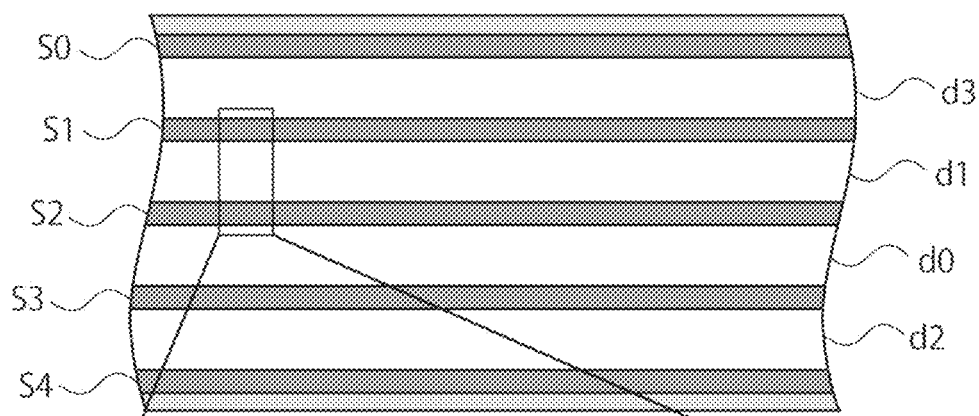
FIG. 17 is a schematic diagram showing a method of measuring the shift amount of the servo track width.
Figure 17:
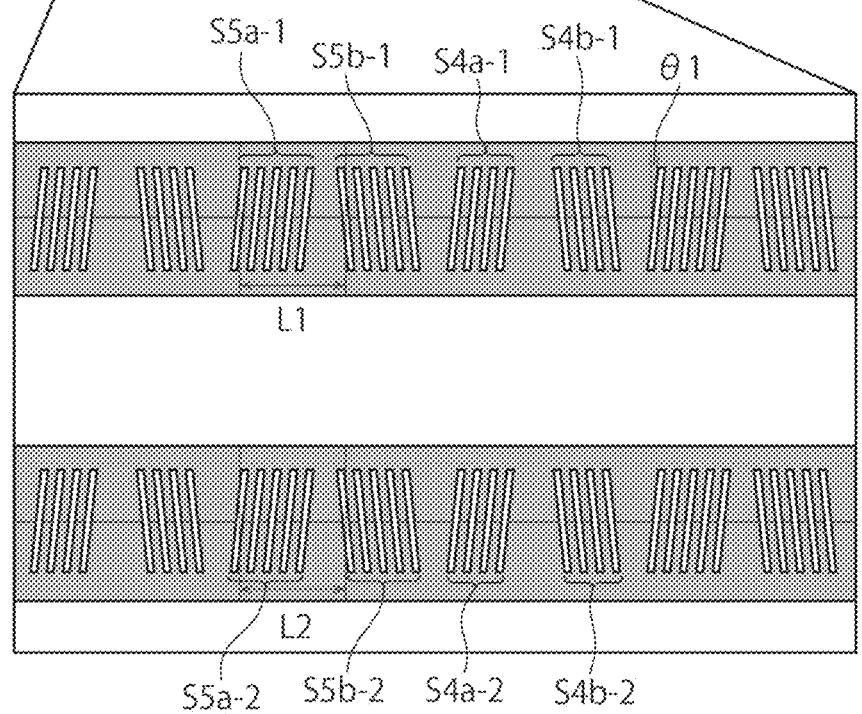
Figure 17:
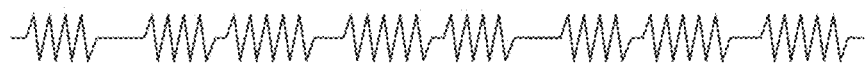

The method of measuring a shift amount of a servo track width will be described with reference to FIG. 17. (a) of FIG. 17 is a schematic diagram of data bands and servo bands that are formed in a magnetic layer of a magnetic recording tape. As shown in (a) of FIG. 17, the magnetic layer includes four data bands d0-d3. The magnetic layer includes five servo bands S0-S4 such that each data band is situated between the respective two servo bands. As shown in (b) of FIG. 17, each servo band repeatedly includes a frame unit including five servo signals S5a that are inclined at a predetermined angle θ1, five servo signals S5b that are inclined at the same angle in a direction opposite to the direction of the five servo signals S5a, four servo signals S4a that are inclined at the predetermined angle θ1, and four servo signals S4b that are inclined at the same angle in a direction opposite to the direction of the four servo signals S4a. The angle θ1 may be, for example, 5°-25°, and particularly 11°-20°.

The shift amount of a servo track width measured by the measurement method is an amount of a shift of a servo track width between the two servo tracks S1 and S2 from a standard servo track width, the servo tracks S1 and S2 being situated across the second data band d1 from the top in (a) of FIG. 17.

When the two servo tracks S1 and S2 situated across the data band d1 are reproduced during travelling of a drive, a waveform indicated in (c) of FIG. 17 is obtained for each servo track using a digital oscilloscope (WavePro 960 of LeCroy).

A time between timing signals is obtained from the waveform obtained by the reproduction of the servo track S1, and a distance between a magnetic stripe at the beginning of an A burst and a magnetic stripe at the beginning of a B burst in the servo track S1 is calculated from the obtained time and the tape travelling speed. For example, as shown in (b) of FIG. 17, a distance L1 between a magnetic stripe at the beginning of an A burst S5a-1 (a leftmost magnetic stripe from among five magnetic stripes) and a magnetic stripe at the beginning of a B burst S5b-1 (a leftmost magnetic stripe from among five magnetic stripes) is calculated.

Likewise, a time between timing signals is obtained from the waveform obtained by the reproduction of the servo track S2, and a distance between a magnetic stripe at the beginning of an A burst and a magnetic stripe at the beginning of a B burst in the servo track S2 is calculated from the obtained time and the tape travelling speed. For example, as shown in (b) of FIG. 17, a distance L2 between a magnetic stripe at the beginning of an A burst S5a-2 and a magnetic stripe at the beginning of a B burst S5b-2 is calculated.

For example, when the magnetic recording tape broadens in the width direction, a time between timing signals that is obtained by reproducing, for example, the servo track S1 becomes long, and this may result in also making a calculated distance L1 larger. Conversely, a calculated distance L1 may be made smaller when the magnetic recording tape shrinks in the width direction. Thus, the shift amount of a servo track width can be obtained using the distances L1 and L2 and an azimuth angle. The shift amount of a servo track width is obtained using a formula indicated below.

$$(\text{shift amount of a servo track width}) = \{(L1-L2)/2\} \times \tan(90°-\theta 1)$$

In this formula, L1 and L2 represent the distances L1 and L2, respectively, and θ1 represents the above-mentioned inclination angle θ1, which is also referred to as an azimuth angle. θ1 is obtained by developing the magnetic recording tape taken from the cartridge with a ferricolloid developer and using a universal tool microscope (TOPCON TUM-220ES) and a data processing apparatus (TOPCON CA-1B).

The shift amount of a servo track width is a change amount with respect to a standard servo track width. The standard servo track width may be the same width as the width of a servo read head included in a magnetic recording/reproduction apparatus, and may be determined according to the type of the magnetic recording medium 10 such as a standard to which the magnetic recording medium 10 conforms.

Note that the servo track width can be adjusted, for example, as indicated below. In order to decrease skewness occurring in the magnetic recording medium 10, the winding tension may be decreased in the drying process and/or the calendar process (humidified region) of the magnetic recording medium 10. Further, in order to decrease the skewness in a pancake state and/or a cartridge state after cutting is performed, the magnetic recording medium 10 may be stored at a temperature of 55° C. or more for a long time. The servo track width can be adjusted by decreasing skewness as described above.

(4) Method of Producing Magnetic Recording Medium

Next, a method of producing the magnetic recording medium 10 having the above-mentioned configuration will be described. First, a non-magnetic powder, a binder, and the like are kneaded and/or dispersed in a solvent to prepare a coating material for forming an underlayer. Next, a magnetic powder, a binder, and the like are kneaded and/or dispersed in a solvent to prepare a coating material for forming a magnetic layer. Next, a binder, a non-magnetic powder, and the like are kneaded and/or dispersed in a solvent to prepare a coating material for forming a back layer. For the preparation of the coating material for forming a magnetic layer, the coating material for forming an underlayer, and the coating material for forming a back layer, for example, the following solvents, dispersing devices, and kneading devices can be used.

Examples of the solvent used for preparing the above-mentioned coating material include ketone solvents such as acetone, methyl ethyl ketone, methyl isobutyl ketone, and cyclohexanone; alcohol solvents such as methanol, ethanol, and propanol; ester solvents such as methyl acetate, ethyl acetate, butyl acetate, propyl acetate, ethyl lactate, and ethylene glycol acetate; ether solvents such as diethylene glycol dimethyl ether, 2-ethoxyethanol, tetrahydrofuran, and dioxane; aromatic hydrocarbon solvents such as benzene, toluene, and xylene; and halogenated hydrocarbon solvents such as methylene chloride, ethylene chloride, carbon tetrachloride, chloroform, and chlorobenzene. One of them may be used, or a mixture of two or more thereof may be used.

As the kneading device used for preparing the above-mentioned coating material, for example, kneading devices such as a continuous twin-screw kneader, a continuous twin-screw kneader capable of performing dilution in multi-stages, a kneader, a pressure kneader, and a roll kneader can be used. However, the present technology is not particularly limited to these devices. Further, as the dispersing device used for preparing the above-mentioned coating material, for example, dispersing devices such as a roll mill, a ball mill, a horizontal sand mill, a vertical sand mill, a spike mill, a pin mill, a tower mill, a pearl mill (e.g., "DCP mill" manufactured by Nippon Eirich Co., Ltd.), a homogenizer, and an ultrasonic dispersion machine can be used. However, the present technology is not particularly limited to these devices.

Next, the coating material for forming an underlayer is coated on one main surface of the base layer 11 and dried to form the underlayer 12. Subsequently, the coating material for forming a magnetic layer is coated on the underlayer 12 and dried to form the magnetic layer 13 on the underlayer 12. Note that during drying, the magnetic field of the magnetic powder is oriented in the thickness direction of the base layer 11 using, for example, a solenoid coil. Further, during drying, the magnetic field of the magnetic powder may be oriented in the longitudinal direction (travelling direction) of the base layer 11 and then oriented in the thickness direction of the base layer 11, using, for example, a solenoid coil. Such processing of magnetic field orientation makes it possible to improve the degree of vertical orientation (i.e., the squareness ratio S1) of the magnetic powder. After forming the magnetic layer 13, the coating material for forming a back layer is coated on the other main surface of the base layer 11 and dried to form the back layer 14. As a result, the magnetic recording medium 10 is obtained.

The squareness ratios S1 and S2 may each be set to a desired value by adjusting, for example, the strength of the magnetic field to be applied to the coating film of the coating material for forming a magnetic layer, the concentration of solid content in the coating material for forming a magnetic layer, or the drying conditions (such as drying temperature and drying time) of the coating film of the coating material for forming a magnetic layer. The strength of the magnetic field to be applied to the coating film is favorably not less than twice and not greater than three times the coercive force of the magnetic powder. In order to further increase the squareness ratio S1 (i.e., in order to further decrease the squareness ratio S2), it is favorable to improve the dispersion state of the magnetic powder in the coating material for forming a magnetic layer. Further, in order to further increase the squareness ratio S1, it is also effective to magnetize the magnetic powder at the stage before the coating material for forming a magnetic layer enters the orientation device for causing the magnetic field of the magnetic powder to be oriented. Note that the above-mentioned methods of adjusting the squareness ratios S1 and S2 may be used alone or two or more of the methods may be used in combination.

After that, a calendar process is performed on the obtained magnetic recording medium 10 to smooth the surface of the magnetic layer 13. Next, after winding, into a roll, the magnetic recording medium 10 on which the calendar process has been performed, heat treatment is performed on the magnetic recording medium 10 in this state, and thus, a large number of protrusions 14A on the surface of the back layer 14 is transferred to the surface of the magnetic layer 13. As a result, pores (a large number of holes 13A) are formed on the surface of the magnetic layer 13.

The temperature of the heat treatment is favorably 55° C. or more and 75° C. or less. The shape of the protrusion is successfully transferred to the magnetic layer 13 by adopting a temperature within this numerical range as the temperature of the heat treatment. In the case where the temperature of the heat treatment is too low (such as less than 55° C.), there is a possibility that the shape of the protrusion will not be sufficiently transferred. In the case where the temperature of the heat treatment is too high (such as greater than 75° C.), the amount of pores may be too large and the lubricant on the surface of the magnetic layer 13 may be excessive. Here, the temperature of the heat treatment is a temperature of an atmosphere for holding the magnetic recording medium 10.

The time for the heat treatment is favorably 15 hours or more and 40 hours or less. The shape of the protrusion is successfully transferred to the magnetic layer 13 due to the time for the heat treatment being within this numerical range. In the case where the time for the heat treatment is too short (such as less than 15 hours), there is a possibility that the shape of the protrusion will not be sufficiently transferred. It is favorable that the time for the heat treatment be, for example, 40 hours or more in order to suppress a decrease in productivity.

Finally, the magnetic recording medium 10 is cut into a predetermined width (e.g., ½ inch width). A target magnetic recording medium 10 is obtained in this way. A servo pattern is recorded in the magnetic recording medium 10. The recording of a servo pattern may be performed using, for example, a servo writer known in the field of the present technology.

Although pores are formed on the surface of the magnetic layer 13 by transferring a large number of protrusions 14A provided on the surface of the back layer 14 to the surface of the magnetic layer 13, the method of forming a pore is not limited thereto. For example, pores may be formed on the surface of the magnetic layer 13 by adjusting the type of a solvent contained in a coating material for forming a magnetic layer and/or by adjusting the dry conditions of the coating material for forming a magnetic layer. Further, for example, pores may be formed in the process of drying a solvent in a coating material for forming a magnetic layer, due to a solid content and the solvent existing unevenly in the coating material for forming a magnetic layer. Furthermore, in the process of performing coating with a coating material for forming a magnetic layer, a solvent contained in the coating material for forming a magnetic layer may pass through pores of the underlayer 12 that are formed at the time of coating and drying a lower layer, and then the solvent may be absorbed into the underlayer 12 as well. In the process of drying after the coating, pores causing the magnetic layer 13 and the underlayer 12 to communicate with each other may be formed by the solvent moving through the magnetic layer 13 from the underlayer 12.

(5) Recording/Reproduction Apparatus

[Configuration of Recording/Reproduction Apparatus]

Next, an example of a configuration of a recording/reproduction apparatus 30 that performs recording and reproduction of the magnetic recording medium 10 having the above-mentioned configuration will be described with reference to FIG. 8.

The recording/reproduction apparatus 30 has a configuration in which a tension to be applied in the longitudinal direction of the magnetic recording medium 10 can be adjusted. Further, the recording/reproduction apparatus 30 has a configuration in which a magnetic recording medium cartridge 10A can be loaded. Here, in order to facilitate the description, the case where the recording/reproduction apparatus 30 has a configuration in which one magnetic recording medium cartridge 10A can be loaded will be described. However, the recording/reproduction apparatus 30 may have a configuration in which a plurality of magnetic recording medium cartridges 10A can be loaded.

The recording/reproduction apparatus 30 is connected to information processing apparatuses such as a server 41 and a personal computer (hereinafter, referred to as a "PC") 42 via a network 43, and configured to be capable of recording, in the magnetic recording medium cartridge 10A, data supplied from these information processing apparatuses. The shortest recording wavelength of the recording/reproduction apparatus 30 is favorably 100 nm or less, more favorably 75 nm or less, still more favorably 60 nm or less, and particularly favorably 50 nm or less.

Figure 8:
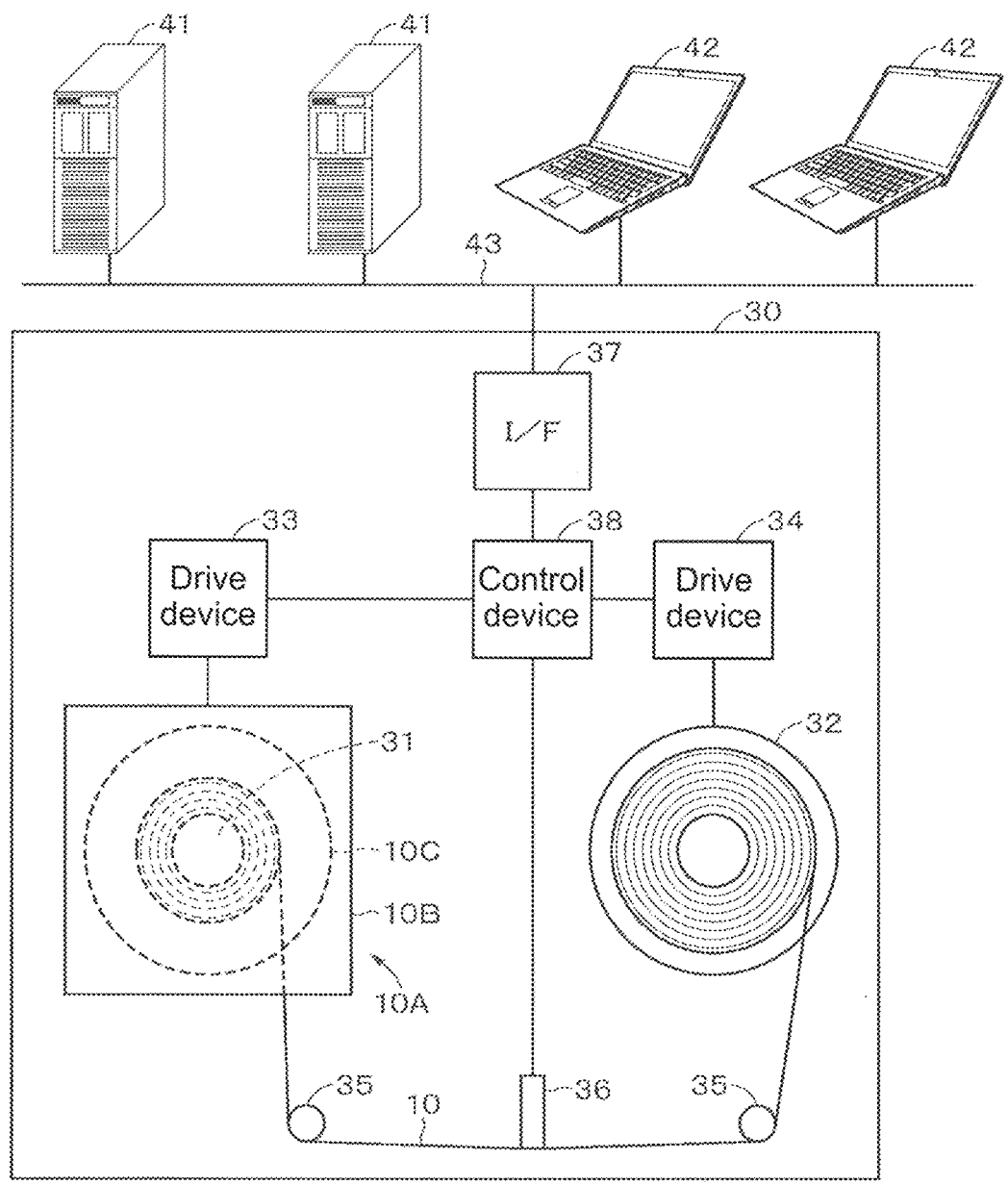
FIG. 8 is a schematic diagram showing a configuration of a recording/reproduction apparatus.

As shown in FIG. 8, the recording/reproduction apparatus 30 includes a spindle 31, a reel 32 on the side of the recording/reproduction apparatus, a spindle drive device 33, a reel drive device 34, a plurality of guide rollers 35, a head unit 36, a communication interface (hereinafter, I/F) 37, and a control device 38.

The spindle 31 is configured such that the magnetic recording medium cartridge 10A can be attached to the spindle 31. The magnetic recording medium cartridge 10A conforms to the LTO (Linear Tape Open) standard, and, in the magnetic recording medium cartridge 10A, a single reel 10C around which the magnetic recording medium 10 is wound, is rotatably housed in a cartridge case 10B. In the magnetic recording medium 10, a servo pattern having an inverted V shape is recorded as a servo signal in advance. The reel 32 is configured such that the tip of the magnetic recording medium 10 pulled out of the magnetic recording medium cartridge 10A can be fixed to the reel 32.

The spindle drive device 33 is a device that drives the spindle 31 to rotate. The reel drive device 34 is a device that drives the reel 32 to rotate. When recording or reproduction of data is performed on the magnetic recording medium 10, the magnetic recording medium 10 is caused to travel by the spindle drive device 33 and the reel drive device 34 respectively driving the spindle 31 and the reel 32 to rotate. The guide roller 35 is a roller that guides the travelling of the magnetic recording medium 10.

The head unit 36 includes a plurality of recording heads for recording a data signal in the magnetic recording medium 10, a plurality of reproduction heads for reproducing the data signal recorded in the magnetic recording medium 10, and a plurality of servo heads for reproducing the servo signal recorded in the magnetic recording medium 10. For example, a ring-type head can be used as the recording head. However, the type of the recording head is not limited thereto.

The communication I/F 37 is for communicating with the information processing apparatuses such as the server 41 and the PC 42, and is connected to the network 43.

The control device 38 controls the entire recording/reproduction apparatus 30. For example, in response to a request from the information processing apparatus such as the server 41 or the PC 42, the control device 38 records, in the magnetic recording medium 10 and using the head unit 36, the data signal supplied from the information processing apparatus. Further, in response to a request from the information processing apparatus such as the server 41 and the PC 42, the control device 38 reproduces the data signal recorded in the magnetic recording medium 10 and supplies the data signal to the information processing apparatus, using the head unit 36.

The control device 38 controls the entire recording/reproduction apparatus 30. For example, in response to a request from the information processing apparatus such as the server 41 and the PC 42, the control device 38 records, in the magnetic recording medium 10 and using the head unit 36, the data signal supplied from the information processing apparatus. Further, in response to a request from the information processing apparatus such as the server 41 and the PC 42, the control device 38 reproduces the data signal recorded in the magnetic recording medium 10 and supplies the data signal to the information processing apparatus, using the head unit 36.

[Operation of Recording/Reproduction Apparatus]

Next, an operation of the recording/reproduction apparatus 30 having the above-mentioned configuration will be described.

First, the magnetic recording medium cartridge 10A is mounted in the recording/reproduction apparatus 30, the tip of the magnetic recording medium 10 is pulled out of the magnetic recording medium cartridge 10A to be moved up to the reel 32 via the plurality of guide rollers 35 and the head unit 36, and the tip of the magnetic recording medium 10 is attached to the reel 32.

Next, when a operation unit (not shown) is operated, the spindle drive device 33 and the reel drive device 34 are driven by being controlled by the control device 38, and the spindle 31 and the reel 32 are rotated in the same direction such that the magnetic recording medium 10 is caused to travel from the reel 10C to the reel 32. Accordingly, a recording of information in the magnetic recording medium 10 or a reproduction of information recorded in the magnetic recording medium 10 is performed by the head unit 36 while the magnetic recording medium 10 is being wound around the reel 32.

Further, when the magnetic recording medium 10 is wound back to be wound around the reel 10C, the magnetic recording medium 10 is caused to travel from the reel 32 to the reel 10C by the spindle 31 and the reel 32 being driven to rotate in a direction opposite to the above-mentioned direction. In this winding-back, a recording of information in the magnetic recording medium 10 or a reproduction of information recorded in the magnetic recording medium 10 is also performed by the head unit 36.

(6) Cartridge

[Configuration of Cartridge]

The present technology also provides a magnetic recording cartridge (also referred to as a tape cartridge) including the magnetic recording medium according to the present technology. In the magnetic recording cartridge, the magnetic recording medium may be wound around, for example, a reel. The magnetic recording cartridge may include, for example, a communication unit that communicate with a recording/reproduction apparatus; a storage unit; and a control unit that stores, in the storage unit, information received from the recording/reproduction apparatus through the communication unit, and reads information from the storage unit in response to a request from the recording/reproduction apparatus to transmit the read information to the recording/reproduction apparatus through the communication unit. The information may include adjustment information for adjusting a tension applied in the longitudinal direction of the magnetic recording medium.

An example of a configuration of the cartridge 10A including the magnetic recording medium 10 having the above-mentioned configuration will be described with reference to FIG. 13.

Figure 13:
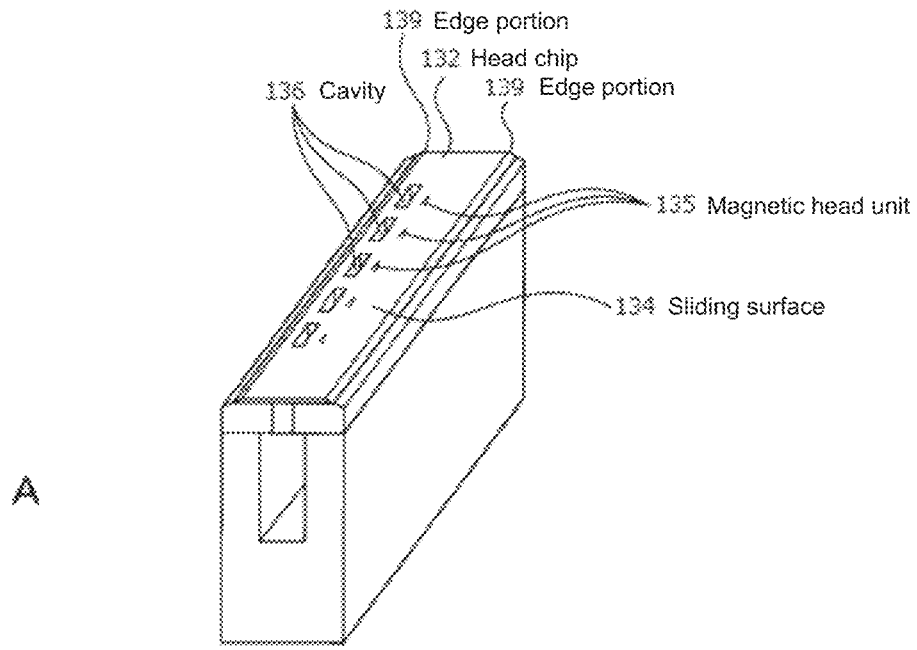
FIG. 13 a schematic diagram of a servo signal writing head used in Examples of the present technology.
Figure 13:
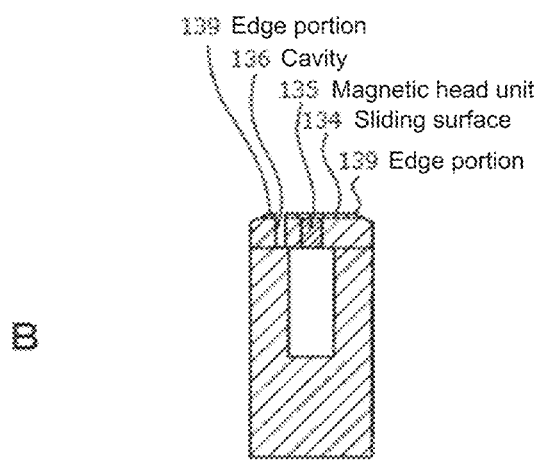

FIG. 13 is an exploded perspective view showing an example of a configuration of the cartridge 10A. The cartridge 10A is a magnetic recording medium cartridge conforming to the LTO (Linear Tape-Open) standard, and includes, inside the cartridge case 10B including a lower shell 212A and an upper shell 212B, a reel 10C around which a magnetic tape (tape-shaped magnetic recording medium) 10 is wound, a reel lock 214 and a reel spring 215 for locking rotation of the reel 10C, a spider 216 for releasing the lock state of the reel 10C, a sliding door 217 that opens and closes a tape outlet 212C provided across the lower shell 212A and the upper shell 212B in the cartridge case 10B, a door spring 218 that urges the sliding door 217 to the closed position of the tape outlet 212C, a write protect 219 for preventing accidental erasure, and a cartridge memory 211. The reel 10C has a substantially disc shape having an opening at the center portion, and includes a reel hub 213A and a flange 213B formed of a hard material such as plastic. A leader pin 220 is provided to one end of the magnetic tape 10.

The cartridge memory 211 is provided in the vicinity of one corner portion of the cartridge 10A. In the state where the cartridge 10A is loaded on the recording/reproduction apparatus 30, the cartridge memory 211 faces a reader/writer (not shown) of the recording/reproduction apparatus 30. The cartridge memory 211 communicates with the recording/reproduction apparatus 30, specifically, the reader/writer (not shown), with a wireless communication standard conforming to the LTO standard.

[Configuration of Cartridge Memory]

An example of a configuration of the cartridge memory 211 will be described with reference to FIG. 14.

Figure 14:
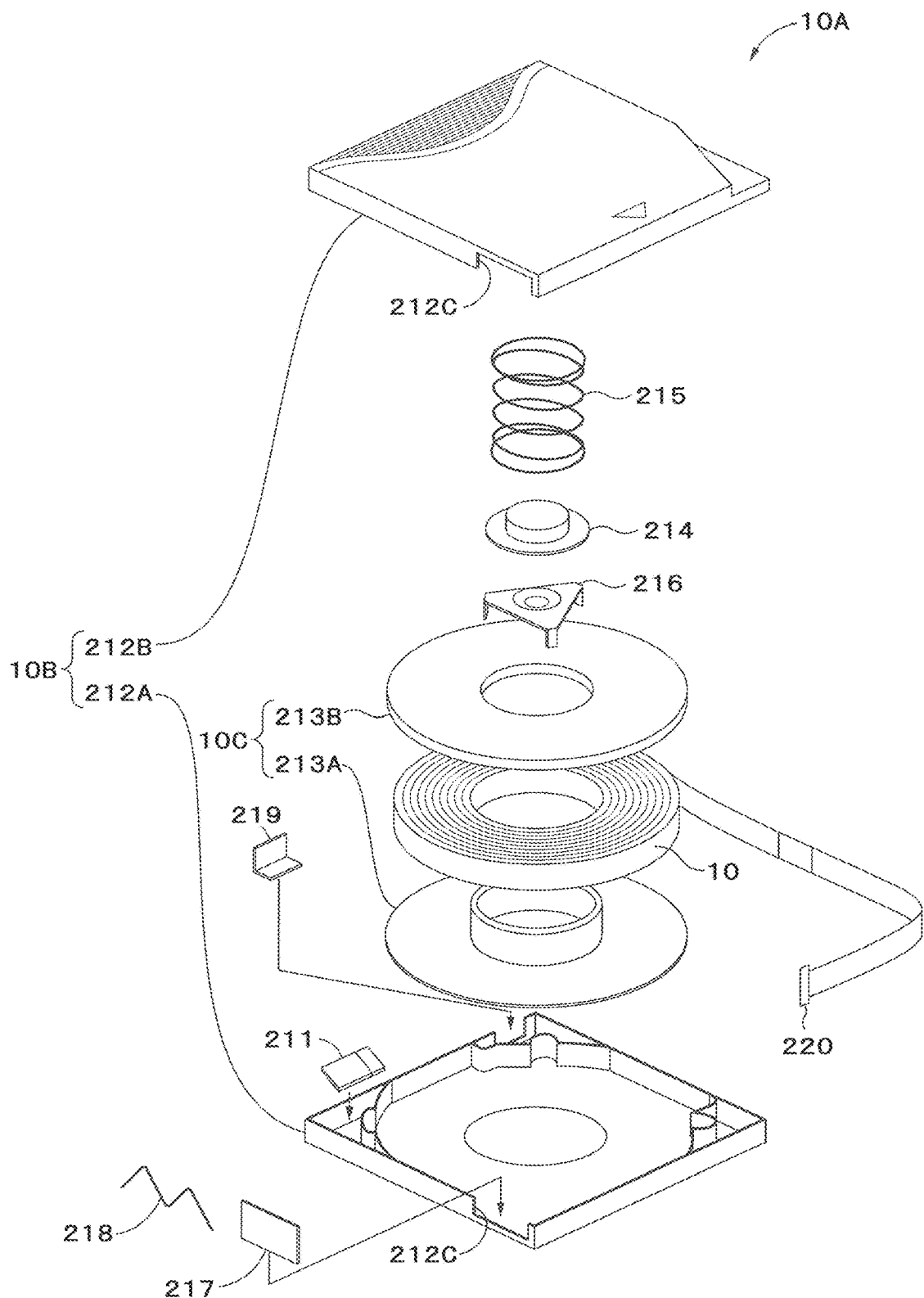
FIG. 14 is an exploded perspective view showing an example of a configuration of a cartridge.
Figure 15:
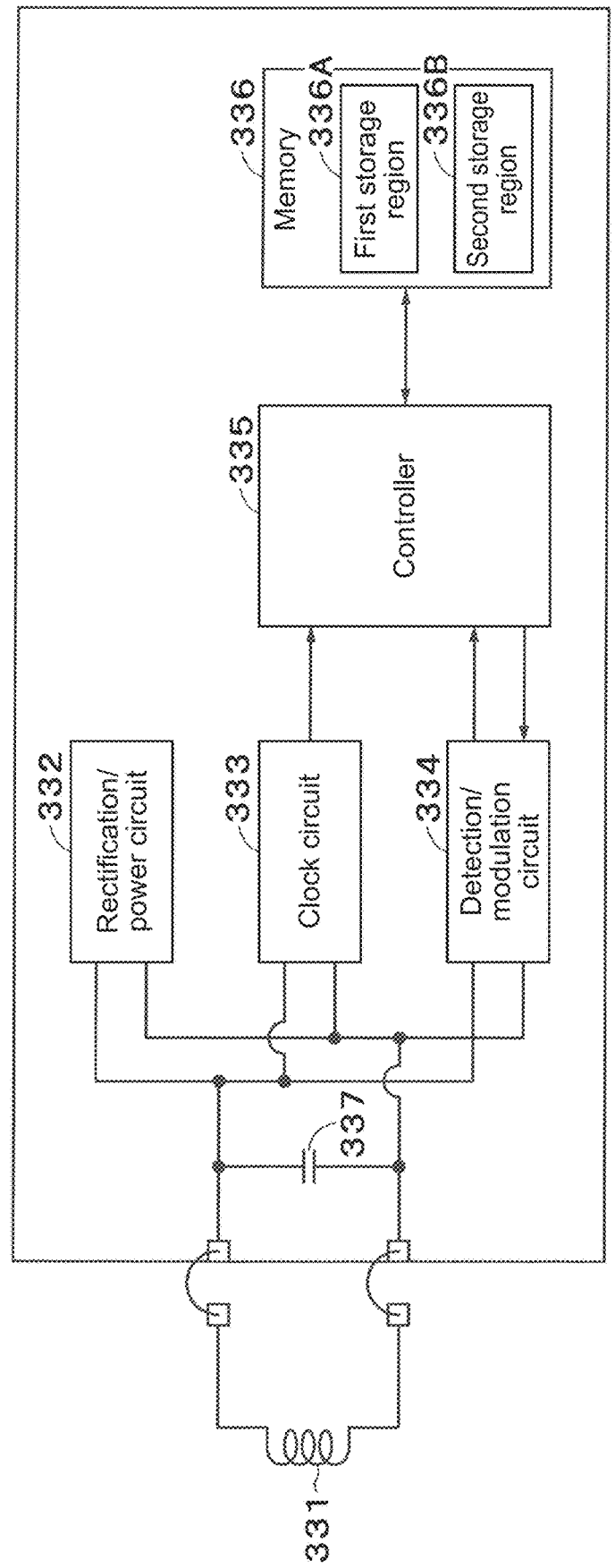
FIG. 15 is a block diagram showing an example of a configuration of a cartridge memory.

FIG. 14 is a block diagram showing an example of a configuration of the cartridge memory 211. The cartridge memory 211 includes an antenna coil (communication unit) 331 that performs communication with the reader/writer (not shown) with a specified communication standard, a rectification/power circuit 332 that generates power using an induce electromotive force from the radio wave received by the antenna coil 331 and rectifies the power to generate a power source, a clock circuit 333 that generates a clock from the radio wave received by the antenna coil 331 by similarly using the induce electromotive force, a detection/modulation circuit 334 that detects the radio wave received by the antenna coil 331 and modulates a signal transmitted by the antenna coil 331, a controller (control unit) 335 that includes a logic circuit or the like for discriminating commands and data from the digital signal extracted from the detection/modulation circuit 334 and for processing the commands and the data, and a memory (storage unit) 336 that stores therein information. Further, the cartridge memory 211 includes a capacitor 337 connected to the antenna coil 331 in parallel, and the antenna coil 331 and the capacitor 337 constitute a resonance circuit.

The memory 336 stores therein information relating to the cartridge 10A, and the like. The memory 336 is a non-volatile memory (NVM). The storage capacity of the memory 336 is favorably approximately 32 KB or more. For example, in the case where the cartridge 10A conforms to an LTO format standard in future generations, the memory 336 has a storage capacity of approximately 32 KB.

The memory 336 includes a first storage region 336A and a second storage region 336B. The first storage region 336A corresponds to the storage region of a cartridge memory (hereinafter, referred to as "existing cartridge memory") of the LTO standard before LTO8, and is a region for storing information conforming to the LTO standard before LTO8. Examples of the information conforming to the LTO standard before LTO8 include production information (e.g., a unique number for the cartridge 10A) and a usage history (e.g., the number of tape withdrawals (Thread Count)).

The second storage region 336B corresponds to the extended storage region for the storage region of the existing cartridge memory. The second storage region 336B is a region for storing additional information. Here, the additional information means information relating to the cartridge 10A, which is not defined in the LTO standard before LTO8. Examples of the additional information include tension adjustment information, management ledger data, index information, and thumbnail information regarding video stored in the magnetic tape 10, but the additional information is not limited to these types of data. The tension adjustment information includes a distance between adjacent servo bands (distance between servo patterns recorded in adjacent servo bands) during data recording in the magnetic tape 10. The distance between adjacent servo bands is an example of width-related information relating to the width of the magnetic tape 10.

Details of the distance between servo bands will be described below. In the following description, information to be stored in the first storage region 336A will be referred to as "first information" and information to be stored in the second storage region 336B will be referred to as "second information" in some cases.

The memory 336 may include a plurality of banks. In this case, a part of the plurality of banks may constitute the first storage region 336A, and the other banks may constitute the second storage region 336B. Specifically, for example, in the case where the cartridge 10A conforms to an LTO format in future generations, the memory 336 may include two banks each having a storage capacity of approximately 16 KB, one of the two banks may constitute the first storage region 336A, and the other bank may constitute the second storage region 336B.

The antenna coil 331 induces an induced voltage by electromagnetic induction. The controller 335 communicates with the recording/reproduction apparatus 30 via the antenna coil 331 with a specified communication standard. Specifically, for example, the controller 335 performs mutual authentication, command transmission/reception, or data exchange.

The controller 335 stores, in the memory 336, information received from the recording/reproduction apparatus 30 via the antenna coil 331. In response to a request from the recording/reproduction apparatus 30, the controller 335 reads information from the memory 336 and transmits the information to the recording/reproduction apparatus 30 via the antenna coil 331.

(7) Effects

The magnetic recording medium 10 according to the present technology includes the magnetic layer 13, the underlayer 12, the base layer 11, and the back layer 14. A servo pattern is recorded in the magnetic layer 13, and the statistical value $\sigma_{SW}$ indicating the non-linearity of a servo band and being obtained from the reproduction waveform of a servo signal of the servo pattern is 24 nm or less. The base layer 11 contains polyester as a main component. The average thickness $t_T$ of the magnetic recording medium 10 is 5.6 μm or less, the magnetic recording medium 10 contains a lubricant, and pores are formed in the magnetic recording medium 10. The average diameter of the pores is 6 nm or more and 11 nm or less. Consequently, the magnetic recording medium 10 achieves excellent travelling stability despite having a small thickness. The excellent travelling stability of the magnetic recording medium 10 is provided by a combination of the specific pores and the specific servo pattern.

The squareness ratio of the magnetic recording medium 10 in the vertical direction is favorably 65% or more, the arithmetic average roughness $R_a$ of the magnetic-layer-side surface of the magnetic recording medium is favorably 2.5 nm or less, and the average thickness $t_m$ of the magnetic layer is 80 nm or less. In the case of a magnetic recording medium having a small thickness, and particularly in the case of a magnetic recording medium having a small thickness and including a magnetic layer that includes the above-mentioned pores and the above-mentioned servo pattern, this configuration related to a magnetic layer is particularly suitable to improve the recording/reproduction characteristics.

(8) Modified Examples

Modified Example 1

Figure 9:
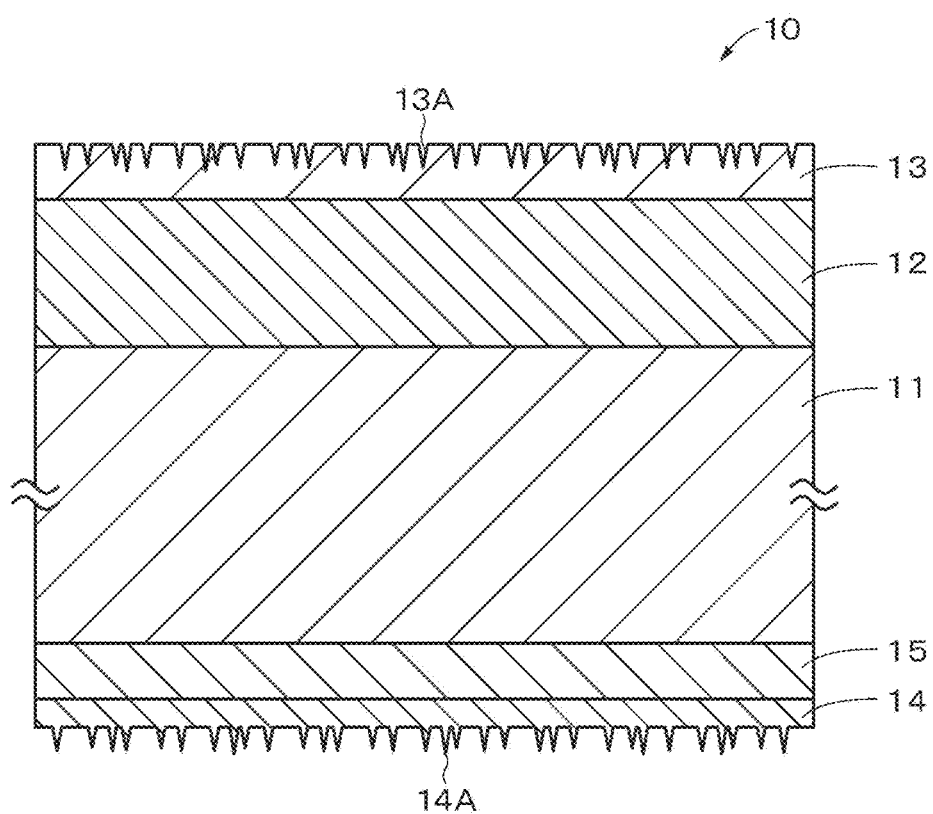
FIG. 9 is a schematic diagram of a cross section of the magnetic recording medium of a modified example.

As shown in FIG. 9, the magnetic recording medium 10 may further include a barrier layer 15 provided on at least one surface of the base layer 11. The barrier layer 15 is a layer for suppressing a dimensional change in the base layer 11 depending on the environment. For example, the hygroscopicity of the base layer 11 is an example of the cause of the dimensional change, and the barrier layer 15 makes it possible to reduce a speed of penetration of water into the base layer 11. The barrier layer 15 contains metal or metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta can be used. As the metal oxide, for example, at least one of $Al_2O_3$, CuO, CoO, $SiO_2$, $Cr_2O_3$, $TiO_2$, $Ta_2O_5$, or $ZrO_2$ can be used, or one of the oxides of the above-mentioned metals can also be used. Further, diamond-like carbon (DLC), diamond, or the like can also be used.

The average thickness of the barrier layer 15 is favorably not less than 20 nm and not more than 1000 nm, and more favorably not less than 50 nm and not more than 1000 nm. The average thickness of the barrier layer 15 is obtained similarly to the average thickness $t_m$ of the magnetic layer 13. However, the magnification of the TEM image is appropriately adjusted in accordance with the thickness of the barrier layer 15.

Modified Example 2

The magnetic recording medium 10 may be incorporated into a library apparatus. That is, the present technology also provides a library apparatus including at least one magnetic recording medium 10. The library apparatus may have a configuration capable of adjusting the tension to be applied in the longitudinal direction of the magnetic recording medium 10, and include a plurality of the above-mentioned recording/reproduction apparatuses 30.

3. Examples

Hereinafter, the present technology will be specifically described by way of Examples. However, the present technology is not limited to only these Examples.

In Examples and Comparative Examples indicated below, the values of the average thickness $t_T$ of a magnetic tape, the surface roughness $R_a$ of a magnetic layer (arithmetic average roughness $R_a$ of the magnetic-layer-side surface), the squareness ratio S2, the average thickness $t_m$ of the magnetic layer, the average diameter of pores, the statistical value $\sigma_{SW}$ indicating the non-linearity of a servo band, the SNR, the friction coefficient ratio ($\mu_B/\mu_A$), and the friction coefficient ratio ($\mu_{C(1000)}/\mu_{C(5)}$) are values obtained by the measurement methods described in "2. Embodiments of Present Technology (Example of Coating-Type Magnetic Recording Medium)".

3-1. Evaluations of Travelling Stability and SNR (1) Production of Magnetic Tape The magnetic tapes of Examples 1 to 16 and Comparative Examples 1 to 3 were produced as described below. With respect to these magnetic tapes, the type of magnetic powder of a magnetic tape, the average thickness $t_T$ of the magnetic tape, the surface roughness $R_a$ of a magnetic layer (roughness $R_a$ of a magnetic surface), the squareness ratio S2, the average thickness $t_m$ of the magnetic layer, the average diameter of pores, and the statistical value $\sigma_{SW}$ indicating the non-linearity of a servo band are given in Table 2 indicated below.

Example 1

(Process of Preparing Coating Material for Forming Magnetic Layer)

A coating material for forming a magnetic layer was prepared as follows. First, a first composition having the following formulation was kneaded by an extruder. Next, the kneaded first composition and a second composition having the following formulation were added to a stirring tank including a dispersing device, and premixed. Subsequently, further sand mill mixing was performed, and filter treatment was performed to prepare a coating material for forming a magnetic layer.

(First Composition)

Powder (hexagon plate shape and the average particle volume of 1950 nm$^3$) of barium ferrite (BaFe$_{12}$O$_{19}$) particles: 100 parts by mass Cyclohexanone solution of vinyl chloride resin: 42 parts by mass (The composition of the solution included resin content of 30 mass % and cyclohexanone of 70 mass %. The details of the vinyl chloride resin were the following: degree of polymerization 300, Mn=10000, containing OSO$_3$K=0.07 mmol/g and secondary OH=0.3 mmol/g as polar groups)

Aluminum oxide powder: 5 parts by mass ($\alpha$-Al$_2$O$_3$, average particle size of 0.1 μm)

Carbon black: 2 parts by mass (Manufactured by TOKAI CARBON CO., LTD., trade name: SEAST TA)

(Second Composition)

Cyclohexanone solution of vinyl chloride resin: 3 parts by mass (The composition of the solution included resin content of 30 mass % and cyclohexanone of 70 mass %.)

n-butyl stearate: 2 parts by mass

Methyl ethyl ketone: 121.3 parts by mass

Toluene: 121.3 parts by mass

Cyclohexanone: 60.7 parts by mass

Finally, polyisocyanate (trade name: Coronate L manufactured by TOSOH CORPORATION): 4 parts by mass and myristic acid: 2 parts by mass were respectively added as a curing agent and a lubricant to the coating material for forming a magnetic layer prepared as described above.

(Process of Preparing Coating Material for Forming Underlayer)

The coating material for forming an underlayer was prepared as follows. First, a third composition having the following formulation was kneaded by an extruder. Next, the kneaded third composition and a fourth composition having the following formulation were added to a stirring tank including a dispersing device, and premixed. Subsequently, further sand mill mixing was performed, and filter treatment was performed to prepare a coating material for forming an underlayer.

(Third Composition)

Iron oxide powder having a needle shape: 100 parts by mass ($\alpha$-Fe$_2$O$_3$, the average major axis length of 0.15 μm)

Cyclohexanone solution of vinyl chloride resin: 60.6 parts by mass (The composition of the solution included resin content of 30 mass % and cyclohexanone of 70 mass %.)

Carbon black: 10 parts by mass (Average particle size of 20 nm)

(Fourth Composition)

Polyurethane resin UR8200 (manufactured by TOYOBO CO., LTD.): 18.5 parts by mass n-butyl stearate: 2 parts by mass Methyl ethyl ketone: 108.2 parts by mass Toluene: 108.2 parts by mass Cyclohexanone: 18.5 parts by mass Finally, polyisocyanate (trade name: Coronate L manufactured by TOSOH CORPORATION): 4 parts by mass and myristic acid: 2 parts by mass were respectively added as a curing agent and a lubricant to the coating material for forming an underlayer prepared as described above.

(Process of Preparing Coating Material for Forming Back Layer)

A coating material for forming a back layer was prepared as follows. The following raw materials were mixed in a stirring tank including a dispersing device, and filter treatment was performed to prepare a coating material for forming a back layer.

Powder of carbon black having a small particle size (average particle size (D50) of 20 nm): 90 parts by mass Powder of carbon black having a large particle size (average particle size (D50) of 270 nm): 10 parts by mass Polyester polyurethane: 100 parts by mass (Manufactured by TOSOH CORPORATION, trade name: N-2304)

Methyl ethyl ketone: 500 parts by mass

Toluene: 400 parts by mass

Cyclohexanone: 100 parts by mass (Coating Process)

The coating material for forming a magnetic layer and the coating material for forming an underlayer prepared as described above were used to form an underlayer and a magnetic layer on one main surface of an elongated polyethylene naphthalate film (hereinafter, referred to as "PEN film") having an average thickness of 4.12 µm, which was a non-magnetic support, the underlayer having been formed so that the average thickness after drying and calendaring would be 1.0 µm, the magnetic layer having been formed so that the average thickness after drying and calendaring would be 80 nm. First, the coating material for forming an underlayer was coated on one main surface of the PEN film and dried to form an underlayer. Next, the coating material for forming a magnetic layer was coated on the underlayer and dried to form a magnetic layer. Note that during drying of the coating material for forming a magnetic layer, the magnetic field of the magnetic powder was oriented in the thickness direction of the film by a solenoid coil. Further, the drying conditions (drying temperature and drying time) of the coating material for forming a magnetic layer were adjusted, and the squareness ratio S1 in the thickness direction (vertical direction) of a magnetic tape and the squareness ratio S2 in the longitudinal direction of the magnetic tape were set to the values given in Table 2. Subsequently, the coating material for forming a back layer was coated on the other main surface of the PEN film and dried to form a back layer having an average thickness of 0.4 µm. In this way, a magnetic tape was obtained.

(Calendar Process and Transfer Process)

Subsequently, calendar processing was performed to smooth the surface of the magnetic layer. Next, after winding the obtained magnetic tape into a roll, heat treatment of 60° C. was performed for 10 hours on the magnetic tape in this state. Then, after rewinding the magnetic tape into a roll so that the end portion located on the inner circumference side would be located on the outer circumference side, heat treatment of 60° C. was performed for 10 hours again on the magnetic tape in this state. As a result, a large number of protrusions on the surface of the back layer were transferred to the surface of the magnetic layer, and a large number of holes were formed on the surface of the magnetic layer.

(Cut Process)

The magnetic tape obtained as described above was cut into a width of ½ inch (12.65 mm). As a result, a target elongated magnetic tape (an average thickness of 5.6 µm) was obtained.

(Recording of Servo Pattern)

The magnetic tape having a width of ½ inch was wound around a reel provided in a cartridge case to obtain a magnetic recording cartridge. A servo pattern was recorded in the magnetic tape using a servo track writer. The servo pattern conformed to the LTO-8 standard. The servo track writer was the servo writer disclosed in WO 2019/093469 (specifically, the servo writer described with reference to FIG. 1 of WO 2019/093469) that includes, as a servo signal writing head, the magnetic head described in Japanese Patent Application Laid-open No. 2006-127730 with reference to FIG. 26 of Japanese Patent Application Laid-open No. 2006-127730. An outline of the servo track writer will be described below with reference to FIGS. 12 and 13. For the details of the servo track writer, refer to the above-mentioned two documents.

Figure 12:
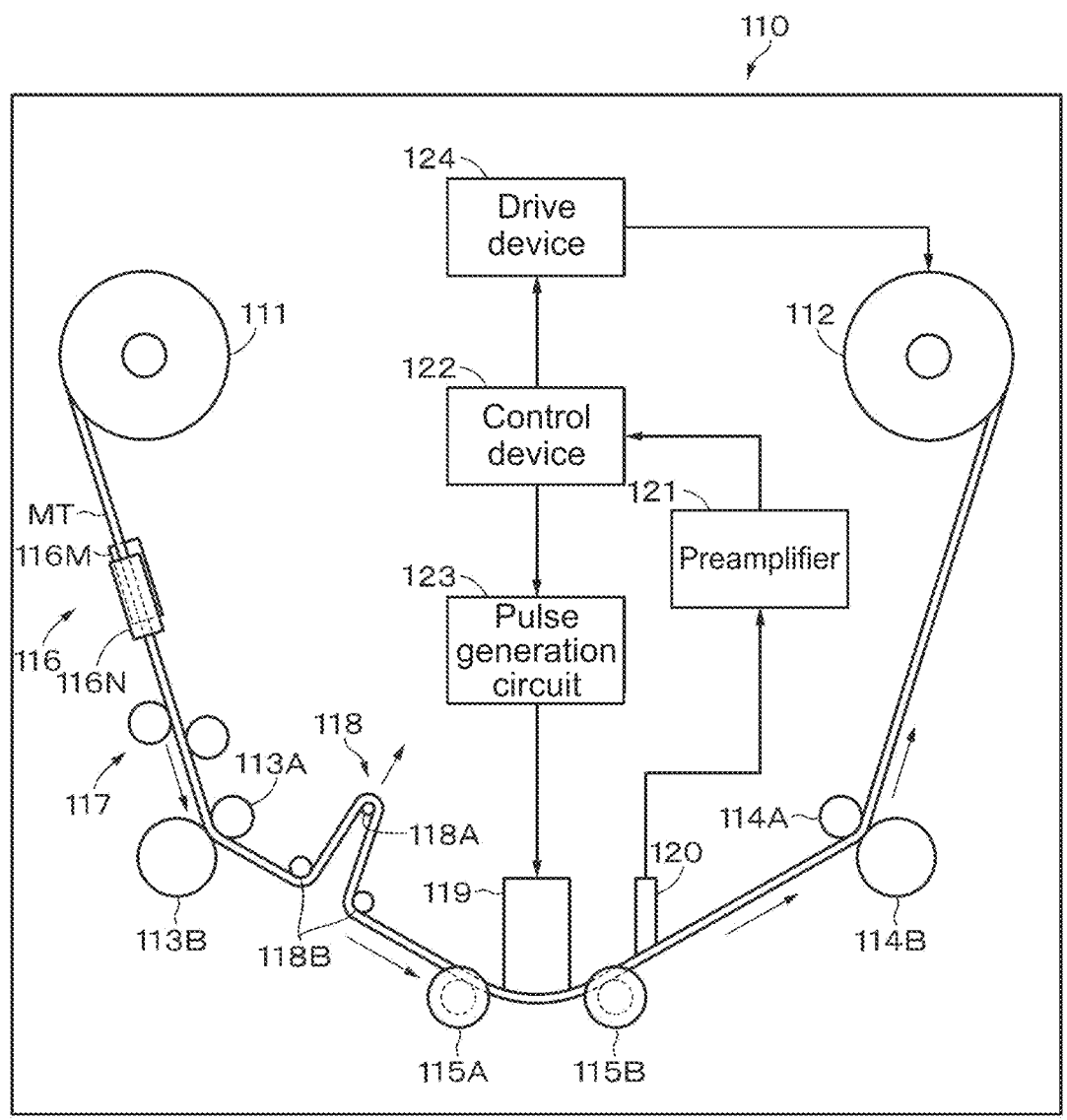
FIG. 12 is a schematic diagram of a servo track writer used in Examples of the present technology.

FIG. 12 is a schematic diagram of the servo track writer, and corresponds to FIG. 1 of WO 2019/093469. As shown in FIG. 12, a servo track writer 110 includes a delivery reel 111, a take-up reel 112, capstans 113A and 114A, pinch rollers 113B and 114B, guide rollers 115A and 115B, a polishing unit 116, a dusting unit 117, a tension adjustment unit 118, a servo signal writing head 119, a servo signal reading head 120, a preamplifier 121, a control device 122, a pulse generation circuit 123, and a drive device 124. This servo track writer 110 is an apparatus for writing a servo signal to servo bands of the elongated magnetic tape MT.

FIG. 13 a schematic diagram of the servo signal writing head 119, and corresponds to FIG. 26 of Japanese Patent Application Laid-open No. 2006-127730. As shown in A of FIG. 13, the servo signal writing head 119 includes a head chip 132, and has, on the top surface of the head chip 132, a sliding surface 134 for a linear-type magnetic tape (not shown). In the sliding surface 134, at least a magnetic head unit 135 including recording elements, some of which is used for servo signal recording, and a bottomed cavity 136 having a closed periphery are formed.

As shown in B of FIG. 13, at least a part of the sliding surface 134 of the servo signal writing head 219 is a flat surface. A linear-type magnetic tape (not shown) disposed to face the sliding surface 134 has a smaller spacing with the sliding surface 134 during travelling, because the nearby air is taken by the edge portion of the magnetic head sliding surface 134 and the pressure is reduced by the bottomed cavity 136.

The distance between the servo signal writing head 119 having a cavity and being mounted on the servo track writer 110, and the guide rollers 115A and 115B adjacent to the servo signal writing head 119 was adjusted, and the angle at which the tape enters the servo signal writing head 119 was adjusted, so as to adjust the friction between the servo signal writing head 119 and the tape when recording servo patterns. Consequently, $\sigma_{SW}$ of the magnetic tape was adjusted to 23 nm.

Example 2

A magnetic tape in which a servo pattern has been recorded was produced by a method similar to the method used for Example 1 except that the thickness of the PEN film was changed to obtain a magnetic recording medium having an average thickness $t_T$ of 5.0 µm.

Example 3

A magnetic tape in which a servo pattern has been recorded was produced by a method similar to the method used for Example 1 except that the pressure in the calendar process was increased to change, to 2.2 nm, the arithmetic average roughness $R_a$ of the magnetic-layer-side surface that is a magnetic surface.

Example 4

A magnetic tape in which a servo pattern has been recorded was produced by a method similar to the method used for Example 1 except that the time to apply the magnetic field to the coating material for forming a magnetic layer was adjusted to set, to 70%, the squareness ratio S2 in the thickness direction (vertical direction) of the magnetic tape.

Example 5

A magnetic tape in which a servo pattern has been recorded was produced by a method similar to the method used for Example 1 except that the average thickness of the magnetic layer was changed to 70 nm.

Example 6

A magnetic tape in which a servo pattern has been recorded was produced by a method similar to the method used for Example 1 except that the average thickness of the magnetic layer was changed to 50 nm.

Example 7

A magnetic tape in which a servo pattern has been recorded was produced by a method similar to the method used for Example 1 except that the heat temperature in the heat treatment performed after the calendar processing was decreased to change the average diameter of pores to 6 nm.

Example 8

A magnetic tape in which a servo pattern has been recorded was produced by a method similar to the method used for Example 1 except that the heat temperature in the heat treatment performed after the calendar processing was increased to change the average diameter of pores to 11 nm.

Example 9

A magnetic tape in which a servo pattern has been recorded was produced by a method similar to the method used for Example 1 except that the friction between the servo signal writing head 119 and the tape was reduced when performing the recording of servo patterns as described in Example 1 to change the statistical value $\sigma_{SW}$ to 20 nm.

Example 10

A magnetic tape in which a servo pattern has been recorded was obtained by a method similar to the method used for Example 9 except that the distance between the servo signal writing head 119 mounted on the servo track writer 110, and the guide rollers 115A and 115B adjacent to the servo signal writing head 119 was further adjusted to further reduce the friction. The statistical value $\sigma_{SW}$ of the magnetic tape was 15 nm.

Example 11

A magnetic tape in which a servo pattern has been recorded was obtained by a method similar to the method used for Example 1 except that the magnetic powder contained in the magnetic layer was changed from the powder of barium ferrite particles to a powder of strontium ferrite particles.

Examples 12 and 13

A magnetic tape in which a servo pattern has been recorded was obtained by a method similar to the method used for Example 1 except that the magnetic powder contained in the magnetic layer was changed from the powder of barium ferrite particles to a powder of ε-iron oxide nanoparticles or a powder of cobalt iron oxide.

Example 14

A magnetic tape in which a servo pattern has been recorded was obtained by a method similar to the method used for Example 1 except that the drying temperature was increased in the process of drying a coating film to change the arithmetic average roughness $R_a$ of the magnetic-layer-side surface to 3.0 nm.

Example 15

A magnetic tape in which a servo pattern has been recorded was obtained by a method similar to the method used for Example 1 except that the time to apply the magnetic field to the coating material for forming a magnetic layer was adjusted to set, to 60%, the squareness ratio S2 of the magnetic tape in the thickness direction (vertical direction).

Example 16

A magnetic tape in which a servo pattern has been recorded was obtained by a method similar to the method used for Example 1 except that the average thickness of the magnetic layer was changed to 90 nm.

Comparative Example 1

A magnetic tape in which a servo pattern has been recorded was obtained by a method similar to the method used for Example 1 except that the tension of the magnetic tape in the servo writing was increased to change the statistical value $\sigma_{SW}$ indicating the non-linearity of a servo band to 25 nm.

Comparative Example 2

A magnetic tape in which a servo pattern has been recorded was obtained by a method similar to the method used for Example 1 except that the heat temperature in the heat treatment performed after the calendar processing was decreased to change the average diameter of pores to 5 nm.

Comparative Example 3

A magnetic tape in which a servo pattern has been recorded was obtained by a method similar to the method used for Example 1 except that the heat temperature in the heat treatment performed after the calendar processing was increased to change the average diameter of pores to 12 nm.

(2) Evaluations

With respect to the magnetic tapes of Examples 1 to 16 and Comparative Examples 1 to 3 that were produced in (1) described above, the friction coefficient ratio ($\mu_B/\mu_A$) and the friction coefficient ratio ($\mu_{C(1000)}/\mu_{C(5)}$) were measured. They were measured by the measurement methods described in "2. Embodiments of Present Technology (Example of Coating-Type Magnetic Recording Medium)". The fact that these friction coefficient ratios are high (such as 2.0 or more) may result in the relative difference p during the travelling of a magnetic tape becoming larger. When the relative difference p is too large, this may result in a decrease in the travelling stability and in entering a fail state.

A measurement result of the friction coefficient ratios is given in Table 2 indicated below.

Further, with respect to the magnetic tapes of Examples 1 to 16 and Comparative Examples 1 to 3, the SNR and the travelling stability were evaluated. An evaluation result is given in Table 2 indicated below. Methods of evaluating the SNR and the travelling stability were as indicated below.

(SNR)

First, the SNR (electromagnetic conversion characteristics) of the magnetic tape in the 25° C. environment was measured using a ½ inch tape travelling device (manufactured by Mountain Engineering II, INC., MTS Transport) to which a recording/reproduction head and a recording/reproduction amplifier were attached. A ring head having a gap length of 0.2 μm was used as the recording head, and a GMR head having a shield-to-shield distance of 0.1 μm was used as the reproduction head. The relative speed was 6 m/s, the recording clock frequency was 160 MHz, and the recording track width was 2.0 μm. Further, the SNR was calculated on the basis of the method described in the following literature. With respect to the SNR, it was relatively evaluated whether the SNR was increased or decreased, with the value of Example 1 being used as a reference.

Y. Okazaki: "An Error Rate Emulation System.", IEEE Trans. Man., 31, pp. 3093-3095 (1995)

(Travelling Stability)

The magnetic tape was incorporated into an LTO cartridge. A so-called full volume test in which data was recorded on the entire surface of the magnetic tape and reproduced using an LTO drive connected to a server and a PC via SCSI and Fibre Channel was performed on the LTO cartridge. In the full volume test, the data recording status was sequentially monitored, and information relating to a problem was recorded when the problem occurred.

In the full volume test, so-called stop write in which a drive automatically pauses recording when the travelling status of the magnetic tape is unstable is performed. If the stop write is performed, the data transfer rate decreases. Further, in the full volume test, if the travelling state of the magnetic tape becomes more unstable, the drive automatically stops recording completely and enters a so-called fail state.

The full volume test was repeatedly performed 5 times sequentially on the magnetic tapes according to Examples 1 to 16 and Comparative Examples 1 to 3, and a "relative value of the transfer rate of the fifth full volume test" and "presence or absence of fail" were recorded. The relative value of the transfer rate of the full volume test is a ratio of the average transfer rate per full volume test to the transfer rate of the drive used for evaluation in the case where the highest performance of the drive has been delivered. The case where the highest performance of the drive was delivered is taken as 100%. For example, in the case where recording is performed in an LTO8 format using an LTO8 drive, the transfer rate of the LTO8 drive when the drive delivered the highest performance is 350 MB/sec. The "presence or absence of fail" indicates whether the drive has entered the fail state as described above.

Each of the magnetic tapes was evaluated in accordance with the four-level evaluation criteria shown in Table 1 indicated below. As shown in Table 1, the level 4 means having the best travelling stability, and the level 1 means having the worst travelling stability. For example, in the case where all the relative values of the transfer rate of the magnetic tape in the five full volume tests was 95% or more and 100% or less and there is no fail, the magnetic tape is rated as level 4. A rating of the level 4 or 3 (i.e., the transfer rate of the magnetic tape in the fifth full volume test is 80% or more) is desirable from the viewpoint of favorable travelling stability of the magnetic tape.

The evaluation result of the travelling stability of each of the magnetic tapes is shown in the column of "Travelling stability level" in Table 2.

TABLE 1

| Level | Relative value of transfer rate of fifth full volume test | Presence or absence of fail |
|---|---|---|
| 4 | 95% or more and 100% or less | Absence |
| 3 | 80% or more and less than 95% | Absence |
| 2 | Less than 80% | Absence |
| 1 | Less than 80% | Presence |

TABLE 2

| | Magnetic material | Total thickness of tape $t_T$ (μm) | Roughness of magnetic surface $R_a$ (nm) | Squareness ratio S2 (%) | Magnetic layer thickness $t_m$ (nm) | Average diameter of pores [nm] | Standard deviation of PES $\sigma_{SW}$ (nm) | SNR | Friction coefficient ratio $\mu_B/\mu_A$ | Friction coefficient ratio $\mu_{C(1000)}/\mu_{C(5)}$ | Travelling stability level |
|---|---|---|---|---|---|---|---|---|---|---|---|
| Example 1 | Hexagonal ferrite | 5.6 | 2.5 | 65 | 80 | 8 | 23 | 0.0 | 1.2 | 1.2 | 3 |
| Example 2 | Hexagonal ferrite | 5.0 | 2.5 | 65 | 80 | 8 | 23 | 0.0 | 1.2 | 1.2 | 3 |
| Example 3 | Hexagonal ferrite | 5.6 | 2.2 | 65 | 80 | 8 | 23 | 0.3 | 1.2 | 1.3 | 3 |
| Example 4 | Hexagonal ferrite | 5.6 | 2.5 | 70 | 80 | 8 | 23 | 0.0 | 1.2 | 1.3 | 3 |
| Example 5 | Hexagonal ferrite | 5.6 | 2.5 | 65 | 70 | 8 | 23 | 0.0 | 1.2 | 1.2 | 3 |
| Example 6 | Hexagonal ferrite | 5.6 | 2.5 | 65 | 50 | 8 | 23 | 0.0 | 1.2 | 1.2 | 3 |
| Example 7 | Hexagonal ferrite | 5.6 | 2.5 | 65 | 80 | 6 | 23 | 0.0 | 1.2 | 1.4 | 3 |
| Example 8 | Hexagonal ferrite | 5.6 | 2.5 | 65 | 80 | 11 | 23 | 0.0 | 1.4 | 1.2 | 3 |
| Example 9 | Hexagonal ferrite | 5.6 | 2.5 | 65 | 80 | 8 | 20 | 0.0 | 1.2 | 1.2 | 4 |
| Example 10 | Hexagonal ferrite | 5.6 | 2.5 | 65 | 80 | 8 | 15 | 0.0 | 1.2 | 1.2 | 4 |
| Example 11 | Sr ferrite | 5.6 | 2.5 | 65 | 80 | 8 | 23 | 0.0 | 1.2 | 1.2 | 3 |
| Example 12 | ε-iron oxide | 5.6 | 2.5 | 65 | 80 | 8 | 23 | 0.1 | 1.2 | 1.2 | 3 |
| Example 13 | Co-iron oxide | 5.6 | 2.5 | 65 | 80 | 8 | 23 | 0.2 | 1.2 | 1.2 | 3 |
| Example 14 | Hexagonal ferrite | 5.6 | 3.0 | 65 | 80 | 8 | 23 | −0.7 | 1.1 | 1.2 | 3 |

TABLE 2-continued

|  | Magnetic material | Total thickness of tape $t_T$ (μm) | Roughness of magnetic surface $R_a$ (nm) | Squareness ratio S2 (%) | Magnetic layer thickness $t_m$ (nm) | Average diameter of pores [nm] | Standard deviation of PES $\sigma_{SW}$ (nm) | SNR | Friction coefficient ratio $\mu_B/\mu_A$ | Friction coefficient ratio $\mu_{C(1000)}/\mu_{C(5)}$ | Travelling stability level |
|---|---|---|---|---|---|---|---|---|---|---|---|
| Example 15 | Hexagonal ferrite | 5.6 | 2.5 | 60 | 80 | 8 | 23 | −0.7 | 1.2 | 1.2 | 3 |
| Example 16 | Hexagonal ferrite | 5.6 | 2.5 | 65 | 90 | 8 | 23 | −0.7 | 1.2 | 1.4 | 3 |
| Comparative Example 1 | Hexagonal ferrite | 5.6 | 2.5 | 65 | 80 | 8 | 25 | 0.0 | 1.2 | 1.2 | 2 |
| Comparative Example 2 | Hexagonal ferrite | 5.6 | 2.5 | 65 | 80 | 5 | 23 | 0.0 | 2.2 | 2.1 | 2 |
| Comparative Example 3 | Hexagonal ferrite | 5.6 | 2.5 | 65 | 80 | 12 | 23 | 0.0 | 2.2 | 2.3 | 2 |

The results indicated in Table 2 shows the following.

With respect to the magnetic tapes of Examples 1 to 16, the evaluation results of the travelling stability of these magnetic tapes were 3 or 4 despite the fact that all of the magnetic tapes had a total thickness $t_T$ of 5.6 μm or less. This shows that the magnetic recording medium according to the present technology achieves excellent travelling stability despite having a small total thickness.

Further, the comparison of the results of Examples 1 and 7 to 10 and the results of Comparison Examples 1 to 3 shows that the travelling stability is improved due to the statistical value $\mu_{SW}$ being 23 nm or less and the average diameter of pores being 6 nm-11 nm.

For example, when Example 1 is compared with Comparative Example 1, the statistical value $\sigma_{SW}$ was 23 nm and the evaluation result of the travelling stability was 3 in the former case, whereas the statistical value $\sigma_{SW}$ was 25 nm and the evaluation result of the travelling stability was 2 in the latter case. In addition, in Examples 9 and 10 in which the statistical value $\sigma_{SW}$ was smaller than that of Example 1, the evaluation result of the travelling stability was 4. These results show that setting of the statistical value $\sigma_{SW}$ to, for example, 23 nm or less contributed toward the improvement in the travelling stability of the magnetic recording medium.

For example, when Example 1 is compared with Comparative Examples 2 and 3, the average diameter of pores was 8 nm and the evaluation result of the travelling stability was 3 in the former case, whereas the average diameters of pores were respectively 5 nm and 12 nm and the evaluation results of the travelling stability were 2 for both of the examples in the latter case. In addition, in Examples 7 and 8 in which the average diameters of pores were respectively 6 nm and 11 nm, the evaluation results of the travelling stability were 3 for both of the examples. These results show that setting of the average diameters of pores to, for example, 6 nm-11 nm contributed toward the improvement in the travelling stability of the magnetic recording medium.

Further, the comparison of the results of Examples 1 and 3 to 6 and the results of Examples 14 to 16 shows that the SNR is improved, that is, the recording/reproduction characteristics are improved due to the roughness $R_a$ of a magnetic surface being 2.5 nm or less, the squareness ratio S2 being 65% or more, and the average thickness of a magnetic layer being 80 nm or less.

For example, when Example 1 is compared with Example 14, the roughness $R_a$ of a magnetic surface was 2.5 nm and the SNR was 0.0 in the former case, whereas the roughness $R_a$ of a magnetic surface was 3.0 nm and the SNR was −0.7 in the latter case. In addition, in Example 3 in which the degree of the roughness $R_a$ of a magnetic surface was lower than that of Example 1, the SNR was 0.3. These results show that setting of the roughness $R_a$ of a magnetic surface to, for example, 2.5 nm or less contributed toward the improvement in the recording/reproduction characteristics of the magnetic recording medium.

For example, when Example 1 is compared with Example 15, the squareness ratio was 65% and the SNR was 0.0 in the former case, whereas the squareness ratio was 60% and the SNR was −0.7 in the latter case. In addition, in Example 4 in which the squareness ratio was higher than that of Example 1, the SNR was 0.0. These results show that setting of the squareness ratio to, for example, 65% or more contributed toward the improvement in the recording/reproduction characteristics of the magnetic recording medium.

For example, when Example 1 is compared with Example 16, the thickness of a magnetic layer was 80 nm and the SNR was 0.0 in the former case, whereas the thickness of a magnetic layer was 90 nm and the SNR was −0.7 in the latter case. In addition, in Examples 5 and 6 in which the thickness of a magnetic layer was smaller than that of Example 1, the SNR was 0.0. These results show that setting of the thickness of a magnetic layer to, for example, 80 nm or less contributed toward the improvement in the recording/reproduction characteristics of the magnetic recording medium.

The magnetic tape of Example 2 achieved a level of the travelling stability and a level of the recording/reproduction characteristics that are similar to those of Example 1 despite the fact that the magnetic tape of Example 2 has a total thickness $t_T$ smaller than that of Example 1. This shows that the effects of the present technology were also provided when the total thickness of a magnetic tape was made smaller than that of Example 1.

Although the magnetic tapes of Examples 11 to 13 each contained a different type of magnetic powder than that in Example 1, the magnetic tapes of Examples 11 to 13 each achieved a level of the travelling stability and a level of the recording/reproduction characteristics that are similar to those of Example 1. This shows that the effects of the present technology were also provided when the type of magnetic powder was changed.

All of the friction coefficient ratios ($\mu_B/\mu_A$) of the magnetic tapes of Examples 1 to 16 were 1.1-1.4. This shows that the change in dynamic friction coefficient due to a tension fluctuation during travelling was small between these magnetic tapes and that the magnetic tapes also achieved excellent travelling stability when a tension fluctuation occurred.

Further, when Examples 1 to 16 are compared with Comparative Examples 2 and 3, it is conceivable that the diameter of pores contributed toward the excellent travelling stability.

All of the friction coefficient ratios ($\mu_{C(1000)}/\mu_{C(5)}$) of the magnetic tapes of Examples 1 to 16 were 1.1-1.4. This shows that the change in dynamic friction coefficient caused by multiple travellings was small between these magnetic tapes and that the magnetic tapes also achieved excellent travelling stability at the time of travelling multiple times.

Further, when Examples 1 to 16 are compared with Comparative Examples 2 and 3, it is conceivable that the diameter of pores contributed toward the excellent travelling stability.

3-2. Difference in Servo Track Width Between Inside of Winding and Outside of Winding Example 1

The difference in servo track width between the inside of winding and the outside of the winding of the magnetic recording cartridge obtained in Example 1 was measured. The difference was 0.25 µm.

Example 17

A magnetic recording cartridge was obtained as described in Example 1 except that the tension applied at the time of recording a servo pattern was changed. The change in tension refers to the fact that the tension applied at the stage of starting recording of a servo pattern was made higher than that applied at the stage of terminating the recording of a servo pattern. The difference in servo track width between the inside of winding and the outside of the winding of the magnetic recording cartridge obtained in this way was measured. The difference was 0.00 µm.

The average thickness $t_T$, the surface roughness $R_a$ of a magnetic layer (roughness $R_a$ of a magnetic surface), the squareness ratio S2, the average thickness $t_m$ of the magnetic layer, the average diameter of pores, the statistical value $\sigma_{SW}$ indicating the non-linearity of a servo band, the evaluation result of an SNR, the friction coefficient ratio ($\mu_B/\mu_A$), the friction coefficient ratio ($\mu_{C(1000)}/\mu_{C(5)}$), and the evaluation result of travelling stability of a magnetic tape included in the magnetic recording cartridge of Example 17 were respectively identical to those of a magnetic tape included in the magnetic recording cartridge of Example 1.

With respect to the magnetic recording cartridges of Examples 1 and 17, the evaluation of a winding state (evaluation of the presence or the absence of a wrinkle) was performed. The evaluation was performed as follows.

The magnetic recording tape included in each magnetic recording cartridge was reciprocated in a recording/reproduction apparatus. Then, the above-mentioned two or more rows of the series of inverted-V-shaped magnetic patterns were simultaneously reproduced at the time of reciprocation, and the intervals between rows of the series of magnetic patterns at the time of travelling were continuously measured from the shape of the reproduced waveform of the respective rows. Note that the rotational driving of the spindle drive device and the reel drive device was controlled at the time of travelling on the basis of the information regarding the measured intervals between rows of the series of magnetic patterns, and tension in the longitudinal direction of the magnetic tape was automatically adjusted so that the intervals between rows of the series of magnetic patterns would be specified widths or substantially specified widths.

The reciprocation by the recording/reproduction apparatus was performed in a constant temperature/humidity chamber. The speed of the reciprocation was 5 m/sec. In accordance with an environmental change program (ex.: change from 10° C. and 10% to 29° C. and 80% and then to 10° C. and 10% repeated twice. Change from 10° C. and 10% to 29° C. and 80% in two hours and from 29° C. and 80% to 10° C. and 10% in two hours) that is set in advance, the temperature and humidity during the reciprocation were gradually and repeatedly changed within the temperature range of 10° C.-45° C. and within the relative humidity range of 10%-80%, independently of the above-mentioned reciprocation. This reciprocation was repeated until "the environmental change program set in advance" was finished.

After the reciprocation by the recording/reproduction apparatus was finished, the winding state of the magnetic recording medium included in each of the magnetic recording cartridges was visually observed from the side. This observation makes it possible to confirm the presence or the absence of the irregularity in the winding state due to the occurrence of a wrinkle. In this observation, the winding state was determined in accordance with the following criteria.

Favorable: Absence of the irregularity in a winding state due to a wrinkle

Unfavorable: Presence of the irregularity in a winding state due to a wrinkle

As a result of the observation, the winding state in the magnetic recording cartridge of Example 1 was favorable. On the other hand, the winding state in the magnetic recording cartridge of Example 17 was unfavorable. These results show that the winding state is favorable (a wrinkle does not occur in the case where a magnetic recording medium is wound around a reel in a cartridge) due to the difference in servo track width between the inside of winding and the outside of the winding being greater than 0.00 µm, favorably 0.01 µm or more, more favorably 0.02 µm or more, and still more favorably 0.05 µm or more.

Although embodiments of the present technology and Examples thereof have been specifically described above, the present technology is not limited to the above-mentioned embodiments and Examples thereof and various modifications can be made on the basis of the technical idea of the present technology.

For example, the configurations, the methods, the processes, the shapes, the materials, and the numerical values cited in the above-mentioned embodiments and Examples thereof are only illustrative, and different configurations, methods, processes, shapes, materials, and numerical values may be used as necessary. Further, the chemical formulae of the compounds are representative, and are not limited to the listed valances or the like as long as they have the general name of the same compound.

Further, the configurations, the methods, the processes, the shapes, the materials, and the numerical values of the above-mentioned embodiments and Examples thereof can be combined with each other without departing from the essence of the present technology.

Furthermore, as used herein, the numerical range indicated using "-" refers to a range that includes numerical values respectively placed before and after "-" as a minimum value and a maximum value, respectively. Within the numerical range described herein in a stepwise manner, the upper limit value or the lower limit value of the numerical range in a certain step may be replaced with the upper limit value or the lower limit value of the numerical range in another step. Regarding the materials illustrated herein, one type thereof can be used alone or two or more types thereof can be used in combination unless otherwise specified.

Note that the present technology may also take the following configurations.

(1) A tape-shaped magnetic recording medium including:
a magnetic layer;
an underlayer;
a base layer; and
a back layer, in which
a servo pattern is recorded in the magnetic layer,
a statistical value $\sigma_{SW}$ indicating non-linearity of a servo band and being obtained from a reproduction waveform of a servo signal of the servo pattern is 24 nm or less,
the base layer contains polyester as a main component,
an average thickness $t_T$ of the magnetic recording medium is 5.6 μm or less,
the magnetic recording medium contains a lubricant,
pores are formed in the magnetic recording medium, and
an average diameter of the pores that is measured in a state where the lubricant has been removed from the magnetic recording medium and the magnetic recording medium has been dried, is 6 nm or more and 11 nm or less.

(2) The magnetic recording medium according to (1), in which
a squareness ratio in a vertical direction of the magnetic recording medium is 65% or more.

(3) The magnetic recording medium according to (1) or (2), in which
an arithmetic average roughness $R_a$ of a magnetic-layer-side surface of the magnetic recording medium is 2.5 nm or less.

(4) The magnetic recording medium according to any one of (1) to (3), in which
an average thickness $t_m$ of the magnetic layer is 80 nm or less.

(5) The magnetic recording medium according to any one of (1) to (4), in which
a squareness ratio in a vertical direction of the magnetic recording medium is 65% or more,
an arithmetic average roughness $R_a$ of a magnetic-layer-side surface of the magnetic recording medium is 2.5 nm or less, and
an average thickness $t_m$ of the magnetic layer is 80 nm or less.

(6) The magnetic recording medium according to any one of (1) to (5), in which
the magnetic layer contains a magnetic powder, and
the magnetic powder includes hexagonal ferrite, ε-iron oxide, or Co-containing spinel ferrite.

(7) The magnetic recording medium according to (6), in which
the hexagonal ferrite includes at least one type of Ba or Sr, and
the ε-iron oxide includes at least one type of Al or Ga.

(8) The magnetic recording medium according to any one of (1) to (7), in which
a friction coefficient ratio ($\mu_B/\mu_A$) of a dynamic friction coefficient $\mu_B$ to a dynamic friction coefficient $\mu_A$ is 1.0-2.0, the dynamic friction coefficient $\mu_B$ being a coefficient of dynamic friction between a magnetic-layer-side surface of the magnetic recording medium and a magnetic head in a state where a tension of 1.2 N is being applied in a longitudinal direction of the magnetic recording medium, the dynamic friction coefficient $\mu_A$ being a coefficient of dynamic friction between the magnetic-layer-side surface of the magnetic recording medium and the magnetic head in a state where a tension of 0.4 N is being applied in the longitudinal direction of the magnetic recording medium.

(9) The magnetic recording medium according to any one of (1) to (8), in which
a friction coefficient ratio ($\mu_{C(1000)}/\mu_{C(5)}$) of a dynamic friction coefficient $\mu_{C(1000)}$ to a dynamic friction coefficient $\mu_{C(5)}$ is 1.0-2.0, the dynamic friction coefficient $\mu_{C(1000)}$ being a coefficient of dynamic friction upon the 1000th reciprocation when the magnetic recording medium to which a tension of 0.6 N is being longitudinally applied is caused to reciprocate on a magnetic head 1000 times, the dynamic friction coefficient $\mu_{C(5)}$ being a coefficient of dynamic friction upon the fifth reciprocation when the magnetic recording medium to which the tension of 0.6 N is being longitudinally applied is slid to reciprocate on the magnetic head five times.

(10) The magnetic recording medium according to any one of (1) to (9), in which
the lubricant contains a fatty acid or a fatty acid ester or both the fatty acid and the fatty acid ester.

(11) The magnetic recording medium according to (10), in which
the fatty acid includes a compound represented by General Formula (1) or (2) indicated below, and
the fatty acid ester includes a compound represented by General Formula (3) or (4) indicated below:

$$CH_3(CH_2)_k COOH \quad (1)$$

(where k is an integer selected from a range of 14 or more and 22 or less)

$$CH_3(CH_2)_n CH=CH(CH_2)_m COOH \quad (2)$$

(where a sum of n and m is an integer selected from a range of 12 or more and 20 or less)

$$CH_3(CH_2)_p COO(CH_2)_q CH_3 \quad (3)$$

(where p is an integer selected from a range of 14 or more and 22 or less, and q is an integer selected from a range of 2 or more and 5 or less)

$$CH_3(CH_2)_r COO-(CH_2)_s CH(CH_3)_2 \quad (4)$$

(where r is an integer selected from a range of 14 or more and 22 or less, and s is an integer selected from a range of 1 or more and 3 or less).

(12) The magnetic recording medium according to any one of (1) to (11), in which
a coercive force $H_c$ in a longitudinal direction of the magnetic recording medium is 2000 Oe or less.

(13) The magnetic recording medium according to any one of (1) to (12), in which
the statistical value $\sigma_{SW}$ is 23 nm or less.

(14) The magnetic recording medium according to any one of (1) to (13), in which
the statistical value $\sigma_{SW}$ is 10 nm or more and 23 nm or less.

(15) The magnetic recording medium according to any one of (1) to (14), in which
the average diameter of the pores is 6 nm or more and 10 nm or less.

(16) The magnetic recording medium according to any one of (1) to (15), in which
the average diameter of the pores is 7 nm or more and 9 nm or less.

(17) The magnetic recording medium according to any one of (1) to (16), in which
an average thickness of the base layer is 4.2 μm or less.

(18) The magnetic recording medium according to any one of (1) to (17), in which the magnetic layer contains a magnetic powder, and
an average aspect ratio of the magnetic powder is 1.0 or more and 3.5 or less.

(19) The magnetic recording medium according to any one of (1) to (18), in which
the magnetic layer contains a magnetic powder, and
an average particle size of the magnetic powder is 50 nm or less.

(20) A magnetic recording cartridge in which the tape-shaped magnetic recording medium according to any one of (1) to (19) is housed in a state of being wound around a reel, in which
(a servo track width of an inside of winding of the magnetic recording medium)–(a servo track width of an outside of the winding of the magnetic recording medium)>0 μm.

REFERENCE SIGNS LIST

10 magnetic recording medium
11 base layer
12 underlayer
13 magnetic layer
14 back layer

The invention claimed is:
1. A tape-shaped magnetic recording medium comprising:
a magnetic layer;
an underlayer;
a base layer; and
a back layer, wherein
  a servo pattern is recorded in the magnetic layer,
  a statistical value $\sigma_{SW}$ indicating non-linearity of a servo band and being obtained from a reproduction waveform of a servo signal of the servo pattern is 24 nm or less, wherein the statistical value $\sigma_{SW}$ is defined by equal (1):

$$\sigma_{SW} = \sqrt{\sum WIP(f) \times df}, \quad (1)$$

wherein WIP(f) is displacement difference during actual drive and df is wave number interval,
the base layer contains polyester as a main component,
an average thickness $t_T$ of the magnetic recording medium is 5.6 μm or less,
the magnetic recording medium contains a lubricant,
pores are formed in the magnetic recording medium, and
an average diameter of the pores that is measured in a state where the lubricant has been removed from the magnetic recording medium and the magnetic recording medium has been dried, is 6 nm or more and 11 nm or less, and
wherein a friction coefficient ratio ($\mu_B/\mu_A$) of a dynamic friction coefficient $\mu_B$ to a dynamic friction coefficient $\mu_A$ is 1.0-2.0, the dynamic friction coefficient $\mu_B$ being a coefficient of dynamic friction between a magnetic-layer-side surface of the magnetic recording medium and a magnetic head in a state where a tension of 1.2 N is being applied in a longitudinal direction of the magnetic recording medium, the dynamic friction coefficient $\mu_A$ being a coefficient of dynamic friction between the magnetic-layer-side surface of the magnetic recording medium and the magnetic head in a state where a tension of 0.4 N is being applied in the longitudinal direction of the magnetic recording medium.

2. The magnetic recording medium according to claim 1, wherein
a squareness ratio in a vertical direction of the magnetic recording medium is 65% or more.

3. The magnetic recording medium according to claim 1, wherein
an arithmetic average roughness $R_a$ of a magnetic-layer-side surface of the magnetic recording medium is 2.5 nm or less.

4. The magnetic recording medium according to claim 1, wherein
an average thickness $t_m$ of the magnetic layer is 80 nm or less.

5. The magnetic recording medium according to claim 1, wherein
a squareness ratio in a vertical direction of the magnetic recording medium is 65% or more,
an arithmetic average roughness $R_a$ of a magnetic-layer-side surface of the magnetic recording medium is 2.5 nm or less, and
an average thickness $t_m$ of the magnetic layer is 80 nm or less.

6. The magnetic recording medium according to claim 1, wherein
the magnetic layer contains a magnetic powder, and
the magnetic powder includes hexagonal ferrite, ε-iron oxide, or Co-containing spinel ferrite.

7. The magnetic recording medium according to claim 6, wherein
the hexagonal ferrite includes at least one type of Ba or Sr, and
the ε-iron oxide includes at least one type of Al or Ga.

8. A tape-shaped magnetic recording medium comprising:
a magnetic layer;
an underlayer;
a base layer; and
a back layer, wherein
  a servo pattern is recorded in the magnetic layer,
  a statistical value $\sigma_{SW}$ indicating non-linearity of a servo band and being obtained from a reproduction waveform of a servo signal of the servo pattern is 24 nm or less, wherein the statistical value $\sigma_{SW}$ is defined by equal (1):

$$\sigma_{SW} = \sqrt{\sum WIP(f) \times df}, \quad (1)$$

wherein WIP(f) is displacement difference during actual drive and df is wave number interval,
the base layer contains polyester as a main component,
an average thickness $t_T$ of the magnetic recording medium is 5.6 μm or less,
the magnetic recording medium contains a lubricant,
pores are formed in the magnetic recording medium, and
an average diameter of the pores that is measured in a state where the lubricant has been removed from the magnetic recording medium and the magnetic recording medium has been dried, is 6 nm or more and 11 nm or less, and
wherein a friction coefficient ratio ($\mu_{C(1000)}/\mu_{C(5)}$) of a dynamic friction coefficient $\mu_{C(1000)}$ to a dynamic friction coefficient $\mu_{C(5)}$ is 1.0-2.0, the dynamic friction coefficient $\mu_{C(1000)}$ being a coefficient of dynamic friction upon the 1000th reciprocation when the magnetic recording medium to which a tension of 0.6 N is being longitudinally applied is caused to reciprocate on a magnetic head 1000 times, the dynamic friction coefficient $\mu_{C(5)}$ being a coefficient of dynamic friction upon the fifth reciprocation when the magnetic recording medium to which the tension of 0.6 N is being longitudinally applied is slid to reciprocate on the magnetic head five times.

9. The magnetic recording medium according to claim 1, wherein
the lubricant contains a fatty acid or a fatty acid ester or both the fatty acid and the fatty acid ester.

10. The magnetic recording medium according to claim 9, wherein
the fatty acid includes a compound represented by General Formula (1) or (2) indicated below, and
the fatty acid ester includes a compound represented by General Formula (3) or (4) indicated below:

$$CH_3(CH_2)_k COOH \qquad (1)$$

(where k is an integer selected from a range of 14 or more and 22 or less)

$$CH_3(CH_2)_n CH=CH(CH_2)_m COOH \qquad (2)$$

(where a sum of n and m is an integer selected from a range of 12 or more and 20 or less)

$$CH_3(CH_2)_p COO(CH_2)_q CH_3 \qquad (3)$$

(where p is an integer selected from a range of 14 or more and 22 or less, and q is an integer selected from a range of 2 or more and 5 or less)

$$CH_3(CH_2)_r COO-(CH_2)_s CH(CH_3)_2 \qquad (4)$$

(where r is an integer selected from a range of 14 or more and 22 or less, and s is an integer selected from a range of 1 or more and 3 or less).

11. The magnetic recording medium according to claim 1, wherein
a coercive force $H_c$ in a longitudinal direction of the magnetic recording medium is 2000 Oe or less.

12. The magnetic recording medium according to claim 1, wherein
the statistical value $\sigma_{SW}$ is 23 nm or less.

13. The magnetic recording medium according to claim 1, wherein
the statistical value $\sigma_{SW}$ is 10 nm or more and 23 nm or less.

14. The magnetic recording medium according to claim 1, wherein
the average diameter of the pores is 6 nm or more and 10 nm or less.

15. The magnetic recording medium according to claim 1, wherein
the average diameter of the pores is 7 nm or more and 9 nm or less.

16. The magnetic recording medium according to claim 1, wherein
an average thickness of the base layer is 4.2 μm or less.

17. The magnetic recording medium according to claim 1, wherein
the magnetic layer contains a magnetic powder, and
an average aspect ratio of the magnetic powder is 1.0 or more and 3.5 or less.

18. The magnetic recording medium according to claim 1, wherein
the magnetic layer contains a magnetic powder, and
an average particle size of the magnetic powder is 50 nm or less.

19. A magnetic recording cartridge in which a tape-shaped magnetic recording medium is housed in a state of being wound around a reel,
wherein the magnetic recording medium includes:
a magnetic layer;
an underlayer;
a base layer; and
a back layer, wherein
a servo pattern is recorded in the magnetic layer,
a statistical value $\sigma_{SW}$ indicating non-linearity of a servo band and being obtained from a reproduction waveform of a servo signal of the servo pattern is 24 nm or less, wherein the statistical value $\sigma_{SW}$ is defined by equal (1):

$$\sigma_{SW} = \sqrt{\sum WIP(f) \times df}, \qquad (1)$$

wherein WIP(f) is displacement difference during actual drive and df is wave number interval,
the base layer contains polyester as a main component,
an average thickness $t_T$ of the magnetic recording medium is 5.6 μm or less,
the magnetic recording medium contains a lubricant,
pores are formed in the magnetic recording medium, and
an average diameter of the pores that is measured in a state where the lubricant has been removed from the magnetic recording medium and the magnetic recording medium has been dried, is 6 nm or more and 11 nm or less, and
wherein (a servo track width of an inside of winding of the magnetic recording medium)−(a servo track width of an outside of the winding of the magnetic recording medium)>0 μm.

* * * * *